United States Patent
Gao et al.

(10) Patent No.: US 11,489,706 B2
(45) Date of Patent: Nov. 1, 2022

(54) METHOD AND APPARATUS FOR TRANSMITTING PUCCH ON SYMBOL ACCORDING TO CYCLIC SHIFT VALUE

(71) Applicant: CHINA ACADEMY OF TELECOMMUNICATIONS TECHNOLOGY, Beijing (CN)

(72) Inventors: Xuejuan Gao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 67 days.

(21) Appl. No.: 16/638,443

(22) PCT Filed: Jul. 25, 2018

(86) PCT No.: PCT/CN2018/097024
§ 371 (c)(1),
(2) Date: Feb. 11, 2020

(87) PCT Pub. No.: WO2019/029362
PCT Pub. Date: Feb. 14, 2019

(65) Prior Publication Data
US 2020/0177423 A1    Jun. 4, 2020

(30) Foreign Application Priority Data
Aug. 11, 2017   (CN) .......................... 201710687219.7

(51) Int. Cl.
*H04L 27/26* (2006.01)
*H04B 1/713* (2011.01)
(Continued)

(52) U.S. Cl.
CPC ......... *H04L 27/2607* (2013.01); *H04B 1/713* (2013.01); *H04W 72/0413* (2013.01); *H04W 80/08* (2013.01)

(58) Field of Classification Search
CPC ............... H04L 27/2607; H04L 5/0091; H04L 27/2602; H04L 5/0053; H04L 5/0008;
(Continued)

(56) References Cited

U.S. PATENT DOCUMENTS

| | | | | |
|---|---|---|---|---|
| 2009/0196229 A1* | 8/2009 | Shen | ...................... | H04L 5/0053 370/328 |
| 2013/0034011 A1* | 2/2013 | Yoon | ...................... | H04L 5/0048 370/252 |

(Continued)

FOREIGN PATENT DOCUMENTS

| | | |
|---|---|---|
| CN | 106559101 A | 4/2017 |
| WO | 2016182063 A1 | 11/2016 |

(Continued)

OTHER PUBLICATIONS

Patent Cooperation Treaty, Notification of Transmittal of Translation of the International Preliminary Report on Patentability, PCT/CN2018/097024, dated Feb. 20, 2020, Applicant: China Academy of Telecommunications Technology.
(Continued)

*Primary Examiner* — Tejis Daya
(74) *Attorney, Agent, or Firm* — Harness,. Dickey & Pierce, P.L.C.

(57) ABSTRACT

An information transmission method, a terminal and a base station are provided. The method includes: acquiring a symbol occupied by a physical uplink control channel (PUCCH) in a time unit; determining a cyclic shift (CS) value corresponding to the symbol; and transmitting the PUCCH on the symbol according to the CS value.

20 Claims, 3 Drawing Sheets

(51) Int. Cl.
*H04W 72/04* (2009.01)
*H04W 80/08* (2009.01)

(58) Field of Classification Search
CPC .. H04L 5/0048; H04B 1/713; H04W 72/0413; H04W 80/08; H04J 13/0059; H04J 13/0074
See application file for complete search history.

(56) References Cited

U.S. PATENT DOCUMENTS

| | | | |
|---|---|---|---|
| 2015/0200762 A1* | 7/2015 | Kim | H04W 52/146 370/329 |
| 2017/0214442 A1* | 7/2017 | Chae | H04L 5/0051 |
| 2017/0288833 A1* | 10/2017 | Islam | H04L 5/0048 |
| 2018/0083751 A1* | 3/2018 | Seo | H04L 5/0048 |
| 2018/0124775 A1* | 5/2018 | Seo | H04L 1/1861 |
| 2018/0198568 A1 | 7/2018 | Takeda et al. | |
| 2018/0279294 A1 | 9/2018 | Gao et al. | |
| 2019/0007175 A1* | 1/2019 | Kwak | H04L 5/0048 |
| 2019/0141700 A1* | 5/2019 | Kwak | H04W 72/0413 |
| 2020/0083933 A1* | 3/2020 | Peng | H04L 5/0055 |
| 2021/0185712 A1* | 6/2021 | Matsumura | H04L 5/0053 |

FOREIGN PATENT DOCUMENTS

| | | |
|---|---|---|
| WO | 2016182287 A1 | 11/2016 |
| WO | 2017099524 A1 | 6/2017 |

OTHER PUBLICATIONS

Extended European Search Report, PCT/CN2018/097024, dated Jul. 23, 2020, Applicant: China Academy of Telecommunications Technology.
Notification Letter of Examination Opinion of Intellectual Property Bureau, Application No. 107127030.
3GPP TSG RAN WG1 Meeting #89, R1-1707505, May 15-19, 2017, Hangzhou, P.R. China, Agenda Item: 7.1.3.2.3, Source: CATT, Title: PUCCH resource allocation, Document For: Discussion.
3GPP TSG RAN WG1 NR Ad-Hoc#2, R1-1710085, Jun. 7-30, 2017, Qingdao, P.R. China, Agenda Item: 5.1.3.2.21, Source: CATT, Title: Long PUCCH for small UCI payloads, Document For: Discussion.
3GPP TSG RAN WG1 #52, R1-080707, Feb. 11-15, 2008, Sorrento, Italy, Agenda Item: 6.1.4, Source: Texas Instruments, Title: Cell Specific CS Hopping and Slot Based CS/OC Remapping on PUCCH, Document For: Discussion and Decision.
3GPP TSG RAN WG1 Meeting #88bis, R1-1706038, Apr. 3-7, 2017, Spokane, US, Agenda Item: 8.1.3.2.2, Source: Ericsson, Title: On the Design of Long PUCCH for Small Payloads, Document For: Discussion and Decision.
3GPP TSG RAN WG1 NR Ad-Hoc Meeting, R1-1700368, Jan. 16-20, 2017, Spokane, USA, Agenda Item: 5.1.3.2, Source: Intel Corporation, Title: UL control channel design with long duration, Document For: Discussion and Decision.
3GPP TSG RAN WG1 Meeting #89, R1-1709446, May 15-19, 2017, Hangzhou, P.R. China, Agenda Item: 6.2.1.2.3.1, Source: Ericsson, Title: WF on sequence-based sPUCCH in 2OS and 3OS sTTI.
Ericsson, Introduction of shortened processing time and shortened TTI into 36.211, Release 14, 3GPP TS 36.211 V14.3.0 (Jun. 2017), R1-1713297, 3GPP TSG-RAN1 Meeting #90 Prague, Czech. Rep., Aug. 21-25, 2017.
Gao Swi Ejuan, Ekpenyong Toni, Notification of Reason for Refusal Tae-Hong Kim Application No. 10-2020-7007105, Application date: Mar. 10, 2020, The information transfer method, and the terminal and base station, dated Jun. 7, 2021.
3rd Generation Partnership Project; Technical Specification Group Radio Access Network; Evolved Universal Terrestrial Radio Access (E-UTRA)Physical channels and modulation (Release 14); 3GPP TS 36.211 V14.3.0 (Jun. 2017).

* cited by examiner

METHOD AND APPARATUS FOR TRANSMITTING PUCCH ON SYMBOL ACCORDING TO CYCLIC SHIFT VALUE

CROSS-REFERENCE TO RELATED APPLICATION

This application is the U.S. national phase of PCT Application PCT/CN2018/097024 filed on Jul. 25, 2018, which claims a priority to Chinese Patent Application No. 201710687219.7 filed on Aug. 11, 2017, the disclosures of which are incorporated in their entirety by reference herein.

TECHNICAL FIELD

The present disclosure relates to the field of communication technologies, and in particular, to an information transmission method, a terminal and a base station.

BACKGROUND

With the development and change of mobile communication service requirements, organizations such as the International Telecommunication Union (ITU) and the 3rd Generation Partnership Project (3GPP) have begun to study new wireless communication systems, such as 5G new air interfaces (5G NR). A new frame structure is defined in the new wireless communication system, which supports different baseband parameters (including parameters such as subcarrier spacing). For different baseband parameters, it is defined that the length of a subframe is always 1 ms. A subframe contains A slots. Corresponding to different baseband parameters, the number of A may be different to meet the length of a subframe. 1 ms. For different baseband parameters, a slot can contain 7 or 14 symbols (such as OFDM or DFT-S-OFDM symbols). A slot can have multiple slot structures/formats, and different slot structures/formats correspond to different uplink and downlink resource divisions. For example, all symbols in a slot can be used for both downlink transmission and uplink transmission. Used for uplink transmission and part for downlink transmission. The slot structure/format can be notified to the terminal in a semi-static manner through Radio Resource Control (RRC) signaling, or it can be notified to the terminal in a dynamic manner, such as through Group Common PDCCH, to achieve dynamic slot changes.

Because the number of uplink symbols contained in a slot may change, a 5G NR system defines a physical uplink control channel (Physical Uplink Control Channel, PUCCH) that can occupy 4 to 14 symbols for transmission. The PUCCH is in a slot. The frequency hopping structure may or may not be used. A format in NR PUCCH can be used to carry 1 or 2 bit information transmission. The format can be used to pass the transmission information through binary phase shift keying (Binary Phase Shift Keying, BPSK) or quadrature phase shift keying (QPSK) modulation to obtain a modulation symbol. The modulation symbol is repeatedly transmitted on each symbol carrying the Uplink Control Information (UCI) occupied by the PUCCH transmission. The adjustment symbol is carried on each symbol. A Cyclic Shift (CS) Constant Amplitude Zero Auto Correlation (CA-ZAC) base sequence or Computer Generated (CG) base sequence is transmitted. Different symbols can also use Orthogonal sequences (such as Orthogonal Cover Code (OCC) sequences) to spread frequency, to support large multi-user multiplexing capacity. However, in the current 5G NR system, there is no clear method for how to obtain the CS value of each symbol of NR PUCCH with different lengths and the number of the orthogonal sequence used in a slot, which may lead to a reduction The transmission performance of PUCH increases the resource overhead of PUCCH.

In summary, the current 5G NR system has no clear technical solution on how to obtain the CS value of NR PUCCH with different lengths on each symbol, which easily leads to lower PUCH transmission performance and increase PUCCH resource overhead.

SUMMARY

An information transmission method, a terminal and a base station are provided in the present disclosure, to solve the technical issue in the 5G NR system that the PUCCH transmission performance may be degraded since it is unable to acquire the CS value of the NR PUCCHs with different lengths on each symbol.

In a first aspect, an information transmission method is provided in the present disclosure, including:
acquiring a symbol occupied by a physical uplink control channel (PUCCH) in a time unit;
determining a cyclic shift (CS) value corresponding to the symbol; and
transmitting the PUCCH on the symbol according to the CS value.

In a second aspect, an information transmission method is provided in the present disclosure, including:
acquiring a symbol occupied by a physical uplink control channel (PUCCH) in a time unit;
determining a cyclic shift (CS) value corresponding to the symbol; and
receiving the PUCCH on the symbol according to the CS value.

In a third aspect, a terminal is provided in the present disclosure, including:
an acquiring module, configured to acquire a symbol occupied by a physical uplink control channel (PUCCH) in a time unit;
a determining module, configured to determine a cyclic shift (CS) value corresponding to the symbol; and
a transmitting module, configured to transmit the PUCCH on the symbol according to the CS value.

In a fourth aspect, a base station is provided in the present disclosure, including:
an acquiring module, configured to acquire a symbol occupied by a physical uplink control channel (PUCCH) in a time unit;
a determining module, configured to determine a cyclic shift (CS) value corresponding to the symbol; and
a receiving module, configured to receive the PUCCH on the symbol according to the CS value.

In a fifth aspect, a terminal is provided in the present disclosure, including: a first memory, a first processor and a computer program stored in the first memory and executable on the first processor, where the first processor executes the computer program to perform:
acquiring a symbol occupied by a physical uplink control channel (PUCCH) in a time unit;
determining a cyclic shift (CS) value corresponding to the symbol; and
transmitting the PUCCH on the symbol according to the CS value.

In a sixth aspect, a base station is provided in the present disclosure, including: a second memory, a second processor and a computer program stored in the second memory and executable on the second processor, where the second processor executes the computer program to perform:

acquiring a symbol occupied by a physical uplink control channel (PUCCH) in a time unit;

determining a cyclic shift (CS) value corresponding to the symbol; and receiving the PUCCH on the symbol according to the CS value.

In a seventh aspect, a computer-readable storage medium storing a computer program is provided in the present disclosure, where the computer program is executed by a processor to perform:

acquiring a symbol occupied by a physical uplink control channel (PUCCH) in a time unit;

determining a cyclic shift (CS) value corresponding to the symbol; and transmitting the PUCCH on the symbol according to the CS value.

In an eighth aspect, a computer-readable storage medium storing a computer program is provided in the present disclosure, where the computer program is executed by a processor to perform:

acquiring a symbol occupied by a physical uplink control channel (PUCCH) in a time unit;

determining a cyclic shift (CS) value corresponding to the symbol; and receiving the PUCCH on the symbol according to the CS value.

According to the embodiment of the present disclosure, a symbol occupied by a PUCCH in a time unit is acquired, a CS value corresponding to the symbol is determined, and then the PUCCH on the symbol is transmitted according to the CS value, thereby determining clearly the CS value corresponding to the symbol and further ensuring that the CS values on different symbols are as different as possible, so as to achieve a randomization of interference, improve the transmission performance of PUCCH, ensure that the NR PUCCH with different lengths has the same CS acquisition method on the same symbol to support the multiplex transmission of NR PUCCHs with different lengths on the same RB, to reduce the system PUCCH resource overhead and solve the technical issue in the 5G NR system that the PUCCH transmission performance may be degraded since it is unable to acquire the CS value of the NR PUCCHs with different lengths on each symbol.

DETAILED DESCRIPTION

Figure 1:
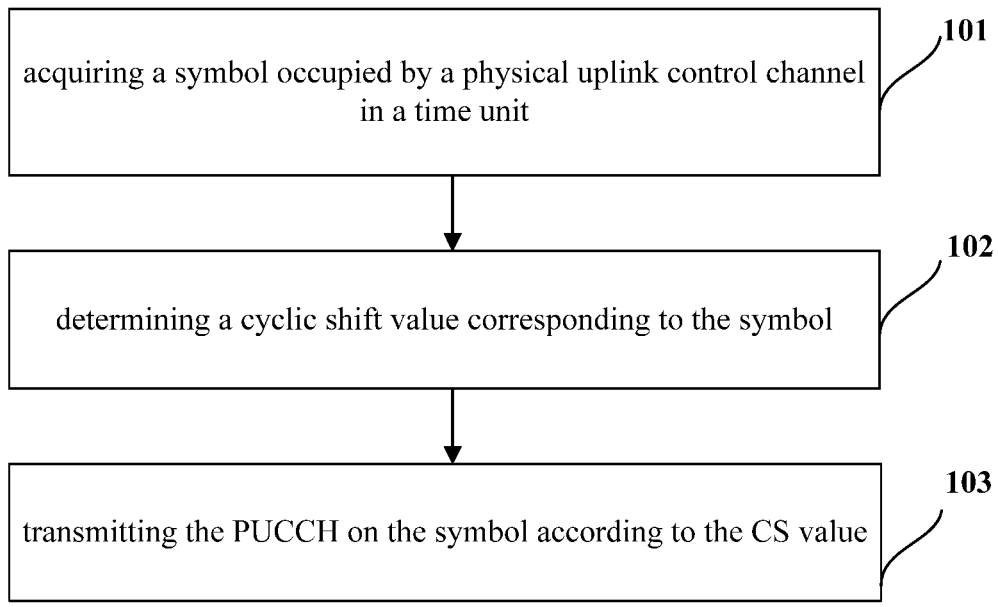
FIG. 1 is a flowchart of an information transmission method on a terminal side in an embodiment of the present disclosure.

Hereinafter, the embodiments of the present disclosure will be described in more detail with reference to the accompanying drawings. Although the embodiments of the present disclosure are shown in the drawings, it should be understood that the present disclosure can be implemented in various forms and should not be limited by the embodiments set forth herein. On the contrary, these embodiments are provided to enable a thorough understanding of the present disclosure, and to fully convey the scope of the present disclosure to those skilled in the art.

In order to make the technical problems, technical solutions, and advantages of the present disclosure clearer, the following describes in detail with reference to the accompanying drawings and specific embodiments. Below description, specific details such as specific configurations and components are provided only to assist in a comprehensive understanding of embodiments of the present disclosure. Therefore, it should be apparent to those skilled in the art that various changes and modifications can be made to the embodiments described herein without departing from the scope and spirit of the disclosure. In addition, descriptions of known functions and constructions are omitted for clarity and conciseness.

It should be understood that "an embodiment" or "the embodiment" mentioned throughout the specification means that a particular feature, structure, or characteristic related to the embodiment is included in at least one embodiment of the present disclosure. Thus, the appearances of "in one embodiment" or "in an embodiment" appearing throughout the specification are not necessarily referring to the same embodiment. Furthermore, the particular features, structures, or characteristics may be combined in any suitable manner in one or more embodiments.

In various embodiments of the present disclosure, it should be understood that the sequence indexs of the following processes do not mean the order of execution. The execution order of each process should be determined by its function and internal logic, and should not be implemented in the present disclosure. The implementation process of the example constitutes any limitation.

In addition, the terms "system" and "network" are often used interchangeably herein.

In the embodiments provided in this application, it should be understood that "B corresponding to A" means that B is associated with A, and B can be determined according to A. However, it should also be understood that determining B based on A does not mean determining B based on A alone, but also determining B based on A and/or other information.

As shown in FIG. 1 which is a flowchart of the information transmission method on a terminal side in an embodiment of the present disclosure. The method includes the following steps 101-103:

Step 101: acquiring a symbol occupied by a physical uplink control channel PUCCH in a time unit.

In this step, the terminal obtains the symbols occupied by the PUCCH in a time unit.

Specifically, the time unit may be one or more time slots, or one subframe, or 14 symbols.

Step 102: determining a cyclic shift (CS) value corresponding to the symbol.

In this step, specifically, when determining the CS value corresponding to the symbol, the terminal may determine the CS value corresponding to the symbol in two ways below:

Method 1: determining the CS value corresponding to the symbol, according to an index of the symbol and a PUCCH resource index notified by configuration information. Specifically, the configuration information may be sent through a high-layer signaling, or may be sent through an indication field in the PDCCH. Of course, the configuration information involved in the initial access process may also be carried in the PBCH, SIB information, Msg2 or Msg4.

Method 2: determining the CS value corresponding to the symbol, according to a CS configuration index configured by a configuration signaling. Specifically, the configuration signaling may be sent through high-layer signaling, or may be sent through an indication field in the PDCCH. Of course, the configuration signaling involved in the initial access process may also be carried in the PBCH, SIB information, Msg2 or Msg4.

Step 103: transmitting the PUCCH on the symbol according to the CS value.

In this step, specifically, when the terminal sends the PUCCH on the symbol according to the obtained CS value, the terminal can determine the RB index $n_{PRB}$ of the RB where the PUCCH is transmitted by using the following third formula, and send the PUCCH through the symbol and the RB corresponding to the RB index;

$$n_{PRB} = \begin{cases} \left\lfloor \frac{m}{2} \right\rfloor & \text{if } (m \bmod 2) \bmod 2 = 0 \\ N_{RB}^{UL} - 1 - \left\lfloor \frac{m}{2} \right\rfloor & \text{if } (m \bmod 2) \bmod 2 = 1 \end{cases} ; \text{ or}$$

$$n_{PRB} = \begin{cases} \left\lfloor \frac{m}{2} \right\rfloor + N_{hop-offset1} & \text{if } (m \bmod 2) \bmod 2 = 0 \\ N_{RB}^{UL} - 1 - \left\lfloor \frac{m}{2} \right\rfloor - N_{hop-offset2} & \text{if } (m \bmod 2) \bmod 2 = 1 \end{cases} ;$$

where $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor ;$$

or in the case that a frequency hopping is used, determining the RB index $n_{PRB}$ of the RB where the PUCCH is transmitted through a fourth formula below, and transmitting the PUCCH on the symbol and the RB corresponding to the RB index:

$$n_{PRB} = \begin{cases} \left\lfloor \frac{m}{2} \right\rfloor & \text{if } (m + f_{hop} \bmod 2) \bmod 2 = 0 \\ N_{RB}^{UL} - 1 - \left\lfloor \frac{m}{2} \right\rfloor & \text{if } (m + f_{hop} \bmod 2) \bmod 2 = 1 \end{cases} ; \text{ or}$$

$$n_{PRB} = \begin{cases} \left\lfloor \frac{m}{2} \right\rfloor + N_{hop-offset1} & \text{if } (m + f_{hop} \bmod 2) \bmod 2 = 0 \\ N_{RB}^{UL} - 1 - \left\lfloor \frac{m}{2} \right\rfloor - N_{hop-offset2} & \text{if } (m + f_{hop} \bmod 2) \bmod 2 = 1 \end{cases} ;$$

where $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor ;$$

where $n_{PRB}$ represents the RB index of the RB for transmitting the PUCCH;

$n_{PUCCH}^{\tilde{p}}$ represents an index number of the PUCCH at an antenna port $\tilde{p}$;

$N_{sc}^{RB}$ represents a quantity of sub-carriers in one RB;

$\Delta_{shift}^{PUCCH}$ represents a CS spacing preconfigured by a high-layer signaling;

$N_{RB}^{UL}$ represents an uplink bandwidth or an uplink frequency hopping bandwidth;

$f_{hop}$ represents an index of the frequency hopping part;

$N_{offset}$ represents a staring position of the PUCCH resource preconfigured by a high-layer signaling, where a value of $N_{offset}$ is greater than or equal to 0;

$N_{hop-offset1}$ and $N_{hop-offset2}$ represent uplink frequency hopping offsets;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

According to the embodiment of the present disclosure, a CS value corresponding to the symbol is determined, and then the PUCCH on the symbol is transmitted according to the CS value, thereby determining clearly the CS value corresponding to the symbol and further ensuring that the CS values on different symbols are as different as possible, so as to achieve a randomization of interference, improve the transmission performance of PUCCH, ensure that the NR PUCCH with different lengths has the same CS acquisition method on the same symbol to support the multiplex transmission of NR PUCCHs with different lengths on the same RB, to reduce the system PUCCH resource overhead and solve the technical issue in the 5G NR system that the PUCCH transmission performance may be degraded since it is unable to acquire the CS value of the NR PUCCHs with different lengths on each symbol.

Specifically, how to determine the cyclic shift CS value corresponding to the symbol is described in detail below.

The specific methods for determining the CS value corresponding to the symbol in the foregoing manners 1 and 2 are respectively introduced below.

Method One:

When determining the CS value corresponding to the symbol according to the index of the symbol and the PUCCH resource index notified by the configuration information in the first method, the PUCCH resource index and the index of the symbol may be used, and further one or more factors such as the time unit number, terminal ID, the cell ID (the current cell ID or the cell ID configured by higher layer signaling) and the frequency hopping position may also be used for determining the CS value corresponding to the symbol. Specifically, there are four scenarios below:

Scenario 1:

calculating the CS value $\alpha_{\tilde{p}}(n_s, l)$ corresponding to the symbol, according to the PUCCH resource index, the index of the symbol and an index of the time unit and through a first formula group below:

$$\alpha_{\tilde{p}}(n_s, l) = 2\pi \cdot n_{cs}^{(\tilde{p})}(n_s, l) / N_{sc}^{RB};$$

where $$n_{cs}^{(\tilde{p})}(n_s,l)=[n_{cs}^{cell}(n_s,l)+(n'_{\tilde{p}}(n_s)\cdot\Delta_{shift}^{PUCCH}+(n_{oc}^{(\tilde{p})}(n_s)\bmod\Delta_{shift}^{PUCCH}))\bmod N_{sc}^{RB}]\bmod N_{sc}^{RB};$$

where $$n_{oc}^{(\tilde{p})}(n_s)=\lfloor n'_{\tilde{p}}(n_s)\cdot\Delta_{shift}^{PUCCH}/N_{sc}^{RB}\rfloor;$$

$$n'_{\tilde{p}}(n_s)=(n_{PUCCH}^{\tilde{p}})\bmod(c\cdot N_{sc}^{RB}/\Delta_{shift}^{PUCCH});$$

$$n_{cs}^{cell}(n_s,l)=\Sigma_{i=0}^{7}c(8N_{symb}^{UL}\cdot n_s+8l+i)\cdot 2^i;$$

or, calculating the CS value $\alpha_{\tilde{p}}(n_s, l)$ corresponding to the symbol, according to the PUCCH resource index, the index of the symbol and an index of the time unit and through a second formula group below:

$$\alpha_{\tilde{p}}(n_s,l)=2\pi\cdot n_{cs}^{(\tilde{p})}(n_s,l)/N_{sc}^{RB};$$

where $$n_{cs}^{(\tilde{p})}(n_s,l)=[n_{cs}^{cell}(n_s,l)+(n'_{\tilde{p}}(n_s)\cdot\Delta_{shift}^{PUCCH})\bmod N_{sc}^{RB}]\bmod N_{sc}^{RB};$$

where $$n'_{\tilde{p}}(n_s)=(n_{PUCCH}^{\tilde{p}})\bmod(c\cdot N_{sc}^{RB}/\Delta_{shift}^{PUCCH});$$

$$n_{cs}^{cell}(n_s,l)=\Sigma_{i=0}^{7}c(8N_{symb}^{UL}\cdot n_s+8l+i)\cdot 2^i;$$

where $\alpha_{\tilde{p}}(n_s, l)$ represents the CS value corresponding to the symbol;

$n_{cs}^{\tilde{p}}(n_s, l)$, $n'_{\tilde{p}}(n_s)$ and $n_{cs}^{cell}(n_s, l)$ represent intermediate parameters;

$n_{oc}^{(\tilde{p})}(n_s)$ represents an Orthogonal Cover Code (OCC) sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one resource block (RB);

$\Delta_{shift}^{PUCCH}$ represents a CS spacing preconfigured by a high-layer signaling;

$N_{symb}^{UL}$ represents a quantity of symbols in one time unit;

$n_s$ represents the index of the time unit;

l represents an index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

In addition, specifically, for the second formula group, it is applicable when the PUCCH does not use the OCC sequence. Of course, when PUCCH does not use the OCC sequence, the first formula group can also be used. At this time, c=1.

Scenario 2:

calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a third formula group below:

$$\alpha_{\tilde{p}}(n_s,f_{hop},l)=2\pi\cdot n_{cs}^{(\tilde{p})}(n_s,f_{hop},l)/N_{sc}^{RB};$$

where $$n_{cs}^{(\tilde{p})}(n_s,f_{hop},l)=[n_{cs}^{cell}(n_s,l)+(n'_{\tilde{p}}(n_s,f_{hop})\cdot\Delta_{shift}^{PUCCH}+(n_{oc}^{(\tilde{p})}(n_s,f_{hop}))\bmod\Delta_{shift}^{PUCCH}))\bmod N_{sc}^{RB}]\bmod N_{sc}^{RB};$$

where $$n_{oc}^{(\tilde{p})}(n_s,f_{hop})=\lfloor n'_{\tilde{p}}(n_s,f_{hop})\cdot\Delta_{shift}^{PUCCH}/N_{sc}^{RB}\rfloor;$$

$$n_{cs}^{cell}(n_s,l)=\Sigma_{i=0}^{7}c(8N_{symb}^{UL}\cdot n_s+8l+i)\cdot 2^i;$$

in the case that a frequency hopping is used and the time unit includes two frequency hopping parts, for a first frequency hopping part or when $f_{hop}\bmod 2=0$, $$n'_{\tilde{p}}(n_s,f_{hop})=(n_{PUCCH}^{\tilde{p}})\bmod(c\cdot N_{SC}^{RB}/\Delta_{shift}^{PUCCH});$$

for a second frequency hopping part or when $f_{hop}\bmod 2=1$, $$n'_{\tilde{p}}(n_s, f_{hop}) = [c(n'_{\tilde{p}}(n_s, f_{hop}-1)+1)]\bmod\left(c\cdot\frac{N_{SC}^{RB}}{\Delta_{shift}^{PUCCH}}+1\right)-1;$$

or, calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a fourth formula group below:

$$\alpha_{\tilde{p}}(n_s,f_{hop},l)=2\pi\cdot n_{cs}^{(\tilde{p})}(n_s,f_{hop},l)/N_{sc}^{RB};$$

where $$n_{cs}^{(\tilde{p})}(n_s,f_{hop},l)=[n_{cs}^{cell}(n_s,l)+(n'_{\tilde{p}}(n_s,f_{hop})\cdot\Delta_{shift}^{PUCCH})\bmod N_{sc}^{RB}]\bmod N_{sc}^{RB};$$

where $$n_{cs}^{cell}(n_s,l)=\Sigma_{i=0}^{7}c(8N_{symb}^{UL}\cdot n_s+8l+i)\cdot 2^i;$$

in the case that a frequency hopping is used and the time unit includes two frequency hopping parts, for a first frequency hopping part or when $f_{hop}\bmod 2=0$, $$n'_{\tilde{p}}(n_s,f_{hop})=(n_{PUCCH}^{\tilde{p}})\bmod(c\cdot N_{SC}^{RB}/\Delta_{shift}^{PUCCH});$$

for a second frequency hopping part or when $f_{hop}\bmod 2=1$, $$n'_{\tilde{p}}(n_s, f_{hop}) = [c(n'_{\tilde{p}}(n_s, f_{hop}-1)+1)]\bmod\left(c\cdot\frac{N_{SC}^{RB}}{\Delta_{shift}^{PUCCH}}+1\right)-1;$$

where $\alpha_{\tilde{p}}(n_s, f_{hop}, l)$ represents the CS value corresponding to the symbol;

$n_{cs}^{(\tilde{p})}(n_s, f_{hop}, l)$, $n_{cs}^{cell}(n_s, l)$ and $n'_{\tilde{p}}(n_s, f_{hop})$ represent intermediate parameters;

$n_{oc}^{\tilde{p}}(n_s, f_{hop})$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$N_{symb}^{UL}$ represents a quantity of symbols in one time unit;

$f_{hop}$ represents the index of the frequency hopping part;

$n_s$ represents the index of the time unit;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

In addition, specifically, for the fourth formula group, it is applicable when the PUCCH does not use an OCC sequence. Of course, when PUCCH does not use an OCC sequence, the third formula group can also be used. At this time, c=1.

Scenario 3:

calculating the CS value $\alpha_{\tilde{p}}(l)$ corresponding to the symbol, according to the PUCCH resource index and the index of the symbol and through a fifth formula group below:

$$\alpha_{\tilde{p}}(l)=2\pi \cdot n_{cs}^{(\tilde{p})}(l)/N_{sc}^{RB};$$

where $$n_{cs}^{(\tilde{p})}(l)=[n_{cs}^{cell}(l)+(n'_{\tilde{p}} \cdot \Delta_{shift}^{PUCCH}+(n_{oc}^{(\tilde{p})} \bmod \Delta_{shift}^{PUCCH})) \bmod N_{sc}^{RB}] \bmod N_{sc}^{RB};$$

where $$n_{oc}^{(\tilde{p})}=\lfloor n'_{\tilde{p}} \cdot \Delta_{shift}^{PUCCH}/N_{sc}^{RB} \rfloor;$$

$$n'_{\tilde{p}}=(n_{PUCCH}^{\tilde{p}}) \bmod (c \cdot N_{sc}^{RB}/\Delta_{shift}^{PUCCH});$$

$$n_{cs}^{cell}(l)=\Sigma_{i=0}^{7} c(8l+i) \cdot 2^i;$$

or, calculating the CS value $\alpha_{\tilde{p}}(l)$ corresponding to the symbol, according to the PUCCH resource index and the index of the symbol and through a sixth formula group below:

$$\alpha_{\tilde{p}}(l)=2\pi \cdot n_{cs}^{(\tilde{p})}(l)/N_{sc}^{RB};$$

where $$n_{cs}^{(\tilde{p})}(l)=[n_{cs}^{cell}(l)+(n'_{\tilde{p}} \cdot \Delta_{shift}^{PUCCH}) \bmod N_{sc}^{RB}] \bmod N_{sc}^{RB};$$

where $$n'_{\tilde{p}}=(n_{PUCCH}^{\tilde{p}}) \bmod (N_{sc}^{RB}/\Delta_{shift}^{PUCCH});$$

$$n_{cs}^{cell}(l)=\Sigma_{i=0}^{7} c(8l+i) \cdot 2^i;$$

where $\alpha_{\tilde{p}}(l)$ represents the CS value corresponding to the symbol;

$n_{cs}^{\tilde{p}}(l)$, $n'_{\tilde{p}}$ and $n_{cs}^{cell}(l)$ represent intermediate parameters;

$n_{oc}^{(\tilde{p})}$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

In addition, specifically, for the six formula group, it is applicable when the PUCCH does not use the OCC sequence. Of course, when PUCCH does not use the OCC sequence, the fifth formula group can also be used. At this time, c=1.

Scenario 4:

calculating the CS value $\alpha_{\tilde{p}}(f_{hop}, l)$, according to the PUCCH resource index, the index of the symbol and an index of the frequency hopping part and through a seventh formula group below:

$$\alpha_{\tilde{p}}(f_{hop},l)=2\pi \cdot n_{cs}^{(\tilde{p})}(f_{hop},l)/N_{sc}^{RB};$$

where $$n_{cs}^{(\tilde{p})}(f_{hop},l)=[n_{cs}^{cell}(l)+(n'_{\tilde{p}}(f_{hop}) \cdot \Delta_{shift}^{PUCCH}+(n_{oc}^{(\tilde{p})}(f_{hop})) \bmod \Delta_{shift}^{PUCCH})) \bmod N_{sc}^{RB}] \bmod N_{sc}^{RB}$$

where $$n_{oc}^{(\tilde{p})}(f_{hop})=\lfloor n'_{\tilde{p}}(f_{hop}) \cdot \Delta_{shift}^{PUCCH}/N_{sc}^{RB} \rfloor;$$

$$n_{cs}^{cell}(l)=\Sigma_{i=0}^{7} c(8l+i) \cdot 2^i;$$

in the case that a frequency hopping is used and the time unit includes two frequency hopping parts, for a first frequency hopping part or when $f_{hop}$ mod 2=0, $$n'_{\tilde{p}}(f_{hop})=(n_{PUCCH}{}^{\tilde{p}}) \bmod (c \cdot N_{sc}^{RB}/\Delta_{shift}^{PUCCH});$$

for a second frequency hopping part or when $f_{hop}$ mod 2=1, $$n'_{\tilde{p}}(f_{hop}) = [c(n'_{\tilde{p}}(f_{hop}-1)+1)] \bmod \left(c \cdot \frac{N_{SC}^{RB}}{\Delta_{shift}^{PUCCH}} + 1\right) - 1;$$

or calculating the CS value $\alpha_{\tilde{p}}(f_{hop}, 1)$, according to the PUCCH resource index, the index of the symbol and an index of the frequency hopping part and through a eighth formula group below:

$$\alpha_{\tilde{p}}(f_{hop},l)=2\pi \cdot n_{cs}^{(\tilde{p})}(f_{hop},l)/N_{sc}^{RB};$$

where $$n_{cs}^{(\tilde{p})}(f_{hop},l)=[n_{cs}^{cell}(l)+(n'_{\tilde{p}}(f_{hop}) \cdot \Delta_{shift}^{PUCCH}) \bmod N_{sc}^{RB}] \bmod N_{sc}^{RB}$$

where $$n_{cs}^{cell}(l)=\Sigma_{i=0}^{7} c(8l+i) \cdot 2^{i};$$

in the case that a frequency hopping is used and the time unit includes two frequency hopping parts, for a first frequency hopping part or when $f_{hop}$ mod 2=0, $$n'_{\tilde{p}}(f_{hop})=(n_{PUCCH}{}^{\tilde{p}}) \bmod (c \cdot N_{sc}^{RB}/\Delta_{shift}^{PUCCH});$$

for a second frequency hopping part or when $f_{hop}$ mod 2=1, $$n'_{\tilde{p}}(f_{hop}) = [c(n'_{\tilde{p}}(f_{hop}-1)+1)] \bmod \left(c \cdot \frac{N_{SC}^{RB}}{\Delta_{shift}^{PUCCH}} + 1\right) - 1;$$

where $\alpha_{\tilde{p}}(f_{hop}, 1)$ represents the CS value corresponding to the symbol;

$n_{cs}^{(\tilde{p})}(f_{hop}, 1)$, $n_{cs}^{cell}(l)$ and $n'_{\tilde{p}}(f_{hop})$ represent intermediate parameters;

$n_{oc}^{\tilde{p}}(f_{hop})$ represents an OCC sequence index;

c ( ) represents a pseudorandom sequence;

$n_{PUCCH}{}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$f_{hop}$ represents the index of the frequency hopping part;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

In addition, specifically, for the eighth formula group, it is applicable when the PUCCH does not use the OCC sequence. Of course, when PUCCH does not use the OCC sequence, the seventh formula group can also be used. At this time, c=1.

In addition, when the CS value is calculated according to any of the above four scenarios, when the PUCCH is sent on the symbol according to the CS value, when it is determined to use the OCC sequence, the OCC sequence corresponding to the OCC sequence index is determined according to the OCC sequence index, and then the PUCCH is sent on the symbol according to the CS value and OCC sequence.

In this way, the base station determines a PUCCH resource index, and notifies the terminal through a signaling (for example, A or A groups PUCCH resource indexs is pre-configured to the terminal by the RRC signaling, and the indication field in the DCI indicates one or a group of resources to the terminal). According to the obtained PUCCH resource index, the terminal calculates a CS value of each symbol in a time unit according to the foregoing formula group (one of the first formula group to the eighth formula group). If it is determined that the PUCCH uses the OCC sequence, it is also necessary to determine the OCC sequence index according to the above formula group (the formula group including the calculation formula of the OCC sequence index from the first formula group to the eighth formula group), and determine the corresponding OCC sequence according to the OCC sequence index, the terminal transmits the PUCCH on the corresponding symbol in the time unit according to the determined CS value and OCC sequence. The PUCCH may be transmitted on all symbols in the time unit, or may be transmitted only on some symbols in the time unit. If transmitted only on some symbols, it is able to determine only the symbols used to transmit PUCCH symbols according to the above formula group. CS value (i.e., it is not necessary to determine the CS values of all symbols in the time unit). In addition, for a PUCCH that supports the frequency hopping, if it is agreed or configured to use frequency hopping, it is assumed that the PUCCH is divided into two frequency hopping parts, and the CS values and OCC sequences of different frequency hopping parts can be further randomized. For example, using a third formula group or the seventh formula group. Of course, different frequency hopping parts can also use the same OCC sequence, for example, use the first formula group or the fifth formula group. In the first formula group and the third formula group, the value of $n_{cs}^{cell}(n_s, 1)$ changes with the time unit number and the number of symbols in the time unit. The CS value at the same symbol position in different time units may be different. The corresponding OCC sequences in different time units may also be different, so that further randomization can be achieved. In the fifth formula group and the seventh formula group, the value of $n_{cs}^{cell}(l)$ changes only with the number of symbols in the time unit. Therefore, the CS value at the same symbol position in each time unit is the same. The corresponding OCC sequence in each time unit is also the same, and are all obtained according to the same rule.

The above scenario will be exemplified below.

Taking $\Delta_{shift}^{PUCCH}=2$, $N_{sc}^{RB}=12$, cell ID=3 as an example.

Assume that for a PUCCH with a symbol length of 4 to 7 and using a frequency hopping, c=1 (that is, no OCC sequence is used); for a PUCCH with a symbol length of 4 or 5 or 8 to 11 and without using a frequency hopping, or a PUCCH with a symbol length of 8 to 11 and using frequency hopping, c=2 (that is, two OCC sequences are supported. For data and pilot, the OCC sequence lengths used may be the same or different, but the number of sequences is the same, so as to support the same multiplexing capacity.). For a PUCCH with a symbol length of 6 or 7 or 12 to 14 and without using frequency hopping, or for a PUCCH with a symbol length of 12 to 14 and using a frequency hopping, c=3. A time slot containing 14 symbols is used as a time unit. In addition, it is assumed that the base station sends the PUCCH resource index $n_{PUCCH}^{\tilde{p}}=0$ to the terminal 1, the resource index $n_{PUCCH}^{\tilde{p}}=1$ to the terminal 2 and the resource index $n_{PUCCH}^{\tilde{p}}=20$ to the terminal 3. In addition, the length of the PUCCH of the terminal 1 and the terminal 2 is 7 symbols, For example, the structure of the UCI and pilot (RS) is URURURU, where U is the symbol position carrying a UCI, R is the symbol position carrying a pilot, and the last 7 symbols are transmitted in a time unit; the PUCCH length of terminal 3 is 10 symbols, such as RURURU-RURU, are transmitted in the last 10 symbols in a time unit.

When terminal 1 and terminal 2 transmit in the time unit of ns=0, the CS value of each symbol of terminal 1, terminal 2, and terminal 3 can be calculated as follows:

ns=1 and l=0~13, and then $n_{cs}^{cell}(n_s, l)$=[65,106,89,191, 68,73,63,48,18,4,252,230,149,236] where the above values correspond to the symbols of l=0~13 in order; or the corresponding $n_{cs}^{cell}(n_s, l)$ is directly calculated according to the number of symbols occupied by PUCCH.

In addition, the value of c is different according to different situations. Specifically, the c value can be determined according to the following two situations, and corresponding calculations can be performed.

First, the terminal determines the CS value according to the maximum number of OCC sequences supported by PUCCH with different symbol lengths, that is, the PUCCH resource index is uniform number for all PUCCHs with different symbol lengths, that is, PUCCH in each RB is assumed to have different symbol lengths. Multi-user multiplexing capacity determined by the maximum number of OCC sequences supported (the number of OCC sequences of a PUCCH is based on the number supported by the smallest of the OCC lengths used by the PUCCH data and pilot respectively) numbering, specifically, determining a multi-user multiplexing capacity A of one RB according to a preset configured CS spacing, the number of subcarriers in one RB, and the maximum number of OCC sequences, and performing the multi-user multiplexing capacity in one RB indexing, that is, the numbering in one RB is 0 to A−1. Of course, the numbering is different in different RBs, and the numbering in the second RB is A to 2A−1, and so on.

For the above scenario, c represents the maximum value of c corresponding to all the above PUCCHs, that is, c=3. When PUCCH does not use frequency hopping, terminal 1 and terminal 2 use OCC sequences with lengths $N_{SF}^{PUCCH}$ of 4 and 3 for time-domain spreading, respectively; terminal 3 can divide the data into two groups, the first group are the first 5 symbols, the second group are the last 5 symbols, the data and pilots in the first group are spread in time domain using OCC sequences with lengths $N_{SF}^{PUCCH}$ of 2 and 3, and the data and pilots in the second group are spread in time-domain using OCC sequences with lengths $N_{SF}^{PUCCH}$ of 3 and 2 respectively. The correspondence between the data and the OCC sequence indexes corresponding to the pilots is shown in Table A, Table B, and Table C below.

TABLE A

| Orthogonal OCC sequence [w (0) ... w ($N_{SF}^{PUCCH}$ − 1)] where $N_{SF}^{PUCCH}$ = 4 | |
|---|---|
| OCC sequence index $n_{oc}^{(\tilde{p})}(n_s)$ | Orthogonal OCC sequence [w (0) ... w ($N_{SF}^{PUCCH}$ − 1)] |
| 0 | [ +1 +1 +1 +1] |
| 1 | [ +1 −1 +1 −1] |
| 2 | [ +1 −1 −1 +1] |

TABLE B

| Orthogonal OCC sequence [w (0) ... w ($N_{SF}^{PUCCH}$ −1)] where $N_{SF}^{PUCCH}$ = 3 | |
|---|---|
| OCC sequence index $n_{oc}^{(\tilde{p})}(n_s)$ | Orthogonal OCC sequence [w (0) ... w ($N_{SF}^{PUCCH}$ − 1)] |
| 0 | [1 1 1] |
| 1 | [1 $e^{j2\pi/3}$ $e^{j2\pi/4}$] |
| 2 | [1 $e^{j2\pi/4}$ $e^{j2\pi/3}$] |

TABLE C

| Orthogonal OCC sequence [w (0) ... w ($N_{SF}^{PUCCH}$ −1)] where $N_{SF}^{PUCCH}$ = 2 | |
|---|---|
| OCC sequence index $n_{oc}^{(\tilde{p})}(n_s)$ | Orthogonal OCC sequence [w (0) ... w ($N_{SF}^{PUCCH}$ − 1)] |
| 0 | [1 1] |
| 1 | [1 −1] |

The following uses the first formula group as an example to calculate the OCC sequence indexes and CS values of the terminal 1, terminal 2, and terminal 3, and the OCC sequence used by terminal 1, terminal 2, and terminal 3 may be calculated by combining the calculated OCC sequence indexes with Table A, Table B, and Table C.

For terminal 1, $n_{PUCCH}^{\tilde{p}}=0$, then $n'_{\tilde{p}}(n_s)=(n_{PUCCH}^{\tilde{p}})$ mod $(c \cdot N_{sc}^{RB}/\Delta_{shift}^{PUCCH})=0$, then $n_{oc}^{(\tilde{p})}(n_s)=\lfloor n'_{\tilde{p}}(n_s) \cdot \Delta_{shift}^{PUCCH}/N_{sc}^{RB}\rfloor=0$, that is, the data of the PUCCH and the OCC sequence index of the pilot are both 0. At this time, it can be determined that time-domain orthogonal spreading is performed among the corresponding 4 symbols carrying UCI of the 7 symbols through the OCC sequences with a length $N_{SF}^{PUCCH}$ of 4 and having the OCC sequence index of 0 shown in Table A; a time-domain orthogonal spreading is performed among the corresponding 3 symbols carrying R of the 7 symbols through the OCC sequences with a length $N_{SF}^{PUCCH}$ of 3 and having the OCC sequence index of 0 shown in Table A. In addition, $n_{cs}^{(\tilde{p})}$ ($n_s$, l)=[$n_{cs}^{cell}$ ($n_s$, l)+($n'_{\tilde{p}}(n_s) \cdot \Delta_{shift}^{PUCCH}$+($n_{oc}^{(\tilde{p})}$ ($n_s$) mod $\Delta_{shift}^{PUCCH}$)) mod $N_{sc}^{RB}$] mod $N_{sc}^{RB}$=[5,10,5,11,8,1,3,0,6, 0,0,2,5,8], the symbols corresponding to the index of the symbols l=0 to 13 are taken in sequence, and the value corresponding to l=7 to 13 is taken; or the values corresponding to the symbols occupied by PUCCH are directly calculated according to l=7 to 13. Alternatively, the $n_{cs}^{(\tilde{p})}(n_s,$ l)=[0,6,0,0,2,5,8] corresponding to symbols occupied by the PUCCH is obtained in case of l=7 to 13, and then the cyclic shift value of each symbol occupied by PUCCH is $\alpha_{\tilde{p}}(n_s, l)=2\pi \cdot n_{cs}^{(\tilde{p})}(n_s, l)/N_{sc}^{RB}$. In addition, the terminal 1 may calculate that the corresponding mapping RB index is $n_{PRB}=0$ according to the third formula (assuming the value of all offsets are 0). As such, the terminal 1 may transmit the PUCCH uplink information on the last 7 symbols of this slot and on the corresponding RB, according to the above determined OCC sequence and CS value.

The third formula is:

$$n_{PRB} = \begin{cases} \lfloor \frac{m}{2} \rfloor & \text{if } (m \bmod 2) \bmod 2 = 0 \\ N_{RB}^{UL} - 1 - \lfloor \frac{m}{2} \rfloor & \text{if } (m \bmod 2) \bmod 2 = 1 \end{cases} ; \text{or}$$

$$n_{PRB} = \begin{cases} \lfloor \frac{m}{2} \rfloor + N_{hop\text{-}offset1} & \text{if } (m \bmod 2) \bmod 2 = 0 \\ N_{RB}^{UL} - 1 - \lfloor \frac{m}{2} \rfloor - N_{hop\text{-}offset2} & \text{if } (m \bmod 2) \bmod 2 = 1 \end{cases} ;$$

where $$m = \left\lfloor \frac{n_{PUCCH}^{(\tilde{p})}}{c \cdot N_{SC}^{RB}/\Delta_{shift}^{PUCCH}} \right\rfloor \text{ or } m = \left\lfloor \frac{n_{PUCCH}^{(\tilde{p})} + N_{offset}}{c \cdot N_{SC}^{RB}/\Delta_{shift}^{PUCCH}} \right\rfloor ;$$

or, in the case that a frequency hopping is used, determining the RB index $n_{PRB}$ of the RB where the PUCCH is transmitted through a fourth formula below, and transmitting the PUCCH on the symbol and the RB corresponding to the RB index:

$$n_{PRB} = \begin{cases} \lfloor \frac{m}{2} \rfloor & \text{if } (m + f_{hop} \bmod 2) \bmod 2 = 0 \\ N_{RB}^{UL} - 1 - \lfloor \frac{m}{2} \rfloor & \text{if } (m + f_{hop} \bmod 2) \bmod 2 = 1 \end{cases} ; \text{or}$$

$$n_{PRB} = \begin{cases} \lfloor \frac{m}{2} \rfloor + N_{hop\text{-}offset1} & \text{if } (m + f_{hop} \bmod 2) \bmod 2 = 0 \\ N_{RB}^{UL} - 1 - \lfloor \frac{m}{2} \rfloor - N_{hop\text{-}offset2} & \text{if } (m + f_{hop} \bmod 2) \bmod 2 = 1 \end{cases} ;$$

where $$m = \left\lfloor \frac{n_{PUCCH}^{(\tilde{p})}}{c \cdot N_{SC}^{RB}/\Delta_{shift}^{PUCCH}} \right\rfloor \text{ or } m = \left\lfloor \frac{n_{PUCCH}^{(\tilde{p})} + N_{offset}}{c \cdot N_{SC}^{RB}/\Delta_{shift}^{PUCCH}} \right\rfloor ;$$

where $n_{PRB}$ represents the RB index of the RB for transmitting the PUCCH; $n_{PUCCH}^{\tilde{p}}$ represents an index number of the PUCCH at an antenna port $\tilde{p}$; $N_{sc}^{RB}$ represents a quantity of sub-carriers in one RB; $\Delta_{shift}^{PUCCH}$ presents a CS spacing preconfigured by a high-layer signaling; $N_{RB}^{UL}$ represents an uplink bandwidth or an uplink frequency hopping bandwidth; $f_{hop}$ represents an index of the frequency hopping part; $N_{offset}$ represents a staring position of the PUCCH resource preconfigured by a high-layer signaling, where a value of $N_{offset}$ is greater than or equal to 0, to be specific, it may be defined that the $N_{offset}$ does not exist in the third formula, and it is default that the calculation is always begin from the outermost edge of the frequency band; $N_{hop\text{-}offset1}$ and $N_{hop\text{-}offset2}$ represent uplink frequency hopping offsets, which are used to adjust the uplink frequency hopping bandwidth or the resource region of the PUCCH, the two parameters may be the same or different from each other, of course, the third formula may not include the two parameters; c has a pre-defined value, c has a same value for PUCCHs with different symbol lengths, or c has independent values for PUCCHs with different symbol lengths, or c has independent values for PUCCHs with different multiplexing capacities.

For terminal 2, $n_{PUCCH}^{\tilde{p}}=1$, then $n'_{\tilde{p}}(n_s)=(n_{PUCCH}^{\tilde{p}}) \bmod (c \cdot N_{sc}^{RB}/\Delta_{shift}^{PUCCH})=1$, then $n_{oc}^{(\tilde{p})}(n_s)= \lfloor n'_{\tilde{p}}(n_s) \cdot \Delta_{shift}^{PUCCH}/N_{sc}^{RB} \rfloor = 0$, that is, the data of the PUCCH and the OCC sequence index of the pilot are both 0, and the method of spreading frequency is the same with terminal 1. In addition, $n_{cs}^{(\tilde{p})}(n_s, l)=[n_{cs}^{cell}(n_s, l)+ (n'_{\tilde{p}}(n_s) \cdot \Delta_{shift}^{PUCCH}+(n_{oc}^{(\tilde{p})}(n_s) \bmod \Delta_{shift}^{PUCCH})) \bmod N_{sc}^{RB}] \bmod N_{sc}^{RB}=[5,10,5,11,8,1,3,2,8,2,2,4,7,0]$, the symbols corresponding to the index of the symbols l=0 to 13 are taken in sequence, and the value corresponding to l=7 to 13 is taken. Alternatively, the $n_{cs}^{(\tilde{p})(n_s}, l)=[2,8,2,2,4,7,0]$ corresponding to symbols occupied by the PUCCH is obtained in case of l=7 to 13, and then the cyclic shift value of each symbol occupied by PUCCH is $\alpha_{\tilde{p}}(n_s, l)=2\pi \cdot n_{cs}^{(\tilde{p})}(n_s, l)/N_{sc}^{RB}$, where l=7 to 13. In addition, the terminal 2 may calculate that the corresponding mapping RB index is $n_{PRB}=0$ according to the method of calculating the RB index of terminal 1. As such, the terminal 2 may transmit the PUCCH uplink information on the last 7 symbols of this slot and on the corresponding RB, according to the above determined OCC sequence and CS value.

For terminal 3, although it actually corresponds to c=2, it can still be assumed to be calculated according to c=3, so it can be calculated that $n'_{\tilde{p}}(n_s)=(n_{PUCCH}^{\tilde{p}}) \bmod (c \cdot N_{sc}^{RB}/\Delta_{shift}^{PUCCH})=2$ according to $n_{PUCCH}^{\tilde{p}}=20$, and then $n_{oc}^{(\tilde{p})}(n_s)= \lfloor n'_{\tilde{p}}(n_s) \cdot \Delta_{shift}^{PUCCH}/N_{sc}^{RB} \rfloor = 0$, that is, the data of the PUCCH and the OCC sequence index of the pilot are both 0. At this time, it can be determined that the time-domain orthogonal spreading is performed among the corresponding 2 symbols carrying UCI of the 5 symbols in the first group through the OCC sequences with a length $N_{SF}^{PUCCH}$ of 2 and having the OCC sequence index of 0 shown in Table C, and the time-domain orthogonal spreading is performed among the corresponding 3 symbols carrying R of the 5 symbols in the first group through the OCC sequences with a length $N_{SF}^{PUCCH}$ of 3 and having the OCC sequence index of 0 shown in Table B. It can also be determined that the time-domain orthogonal spreading is performed among the corresponding 3 symbols carrying UCI of the 5 symbols in the second group through the OCC sequences with a length $N_{SF}^{PUCCH}$ of 3 and having the OCC sequence index of 0 shown in Table B, and the time-domain orthogonal spreading is performed among the corresponding 2 symbols carrying R of the 5 symbols in the second group through the OCC sequences with a length $N_{SF}^{PUCCH}$ of 2 and having the OCC sequence index of 0 shown in Table C. In addition, $n_{cs}^{(\tilde{p})}(n_s, l)=[n_{cs}^{cell}(n_s, l)+n'_{\tilde{p}}(n_s) \cdot \Delta_{shift}^{PUCCH}+(n_{oc}^{(\tilde{p})}(n_s) \bmod \Delta_{shift}^{PUCCH})) \bmod N_{sc}^{RB}] \bmod N_{sc}^{RB}=[9,2,9,3,0,5,7,4,10,4,4,6,9,0]$, the symbols corresponding to the index of the symbols l=0 to 13 are taken in sequence, and the value corresponding to l=4 to 13 is taken. Alternatively, the $n_{cs}^{(\tilde{p})}(n_s, l)=[0,5,7,4,10,4,4,6,9,0]$ corresponding to symbols occupied by the PUCCH is directly obtained in case of l=4 to 13, and then the cyclic shift value of each symbol occupied by PUCCH is $\alpha_{\tilde{p}}(n_s, l)=2\pi \cdot n_{cs}^{(\tilde{p})}(n_s, l)/N_{sc}^{RB}$, where l=4 to 13. In addition, the terminal 3 may calculate that the corresponding mapping RB index is $n_{PRB}=N_{RB}^{UL}-1$ according to the method of calculating the RB index of terminal 1. As such, the terminal 3 may transmit the PUCCH uplink information on the last 10 symbols of this slot and on the corresponding RB, according to the above determined OCC sequence and CS value.

In addition, specifically, it needs to be explained here that although the OCC sequences of terminal 1 and terminal 2 are the same, the CS values on the same symbol are different and can be orthogonal, so they can be multiplexed and transmitted in the same RB. The base station determines the above-mentioned OCC sequence and CS value in the same manner, so that the PUCCH of the terminal 1 and the terminal 2 can be separated in the same resource. In addition, the length of the OCC sequence of terminal 3 is different from that of terminal 1 and terminal 2. Therefore, if the CS values are multiplexed and transmitted in the same RB, the mutual interference may be caused due to misalignment of the OCC sequence, the base station may ensure that terminals 3, terminal 1 and terminal 2 transmit in different RBs by configuring the applicable PUCCH resource index. For example, according to the above assumption of c=3, the maximum multiplexing capacity in an RB is $$c \cdot \frac{N_{sc}^{RB}}{\Delta_{shift}^{PUCCH}} = 18.$$

Therefore, when $n_{PUCCH}^{\tilde{p}}=20$, the RB position of terminal 3 shift is different from that of terminal 1 and terminal 2. Terminal 1 and terminal 2 are located at the RB of number 0, and terminal 3 is on the RB of number $N_{RB}^{UL}-1$. Therefore, although the length of the OCC sequence of terminal 3 is different from that of terminal 1 and terminal 2, there is no mutual influence due to the different work frequency domain resources.

In addition, when terminal 1 and terminal 2 use frequency hopping, for example, the frequency hopping position is between the third and fourth symbols, that is, URU| RURU, the first frequency hopping part contains 3 URU symbols and the second frequency hopping part contains 4 RURU symbols. Since the first frequency hopping part does not satisfy at least two Rs, the OCC sequence cannot be used, that is, the actual c=1 for terminal 1 and terminal 2 at this time. If terminal 3 uses frequency hopping, each group can be used as a frequency hopping part according to the grouping method described above, so its actual corresponding c=2, and the system performs resource indexing on the PUCCH with c=3, so terminals 1 to 3 can also assume c=3 to calculate the CS value according to the PUCCH resource index configured by the base station hereinabove (in order to avoid the situation where the OCC sequence index calculated by terminal 1 and terminal 2 is greater than 0, the base station may limit PUCCH resource index allocated to the terminal, for example, only PUCCH resource indexs with normalized numbers $n'_{\tilde{p}}$ 0 to 5 are assigned to terminal 1 and terminal 2 with c=1; in order to avoid the situation where the OCC sequence index calculated by terminal 3 is greater than 1, for example, only PUCCH resource indexs with normalized numbers $n'_{\tilde{p}}$ 0 to 10 are assigned to terminal 3 with c=2). Of course, it can also be defined at this time the terminal 1 and terminal 2 do not calculate the OCC sequence index (at this time, the base station avoid the crash of different terminals through a scheduler, so any PUCCH resource index assumed with the maximum c value in one RB may be configured, assuming that the terminal does not calculate OCC sequence index, so the PUCCH resource index with the OCC sequence index greater than 0 may also be allocated to the terminal, which is not limited herein). However, the terminal 3 needs to calculate the OCC sequence index, unless it is further agreed that the OCC sequence is not used when the frequency hopping is used. In addition, the first formula group or the third formula group can also be used to further calculate the CS value according to the index of the frequency hopping part. The specific calculation is similar to the above calculation process, which will not be described again. In addition, when the frequency hopping is used, terminals 1 to 3 can calculate the RB index of each RB corresponding to the frequency hopping part according to the third formula described above (of course, this is an example, and other methods for determining the RB index can refer to the third formula).

Second, for PUCCHs with different symbol lengths, the terminal determines the CS value of the PUCCH with the symbol length according to the number of OCC sequences supported by the PUCCH with the symbol length, that is, the PUCCH resource indexing is independent for the PUCCHs with different symbol lengths or the PUCCHs supporting different OCC sequence quantities (i.e., the PUCCHs with different multiple user multiplexing capacities in one RB). That is, for a PUCCH with a certain symbol length, the numbering of the PUCCH in each RB is performed according to the multiple user multiplexing capacity determined by the OCC sequence quantity assumed to be supported by the PUCCH with this symbol length; or for the PUCCH supporting a certain OCC sequence quantity, the number of the PUCCH in each RB is performed according to the multiple user multiplexing capacity assumed to be determined by this OCC sequence quantity. At this time, in order to avoid mutual interference caused by OCC sequences with different lengths, it is necessary to ensure that the frequency resource of the PUCCHs with different symbol lengths or the frequency resource of PUCCHs supporting different quantities of OCC sequences are not in the same RB.

For the above scenario, PUCCHs with different lengths correspond to different c values. When PUCCH does not use frequency hopping, the terminal 1 and terminal 2 perform the time domain spreading for the data and pilot using respectively the OCC sequences with lengths $N_{SF}^{PUCCH}$ of 4 and 3; terminal 3 can divide the data into two groups, the first group are the first 5 symbols, the second group are the last 5 symbols. In the first group, the time domain spreading is performed for the data and pilot using respectively the OCC sequences with lengths $N_{SF}^{PUCCH}$ of 2 and 3. In the second group, the time domain spreading is performed for the data and pilot using respectively the OCC sequences with lengths $N_{SF}^{PUCCH}$ of 3 and 2. The correspondence between the OCC sequence and the OCC sequence index corresponding to the data and the pilot is shown in Table A, Table B, and Table C.

The following uses the first formula group as an example to calculate the OCC sequence indexs and CS values of the terminal 1, terminal 2, and terminal 3, and the OCC sequence used by terminal 1, terminal 2, and terminal 3 may be calculated by combining the calculated OCC sequence indexs with Table A, Table B, and Table C.

For terminal 1, the corresponding c=3, $n_{PUCCH}^{\tilde{p}}=0$, then $n'_{\tilde{p}}(n_s)=(n_{PUCCH}^{\tilde{p}}) \bmod (c \cdot N_{sc}^{RB}/\Delta_{shift}^{PUCCH})=0$, then $n_{oc}^{(\tilde{p})}(n_s)=\lfloor n'_{\tilde{p}}(n_s)\Delta_{shift}^{PUCCH}/N_{sc}^{RB}\rfloor=0$, that is, the data of the PUCCH and the OCC sequence index of the pilot are both 0, the way of using the OCC sequence index may refer to the above description. In addition, $n_{cs}^{(\tilde{p})}(n_s, l)=[n_{cs}^{cell}(n_s, l)+(n'_{\tilde{p}}(n_s) \cdot \Delta_{shift}^{PUCCH}+(n_{oc}^{(\tilde{p})}(n_s) \bmod \Delta_{shift}^{PUCCH})) \bmod N_{sc}^{RB}] \bmod N_{sc}^{RB}=[5,10,5,11,8,1,3,0,6,0,0,2,5,8]$, the symbols corresponding to the index of the symbols l=0 to 13 are taken in sequence, and the value corresponding to l=7 to 13 is taken; or the $n_{cs}^{(\tilde{p})}(n_s, l)=[0,6,0,0,2,5,8]$ corresponding to symbols occupied by the PUCCH is directly obtained in case of l=7 to 13, and then the cyclic shift value of each symbol occupied by PUCCH is $\alpha_{\tilde{p}}(n_s, l)=2\pi \cdot n_{cs}^{(\tilde{p})}(n_s, l)/N_{sc}^{RB}$, where l=7 to 13. In addition, the terminal 1 may calculate that the corresponding mapping RB index is $n_{PRB}=0$ according to the third formula (assuming the value of all offsets are 0). As such, the terminal 1 may transmit the PUCCH uplink information on the last 7 symbols of this slot and on the corresponding RB, according to the above determined OCC sequence and CS value.

For terminal 2, the corresponding c=3, $n_{PUCCH}^{\tilde{p}}=1$, then $n'_{\tilde{p}}(n_s)=(n_{PUCCH}^{\tilde{p}}) \bmod(c \cdot N_{sc}^{RB}/\Delta_{shift}^{PUCCH})=1$, then $n_{oc}^{(\tilde{p})}(n_s)=\lfloor n'_{\tilde{p}}(n_s) \cdot \Delta_{shift}^{PUCCH}/N_{sc}^{RB} \rfloor=0$, that is, the data of the PUCCH and the OCC sequence index of the pilot are both 0, and the method of spreading frequency is the same with terminal 1. In addition, $n_{cs}^{(\tilde{p})}(n_s, l)=[n_{cs}^{cell}(n_s, l)+(n'_{\tilde{p}}(n_s) \cdot \Delta_{shift}^{PUCCH}+(n_{oc}^{(\tilde{p})}(n_s) \bmod \Delta_{shift}^{PUCCH})) \bmod N_{sc}^{RB}] \bmod N_{sc}^{RB}=[5,10,5,11,8,1,3,2,8,2,2,4,7,0]$, the symbols corresponding to the index of the symbols l=0 to 13 are taken in sequence, and the value corresponding to l=7 to 13 is taken. Alternatively, the $n_{cs}^{(\tilde{p})}(n_s, l)=[2,8,2,2,4,7,0]$ corresponding to symbols occupied by the PUCCH is obtained in case of l=7 to 13, and then the cyclic shift value of each symbol occupied by PUCCH is $\alpha_{\tilde{p}}(n_s, l)=2\pi \cdot n_{cs}^{(\tilde{p})}(n_s, l)/N_{sc}^{RB}$, where l=7 to 13. In addition, the terminal 2 may calculate that the corresponding mapping RB index is $n_{PRB}=0$ according to the third formula (assuming the value of all offsets are 0). As such, the terminal 1 may transmit the PUCCH uplink information on the last 7 symbols of this slot and on the corresponding RB, according to the above determined OCC sequence and CS value. As such, the terminal 2 may transmit the PUCCH uplink information on the last 7 symbols of this slot and on the corresponding RB, according to the above determined OCC sequence and CS value.

For terminal 3, the corresponding c=3, $n_{PUCCH}^{\tilde{p}}=20$, $n'_{\tilde{p}}(n_s)=(n_{PUCCH}^{\tilde{p}}) \bmod(c \cdot N_{sc}^{RB}/\Delta_{shift}^{PUCCH})=8$, and $n_{oc}^{(\tilde{p})}(n_s)=\lfloor n'_{\tilde{p}}(n_s) \cdot \Delta_{shift}^{PUCCH}/N_{sc}^{RB} \rfloor=1$ that is, the data of the PUCCH and the OCC sequence index of the pilot are both 1. At this time, it can be determined that the time-domain orthogonal spreading is performed among the corresponding 2 symbols carrying UCI of the 5 symbols in the first group through the OCC sequences with a length $N_{SF}^{PUCCH}$ of 2 and having the OCC sequence index of 1 shown in Table C, and the time-domain orthogonal spreading is performed among the corresponding 3 symbols carrying R of the 5 symbols in the first group through the OCC sequences with a length $N_{SF}^{PUCCH}$ of 3 and having the OCC sequence index of 1 shown in Table B. It can also be determined that the time-domain orthogonal spreading is performed among the corresponding 3 symbols carrying UCI of the 5 symbols in the second group through the OCC sequences with a length $N_{SF}^{PUCCH}$ of 3 and having the OCC sequence index of 1 shown in Table B, and the time-domain orthogonal spreading is performed among the corresponding 2 symbols carrying R of the 5 symbols in the second group through the OCC sequences with a length $N_{SF}^{PUCCH}$ of 2 and having the OCC sequence index of 1 shown in Table C. In addition, $n_{cs}^{(\tilde{p})}(n_s, l)=[n_{cs}^{cell}(n_s, l)+(n'_{\tilde{p}}(n_s) \cdot \Delta_{shift}^{PUCCH}+(n_{oc}^{(\tilde{p})}(n_s) \bmod \Delta_{shift}^{PUCCH})) \bmod N_{sc}^{RB}] \bmod N_{sc}^{RB}=[10,3,10,4,1,6,8,5,11,5,5,7,10,1]$, the symbols corresponding to the index of the symbols l=0 to 13 are taken in sequence, and the value corresponding to l=4 to 13 is taken. Alternatively, the $n_{cs}^{(\tilde{p})}(n_s, l)=[1,6,8,5,11,5,5,7,10,1]$ corresponding to symbols occupied by the PUCCH is directly obtained in case of l=4 to 13, and then the cyclic shift value of each symbol occupied by PUCCH is $\alpha_{\tilde{p}}(n_s, l)=2\pi \cdot n_{cs}^{(\tilde{p})}(n_s, l)/N_{sc}^{RB}$, where l=4 to 13. In addition, the terminal 3 may calculate that the corresponding mapping RB index is $n_{PRB}=N_{RB}^{UL}-1$ according to the formula 3. As such, the terminal 3 may transmit the PUCCH uplink information on the last 10 symbols of this slot and on the corresponding RB, according to the above determined OCC sequence and CS value.

In addition, specifically, it needs to be explained here that although the OCC sequences of terminal 1 and terminal 2 are the same, the CS values on the same symbol are different and can be orthogonal, so they can be multiplexed and transmitted in the same RB. The base station determines the above-mentioned OCC sequence and CS value in the same manner, so that the PUCCH of the terminal 1 and the terminal 2 can be separated in the same resource. In addition, the length of the OCC sequence of terminal 3 is different from that of terminal 1 and terminal 2. Therefore, if the CS values are multiplexed and transmitted in the same RB, the mutual interference may be caused due to misalignment of the OCC sequence, the base station may ensure that terminals 3 and terminal 1 and terminal 2 transmit in different RBs by configuring the applicable PUCCH resource index. For example, for terminal 3, c=3, the maximum multiplexing capacity in an RB is $$c \cdot \frac{N_{sc}^{RB}}{\Delta_{shift}^{PUCCH}} = 12;$$

for terminals 1 and 3, c=3, the maximum multiplexing capacity in an RB is $$c \cdot \frac{N_{sc}^{RB}}{\Delta_{shift}^{PUCCH}} = 18.$$

That is, the terminal 1, terminal 2 and terminal 3 determine the RB positions according to different multiplexing capacities. Therefore, when $n_{PUCCH}^{\tilde{p}}=20$, the RB position of terminal 3 is different from that of terminal 1 and terminal 2. Terminal 1 and terminal 2 are located at the RB of number 0, and terminal 3 is on the RB of number $N_{RB}^{UL}-1$. Therefore, although the length of the OCC sequence of terminal 3 is different from that of terminal 1 and terminal 2, there is no mutual influence due to the different work frequency domain resources.

In addition, when terminal 1 to terminal 3 use frequency hopping, it is assumed that the frequency hopping method is the same as the one described above. At this time, c=1 for terminals 1 and 2, c=2 for terminals 3, and terminals 1 to 3 can use the corresponding c value to reuse the first formula group, or can use the third formula group to further calculate the CS value and the corresponding OCC sequence index (for terminal 3) and RB position according to the index of the frequency hopping part, which is similar to the above calculation process, and will not be described again.

Method 2: when the CS value corresponding to the symbol is determined according to the CS configuration index configured according to the configuration signaling in the method 2, the configuration signaling can be received, and the CS configuration index can be obtained according to the configuration signaling; and then the CS index corresponding to the symbol is determined according to the CS configuration index. Finally, the CS value corresponding to the symbol is determined according to the CS index corresponding to the symbol.

Specifically, when determining the CS index corresponding to the symbol according to the CS configuration index, the CS index $n_{cs}^{(\tilde{p})}(l)$ corresponding to the symbol can be calculated by the following first formula and according to the CS configuration index and the index of the symbol:

$$n_{cs}^{(\tilde{p})}(l)=(CS_{init}+k\cdot l) \bmod N_{SC}^{RB}$$

where $n_{cs}^{(\tilde{p})}(l)$ represents the CS index corresponding to the symbol; $CS_{init}$ represents the CS configuration index; l represent the index of the symbol, and value range of l is from 0 to $N_{symb}^{UL}-1$, where $N_{symb}^{UL}$ represents a quantity of symbols in one time unit; k represents a coefficient value, where k is positive integer greater than or equal to 1; $N_{SC}^{RB}$ represents a quantity of sub-carriers in one RB; mod represents a remainder function.

In addition, when determining the CS index corresponding to the symbol according to the CS configuration index, the CS index corresponding to the symbol is determined according to a preset mapping between the index of the symbol and the CS configuration index and a table, where the table records the CS index corresponding to the index of each symbol in the time unit.

In addition, when determining the CS value corresponding to the symbol according to the CS index corresponding to the symbol, the CS value $\alpha_{\tilde{p}}(l)$ corresponding to the symbol is calculated according to the CS index corresponding to the symbol and through a second formula below:

$$\alpha_{\tilde{p}}(l)=2\pi \cdot n_{cs}^{(\tilde{p})}(l)/N_{sc}^{RB};$$

where $\alpha_{\tilde{p}}(l)$ represents the CS value corresponding to the symbol; $n_{cs}^{(\tilde{p})}(l)$ represents the CS index corresponding to the symbol; $N_{sc}^{RB}$ represents a quantity of sub-carriers in one RB.

In addition, it should be noted here that if the CS value is determined according to the second method, if the PUCCH is sent on the symbol according to the CS value, when the OCC sequence is determined to be used, the OCC sequence index can be determined according to the configuration signaling, or according to the CS configuration the index, the OCC sequence index is determined according to a preset formula or a preset table; then the OCC sequence corresponding to the OCC sequence index is determined according to the OCC sequence index; and finally the PUCCH is sent on the symbol according to the CS value and the OCC sequence.

The steps of determining the CS index corresponding to the symbol according to a preset mapping between the index of the symbol and the CS configuration index and a table will be described below by way of example.

For example, suppose that the CS configuration index obtained according to the configuration signaling is a configuration index used to determine which set of CS index values in the table, as shown in Table 1 or Table 2 or Table 3 below; or suppose that the CS configuration index obtained according to the configuration signaling is the CS index of a specific symbol in a time unit, for example, the CS index of the first symbol, and then sequentially define the CS indexes of subsequent symbols corresponding to the index, such as removing the first column from Table 1 or Table 2 or Table 3. At this time, the base station notifies the terminal of all or part of the CS index in the table according to the $\Delta_{shift}^{PUCCH}$ value. For example, $\Delta_{shift}^{PUCCH}=2$, and then the base station notifies the terminal of the index values in indexes 0, 2, 4, 6, 8 and 10, or notifies the terminal of the index values of 1, 3, 5, 7, 9 and 11; for example, $\Delta_{shift}^{PUCCH}=1$ the base station can choose any index value in the table to notify the terminal. Table 1 assumes that a time unit is 14 symbols, or that a time unit is a time slot and that a time slot contains 14 symbols. Tables 2 and 3 assume that a time unit is a time slot and that a time slot contains 7 symbols. If the terminal uses an OCC sequence, the above configuration signaling configures the terminal with an OCC sequence index while configuring the CS configuration index; or adds in Table 1 or Table 2 and Table 3 the combination relationship between different OCC sequence indexes and the CS index to corresponding to each symbol. Through the CS configuration index, the OCC sequence index and the CS value corresponding to the corresponding transmission symbol can be obtained from Table 1 or Table 2 or Table 3.

In addition, the base station can configure different CS indexes for different terminals through reasonable scheduling and allocation for multiplexing, and also need to indicate the corresponding RB location and OCC sequence index used for different terminals to achieve different terminals in the same Multiplexed transmission in one RB.

For example, the base station pre-configures four sets of resources for terminals 1 to 8 through high-layer signaling. The first set of resources contains {CS index=0, RB index=0, OCC sequence index=0}, and the second set of resources contains {CS index=2, RB index=0, OCC sequence index=0}, the third group of resources contains {CS index=4, RB index=0, OCC sequence index=0}, and the fourth group of resources contains {CS index=6, RB index=0, OCC sequence index=0}. Assume that the base station schedules terminal 1 to terminal 4 to perform PUCCH transmission at the same time. The base station sets an indication field in the DCI sent to terminal 1 to indicate the first group of resources in the above four groups, and sets it in the DCI sent to terminal 2. The indication field indicates the second group of resources in the above four groups of resources. The indication field indicates the third group of resources in the above-mentioned 4 groups of resources, and the indication field indicates the above-mentioned group of 4 resources in the DCI. For the fourth resource of the four resources, the corresponding terminal determines the corresponding resource group according to the indication information after receiving the DCI, and determines according to the CS index in the resource group according to Table 1, Table 2, and Table 3. The CS index of the corresponding PUCCH on each symbol. For example, the PUCCH of terminal 1 is 7 symbols in length and occupies the last 7 symbols of a slot (assuming that a slot contains 14 symbols). According to index=0 and Table 1 below, the CS index of the last 7 symbols transmitted is {8,9,10,11,0,1,2}, and the corresponding CS value is further determined according to the formula $\alpha_{\tilde{p}}(l)=2\pi \cdot n_{cs}^{(\tilde{p})}(l)/N_{sc}^{RB}$. If the transmission format is URURURU, it may be determined which CS index corresponds to the data and which CS index corresponds to the pilot according to the transmission format, so that on the RB indicated by the DCI, the PUCCH is sent using the determined CS value and the OCC sequence (if necessary). It should be noted here that the working methods of other terminals are the same. Of course, if a group of terminals does not need to use the OCC sequence, the pre-configured resource group may not include the OCC sequence index.

TABLE 1

| CS index | Symbol number | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| 0 | 0 | 1 | 2 | 3 | 4 | 5 | 6 | 7 | 8 | 9 | 10 | 11 | 0 | 1 | 2 |
| 1 | 1 | 2 | 3 | 4 | 5 | 6 | 7 | 8 | 9 | 10 | 11 | 0 | 1 | 2 | 3 |
| 2 | 2 | 3 | 4 | 5 | 6 | 7 | 8 | 9 | 10 | 11 | 0 | 1 | 2 | 3 | 4 |
| 3 | 3 | 4 | 5 | 6 | 7 | 8 | 9 | 10 | 11 | 0 | 1 | 2 | 3 | 4 | 5 |
| 4 | 4 | 5 | 6 | 7 | 8 | 9 | 10 | 11 | 0 | 1 | 2 | 3 | 4 | 5 | 6 |
| 5 | 5 | 6 | 7 | 8 | 9 | 10 | 11 | 0 | 1 | 2 | 3 | 4 | 5 | 6 | 7 |
| 6 | 6 | 7 | 8 | 9 | 10 | 11 | 0 | 1 | 2 | 3 | 4 | 5 | 6 | 7 | 8 |
| 7 | 7 | 8 | 9 | 10 | 11 | 0 | 1 | 2 | 3 | 4 | 5 | 6 | 7 | 8 | 9 |
| 8 | 8 | 9 | 10 | 11 | 0 | 1 | 2 | 3 | 4 | 5 | 6 | 7 | 8 | 9 | 10 |
| 9 | 9 | 10 | 11 | 0 | 1 | 2 | 3 | 4 | 5 | 6 | 7 | 8 | 9 | 10 | 11 |
| 10 | 10 | 11 | 0 | 1 | 2 | 3 | 4 | 5 | 6 | 7 | 8 | 9 | 10 | 11 | 0 |
| 11 | 11 | 0 | 1 | 2 | 3 | 4 | 5 | 6 | 7 | 8 | 9 | 10 | 11 | 0 | 1 |

TABLE 2

| CS index | Symbol number | | | | | | |
|---|---|---|---|---|---|---|---|
| | 0 | 1 | 2 | 3 | 4 | 5 | 6 |
| 0 | 0 | 1 | 2 | 3 | 4 | 5 | 6 |
| 1 | 1 | 2 | 3 | 4 | 5 | 6 | 7 |
| 2 | 2 | 3 | 4 | 5 | 6 | 7 | 8 |
| 3 | 3 | 4 | 5 | 6 | 7 | 8 | 9 |
| 4 | 4 | 5 | 6 | 7 | 8 | 9 | 10 |
| 5 | 5 | 6 | 7 | 8 | 9 | 10 | 11 |
| 6 | 6 | 7 | 8 | 9 | 10 | 11 | 0 |
| 7 | 7 | 8 | 9 | 10 | 11 | 0 | 1 |
| 8 | 8 | 9 | 10 | 11 | 0 | 1 | 2 |
| 9 | 9 | 10 | 11 | 0 | 1 | 2 | 3 |
| 10 | 10 | 11 | 0 | 1 | 2 | 3 | 4 |
| 11 | 11 | 0 | 1 | 2 | 3 | 4 | 5 |

TABLE 3

| CS index | Symbol number | | | | | | |
|---|---|---|---|---|---|---|---|
| | 0 | 1 | 2 | 3 | 4 | 5 | 6 |
| 0 | 0 | 2 | 4 | 6 | 8 | 10 | 0 |
| 1 | 1 | 3 | 5 | 7 | 9 | 11 | 1 |
| 2 | 2 | 4 | 6 | 8 | 10 | 0 | 2 |
| 3 | 3 | 5 | 7 | 9 | 11 | 1 | 3 |
| 4 | 4 | 6 | 8 | 10 | 0 | 2 | 4 |
| 5 | 5 | 7 | 9 | 11 | 1 | 3 | 5 |
| 6 | 6 | 8 | 10 | 0 | 2 | 4 | 6 |
| 7 | 7 | 9 | 11 | 1 | 3 | 5 | 7 |
| 8 | 8 | 10 | 0 | 2 | 4 | 6 | 8 |
| 9 | 9 | 11 | 1 | 3 | 5 | 7 | 9 |
| 10 | 10 | 0 | 2 | 4 | 6 | 8 | 10 |
| 11 | 11 | 1 | 3 | 5 | 7 | 9 | 11 |

So far, the specific process of determining the CS value of the symbol is completed.

According to the embodiment of the present disclosure, a symbol occupied by a PUCCH in a time unit is acquired, a CS value corresponding to the symbol is determined, and then the PUCCH on the symbol is transmitted according to the CS value, thereby determining clearly the CS value corresponding to the symbol and further ensuring that the CS values on different symbols are as different as possible, so as to achieve a randomization of interference, improve the transmission performance of PUCCH, ensure that the NR PUCCH with different lengths has the same CS acquisition method on the same symbol to support the multiplex transmission of NR PUCCHs with different lengths on the same RB, to reduce the system PUCCH resource overhead and solve the technical issue in the 5G NR system that the PUCCH transmission performance may be degraded since it is unable to acquire the CS value of the NR PUCCHs with different lengths on each symbol.

Second Embodiment

Figure 2:
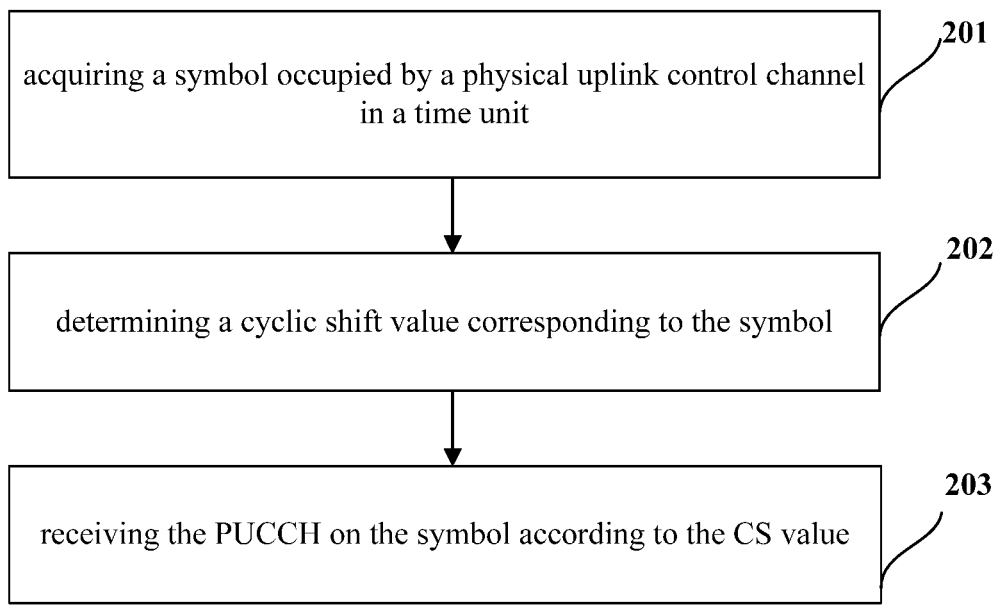
FIG. 2 is a flowchart of an information transmission method on a base station side in an embodiment of the present disclosure.

As shown in FIG. 2 which is a flowchart of an information transmission method on a base station side in an embodiment of the present disclosure, the method includes the following steps 201-203:

Step 201: acquiring a symbol occupied by a physical uplink control channel (PUCCH) in a time unit.

In this step, the base station obtains the symbols occupied by the PUCCH in a time unit.

Specifically, the time unit may be one or more time slots, or one subframe, or 14 symbols.

Step 202: determining a cyclic shift (CS) value corresponding to the symbol.

In this step, specifically, when determining the CS value corresponding to the symbol, the base station may determine the CS value corresponding to the symbol below two ways:

Method 1: determining the CS value corresponding to the symbol, according to an index of the symbol and a PUCCH resource index notified to a terminal by configuration information. Specifically, the configuration information may be sent through high-layer signaling, or may be sent through an indication field in the PDCCH. Of course, the configuration information involved in the initial access process may also be carried in the PBCH, SIB information, Msg2 or Msg4.

Manner 2: determining the CS value corresponding to the symbol, according to a CS configuration index notified to a terminal by a configuration signaling. Specifically, the configuration signaling may be sent through high-layer signaling, or may be sent through an indication field in the PDCCH. Of course, the configuration signaling involved in the initial access process may also be carried in the PBCH, SIB information, Msg2 or Msg4.

Step 203: receiving the PUCCH on the symbol according to the CS value.

In this step, specifically, when the terminal receives the PUCCH on the symbol according to the obtained CS value, the terminal can determine the RB index $n_{PRB}$ of the RB where the PUCCH is transmitted by using the following third formula, and receive the PUCCH through the symbol and the RB corresponding to the RB index;

$$n_{PRB} = \begin{cases} \lfloor \frac{m}{2} \rfloor & \text{if}(m \bmod 2) \bmod 2 = 0 \\ N_{RB}^{UL} - 1 - \lfloor \frac{m}{2} \rfloor & \text{if}(m \bmod 2) \bmod 2 = 1 \end{cases};$$

or $$n_{PRB} = \begin{cases} \lfloor \frac{m}{2} \rfloor + N_{hop-offset1} & \text{if}(m \bmod 2) \bmod 2 = 0 \\ N_{RB}^{UL} - 1 - \lfloor \frac{m}{2} \rfloor - N_{hop-offset2} & \text{if}(m \bmod 2) \bmod 2 = 1 \end{cases};$$

where $$m = \left\lfloor \frac{n_{PUCCH}^{(\tilde{p})}}{c \cdot N_{SC}^{RB} / \Delta_{shift}^{PUCCH}} \right\rfloor \text{ 或 } m = \left\lfloor \frac{n_{PUCCH}^{(\tilde{p})} + N_{offset}}{c \cdot N_{SC}^{RB} / \Delta_{shift}^{PUCCH}} \right\rfloor;$$

or in the case that a frequency hopping is used, determining the RB index $n_{PRB}$ of the RB where the PUCCH is transmitted through a fourth formula below, and transmitting the PUCCH on the symbol and the RB corresponding to the RB index:

$$n_{PRB} = \begin{cases} \lfloor \frac{m}{2} \rfloor & \text{if}(m + f_{hop} \bmod 2) \bmod 2 = 0 \\ N_{RB}^{UL} - 1 - \lfloor \frac{m}{2} \rfloor & \text{if}(m + f_{hop} \bmod 2) \bmod 2 = 1 \end{cases};$$

or $$n_{PRB} = \begin{cases} \lfloor \frac{m}{2} \rfloor + N_{hop-offset1} & \text{if}(m + f_{hop} \bmod 2) \bmod 2 = 0 \\ N_{RB}^{UL} - 1 - \lfloor \frac{m}{2} \rfloor - N_{hop-offset2} & \text{if}(m + f_{hop} \bmod 2) \bmod 2 = 1 \end{cases};$$

where $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

where $n_{PRB}$ represents the RB index of the RB for transmitting the PUCCH;

$n_{PUCCH}^{\tilde{p}}$ represents an index number of the PUCCH at an antenna port $\tilde{p}$;

$N_{sc}^{RB}$ represents a quantity of sub-carriers in one RB;

$\Delta_{shift}^{PUCCH}$ represents a CS spacing preconfigured by a high-layer signaling;

$N_{RB}^{UL}$ represents an uplink bandwidth or an uplink frequency hopping bandwidth;

$f_{hop}$ represents an index of the frequency hopping part;

$N_{offset}$ represents a staring position of the PUCCH resource preconfigured by a high-layer signaling, where a value of $N_{offset}$ is greater than or equal to 0;

$N_{hop-offset1}$ and $N_{hop-offset2}$ represent uplink frequency hopping offsets;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

According to the embodiment of the present disclosure, a CS value corresponding to the symbol is determined, and then the PUCCH on the symbol is transmitted according to the CS value, thereby determining clearly the CS value corresponding to the symbol and further ensuring that the CS values on different symbols are as different as possible, so as to achieve a randomization of interference, improve the transmission performance of PUCCH, ensure that the NR PUCCH with different lengths has the same CS acquisition method on the same symbol to support the multiplex transmission of NR PUCCHs with different lengths on the same RB, to reduce the system PUCCH resource overhead and solve the technical issue in the 5G NR system that the PUCCH transmission performance may be degraded since it is unable to acquire the CS value of the NR PUCCHs with different lengths on each symbol.

Specifically, how to determine the cyclic shift CS value corresponding to the symbol is described in detail below.

The specific methods for determining the CS value corresponding to the symbol in the foregoing manners 1 and 2 are respectively introduced below.

Method One:

When determining the CS value corresponding to the symbol according to the index of the symbol and the PUCCH resource index notified by the configuration information in the first method, the PUCCH resource index and the index of the symbol may be used, and further one or more factors such as the time unit number, terminal ID, the cell ID (the current cell ID or the cell ID configured by higher layer signaling) and the frequency hopping position may also be used for determining the CS value corresponding to the symbol. Specifically, there are four scenarios below:

Scenario 1:

determining the PUCCH resource index, and notifying the PUCCH resource index to the terminal by the configuration information; calculating the CS value $\alpha_{\tilde{p}}(n_s, l)$ corresponding to the symbol, according to the PUCCH resource index, the index of the symbol and an index of the time unit and through a first formula group below:

$$\alpha_{\tilde{p}}(n_s,l) = 2\pi \cdot n_{cs}^{(\tilde{p})}(n_s,l)/N_{sc}^{RB};$$

where $$n_{cs}^{(\tilde{p})}(n_s,l) = [n_{cs}^{cell}(n_s,l) + (n'_{\tilde{p}}(n_s) \cdot \Delta_{shift}^{PUCCH} + (n_{oc}^{(\tilde{p})}(n_s) \bmod \Delta_{shift}^{PUCCH})) \bmod N_{sc}^{RB}] \bmod N_{sc}^{RB};$$

where $$n_{oc}^{(\tilde{p})}(n_s) = \lfloor n'_{\tilde{p}}(n_s) \cdot \Delta_{shift}^{PUCCH}/N_{sc}^{RB} \rfloor;$$

$$n'_{\tilde{p}}(n_s) = (n_{PUCCH}^{\tilde{p}}) \bmod (c \cdot N_{sc}^{RB}/\Delta_{shift}^{PUCCH});$$

$$n_{cs}^{cell}(n_s,l) = \Sigma_{i=0}^{7} c(8N_{symb}^{UL} \cdot n_s + 8l + i) \cdot 2^i;$$

or, calculating the CS value $\alpha_{\tilde{p}}(n_s, l)$ corresponding to the symbol, according to the PUCCH resource index, the index of the symbol and an index of the time unit and through a second formula group below:

$$\alpha_{\tilde{p}}(n_s,l) = 2\pi \cdot n_{cs}^{(\tilde{p})}(n_s,l)/N_{sc}^{RB};$$

where $$n_{cs}^{(\tilde{p})}(n_s,l)=[n_{cs}^{cell}(n_s,l)+(n'_{\tilde{p}}(n_s)\cdot\Delta_{shift}^{PUCCH})\mod N_{sc}^{RB}] \mod N_{sc}^{RB};$$

where $$n'_{\tilde{p}}(n_s)=(n_{PUCCH}^{\tilde{p}})\mod(c\cdot N_{sc}^{RB}/\Delta_{shift}^{PUCCH});$$

$$n_{cs}^{cell}(n_s,l)=\Sigma_{i=0}^{7}c(8N_{symb}^{UL}\cdot n_s+8l+i)\cdot 2^i;$$

where $\alpha_{\tilde{p}}(n_s, l)$ represents the CS value corresponding to the symbol;

$n_{cs}^{\tilde{p}}(n_s, 1)$, $n'_{\tilde{p}}(n_s)$ and $n_{cs}^{cell}(n_s, 1)$ represent intermediate parameters;

$n_{oc}^{(\tilde{p})}(n_s)$ represents an Orthogonal Cover Code (OCC) sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one resource block (RB);

$\Delta_{shift}^{PUCCH}$ represents a CS spacing preconfigured by a high-layer signaling;

$N_{symb}^{UL}$ represents a quantity of symbols in one time unit;

$n_s$ represents the index of the time unit;

l represents an index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

In addition, specifically, for the second formula group, it is applicable when the PUCCH does not use the OCC sequence.

Scenario 2:

determining the PUCCH resource index, and notifying the PUCCH resource index to the terminal by the configuration information; calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a third formula group below:

$$\alpha_{\tilde{p}}(n_s,f_{hop},l)=2\pi\cdot n_{cs}^{(\tilde{p})}(n_s,f_{hop},l)/N_{sc}^{RB};$$

where $$n_{cs}^{(\tilde{p})}(n_s,f_{hop},l)=[n_{cs}^{cell}(n_s,l)+(n'_{\tilde{p}}(n_s,f_{hop})\cdot\Delta_{shift}^{PUCCH}+(n_{oc}^{(\tilde{p})}(n_s,f_{hop})\mod\Delta_{shift}^{PUCCH}))\mod N_{sc}^{RB}] \mod N_{sc}^{RB}$$

where $$n_{oc}^{(\tilde{p})}(n_s,f_{hop})=\lfloor n'_{\tilde{p}}(n_s,f_{hop})\cdot\Delta_{shift}^{PUCCH}/N_{sc}^{RB}\rfloor;$$

$$n_{cs}^{cell}(n_s,l)=\Sigma_{i=0}^{7}c(8N_{symb}^{UL}\cdot n_s+8l+i)\cdot 2^i;$$

in the case that a frequency hopping is used and the time unit includes two frequency hopping parts, for a first frequency hopping part or when $f_{hop}$ mod 2=0, $$n'_{\tilde{p}}(n_s,f_{hop})=(n_{PUCCH}^{\tilde{p}})\mod(c\cdot N_{SC}^{RB}/\Delta_{shift}^{PUCCH});$$

for a second frequency hopping part or when $f_{hop}$ mod 2=1, $$n'_{\tilde{p}}(n_s, f_{hop}) = [c(n'_{\tilde{p}}(n_s, f_{hop}-1)+1)]\mod\left(c\cdot\frac{N_{SC}^{RB}}{\Delta_{shift}^{PUCCH}}+1\right)-1;$$

or, calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a fourth formula group below:

$$\alpha_{\tilde{p}}(n_s,f_{hop},l)=2\pi\cdot n_{cs}^{(\tilde{p})}(n_s,f_{hop},l)/N_{sc}^{RB};$$

where $$n_{cs}^{(\tilde{p})}(n_s,f_{hop},l)=[n_{cs}^{cell}(n_s,l)+(n'_{\tilde{p}}(n_s,f_{hop})\cdot\Delta_{shift}^{PUCCH}) \mod N_{sc}^{RB}] \mod N_{sc}^{RB};$$

where $$n_{cs}^{cell}(n_s,l)=\Sigma_{i=0}^{7}c(8N_{symb}^{UL}\cdot n_s+8l+i)\cdot 2^i;$$

in the case that a frequency hopping is used and the time unit includes two frequency hopping parts, for a first frequency hopping part or when $f_{hop}$ mod 2=0, $$n'_{\tilde{p}}(n_s,f_{hop})=(n_{PUCCH}^{\tilde{p}})\mod(c\cdot N_{SC}^{RB}/\Delta_{shift}^{PUCCH});$$

for a second frequency hopping part or when $f_{hop}$ mod 2=1, $$n'_{\tilde{p}}(n_s, f_{hop}) = [c(n'_{\tilde{p}}(n_s, f_{hop}-1)+1)]\mod\left(c\cdot\frac{N_{SC}^{RB}}{\Delta_{shift}^{PUCCH}}+1\right)-1;$$

where $\alpha_{\tilde{p}}(n_s, f_{hop}, l)$ represents the CS value corresponding to the symbol;

$n_{cs}^{(\tilde{p})}(n_s, f_{hop}, 1)$, $n_{cs}^{cell}(n_s, 1)$ and $n'_{\tilde{p}}(n_s, f_{hop})$ represent intermediate parameters;

$n_{oc}^{\tilde{p}}(n_s, f_{hop})$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$N_{symb}^{UL}$ represents a quantity of symbols in one time unit;

$f_{hop}$ represents the index of the frequency hopping part;

$n_s$ represents the index of the time unit;

l represents an index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

In addition, specifically, for the fourth formula group, it is applicable when the PUCCH does not use an OCC sequence.

Scenario 3:

determining the PUCCH resource index, and notifying the PUCCH resource index to the terminal by the configuration information; calculating the CS value $\alpha_{\tilde{p}}(l)$ corresponding to the symbol, according to the PUCCH resource index and the index of the symbol and through a fifth formula group below:

$$\alpha_{\tilde{p}}(l)=2\pi \cdot n_{cs}^{(\tilde{p})}(l)/N_{sc}^{RB};$$

where $$n_{cs}^{(\tilde{p})}(l)=[n_{cs}^{cell}(l)+(n'_{\tilde{p}} \cdot \Delta_{shift}^{PUCCH}+(n_{oc}^{(\tilde{p})} \bmod \Delta_{shift}^{PUCCH})) \bmod N_{sc}^{RB}] \bmod N_{sc}^{RB};$$

where $$n_{oc}^{(\tilde{p})}=\lfloor n'_{\tilde{p}} \cdot \Delta_{shift}^{PUCCH}/N_{sc}^{RB} \rfloor;$$

$$n'_{\tilde{p}}=(n_{PUCCH}^{\tilde{p}}) \bmod (c \cdot N_{sc}^{RB}/\Delta_{shift}^{PUCCH});$$

$$n_{cs}^{cell}(l)=\Sigma_{i=0}^{7} c(8l+i) \cdot 2^i;$$

or, calculating the CS value $\alpha_{\tilde{p}}(l)$ corresponding to the symbol, according to the PUCCH resource index and the index of the symbol and through a sixth formula group below:

$$\alpha_{\tilde{p}}(l)=2\pi \cdot n_{cs}^{(\tilde{p})}(l)/N_{sc}^{RB};$$

where $$n_{cs}^{(\tilde{p})}(l)=[n_{cs}^{cell}(l)+(n'_{\tilde{p}} \cdot \Delta_{shift}^{PUCCH}) \bmod N_{sc}^{RB}] \bmod N_{sc}^{RB};$$

where $$n'_{\tilde{p}}=(n_{PUCCH}^{\tilde{p}}) \bmod (N_{sc}^{RB}/\Delta_{shift}^{PUCCH});$$

$$n_{cs}^{cell}(l)=\Sigma_{i=0}^{7} c(8l+i) \cdot 2^i;$$

where $\alpha_{\tilde{p}}(l)$ represents the CS value corresponding to the symbol;

$n_{cs}^{\tilde{p}}(l)$, $n'_{\tilde{p}}$ and $n_{cs}^{cell}(l)$ represent intermediate parameters;

$n_{oc}^{(\tilde{p})}$ represents an OCC sequence index;

c( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

In addition, specifically, for the six formula group, it is applicable when the PUCCH does not use the OCC sequence.

Scenario 4:

determining the PUCCH resource index, and notifying the PUCCH resource index to the terminal by the configuration information; calculating the CS value $\alpha_{\tilde{p}}(f_{hop}, l)$, according to the PUCCH resource index, the index of the symbol and an index of the frequency hopping part and through a seventh formula group below:

$$\alpha_{\tilde{p}}(f_{hop},l)=2\pi \cdot n_{cs}^{(\tilde{p})}(f_{hop},l)/N_{sc}^{RB};$$

where $$n_{cs}^{(\tilde{p})}(f_{hop},l)=[n_{cs}^{cell}(l)+(n'_{\tilde{p}}(f_{hop}) \cdot \Delta_{shift}^{PUCCH}+(n_{oc}^{(\tilde{p})}(f_{hop})) \bmod \Delta_{shift}^{PUCCH})) \bmod N_{sc}^{RB}] \bmod N_{sc}^{RB}$$

where $$n_{oc}^{(\tilde{p})}(f_{hop})=\lfloor n'_{\tilde{p}}(f_{hop}) \cdot \Delta_{shift}^{PUCCH}/N_{sc}^{RB} \rfloor;$$

$$n_{cs}^{cell}(l)=\Sigma_{i=0}^{7} c(8l+i) \cdot 2^i;$$

in the case that a frequency hopping is used and the time unit includes two frequency hopping parts, for a first frequency hopping part or when $f_{hop} \bmod 2=0$, $$n'_{\tilde{p}}(f_{hop})=(n_{PUCCH}^{\tilde{p}}) \bmod (c \cdot N_{sc}^{RB}/\Delta_{shift}^{PUCCH});$$

for a second frequency hopping part or when $f_{hop} \bmod 2=1$, $$n'_{\tilde{p}}(f_{hop}) = [c(n'_{\tilde{p}}(f_{hop}-1)+1)] \bmod \left( c \cdot \frac{N_{SC}^{RB}}{\Delta_{shift}^{PUCCH}} + 1 \right) - 1;$$

or calculating the CS value $\alpha_{\tilde{p}}(f_{hop}, l)$, according to the PUCCH resource index, the index of the symbol and an index of the frequency hopping part and through a eighth formula group below:

$$\alpha_{\tilde{p}}(f_{hop}, l) = 2\pi \cdot n_{cs}^{(\tilde{p})}(f_{hop}, l)/N_{sc}^{RB};$$

where $$n_{cs}^{(\tilde{p})}(f_{hop}, l) = [n_{cs}^{cell}(l) + (n'_{\tilde{p}}(f_{hop}) \cdot \Delta_{shift}^{PUCCH}) \bmod N_{sc}^{RB}] \bmod N_{sc}^{RB}$$

where $$n_{cs}^{cell}(l) = \Sigma_{i=0}^{7} c(8l+i) \cdot 2^i;$$

in the case that a frequency hopping is used and the time unit includes two frequency hopping parts, for a first frequency hopping part or when $f_{hop} \bmod 2 = 0$, $$n'_{\tilde{p}}(f_{hop}) = (n_{PUCCH}^{\tilde{p}}) \bmod (c \cdot N_{SC}^{RB}/\Delta_{shift}^{PUCCH});$$

for a second frequency hopping part or when $f_{hop} \bmod 2 = 1$, $$n'_{\tilde{p}}(f_{hop}) = [c(n'_{\tilde{p}}(f_{hop}-1)+1)] \bmod \left(c \cdot \frac{N_{SC}^{RB}}{\Delta_{shift}^{PUCCH}} + 1\right) - 1;$$

where $\alpha_{\tilde{p}}(f_{hop}, l)$ represents the CS value corresponding to the symbol;

$n_{cs}^{(\tilde{p})}(f_{hop}, l)$, $n_{cs}^{cell}(l)$ and $n'_{\tilde{p}}(f_{hop})$ represent intermediate parameters;

$n_{oc}^{\tilde{p}}(f_{hop})$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$f_{hop}$ represents the index of the frequency hopping part;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

Specifically, the value of c is determined according to a quantity or length of the OCC sequence. The value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths; or the value of c is determined according to the length of the OCC sequence corresponding to the PUCCH with each symbol length, or the value of c is determined according to the quantity of the OCC sequence corresponding to the PUCCH with each symbol length; or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

In addition, specifically, for the eighth formula group, it is applicable when the PUCCH does not use the OCC sequence.

In addition, when the CS value is calculated according to any of the above four scenarios, when the PUCCH is sent on the symbol according to the CS value, when it is determined to use the OCC sequence, the OCC sequence corresponding to the OCC sequence index is determined according to the OCC sequence index, and then the PUCCH is sent on the symbol according to the CS value and OCC sequence.

In this way, the base station determines a PUCCH resource index, and notifies the terminal through a signaling (for example, A or A groups PUCCH resource indexs is pre-configured to the terminal by the RRC signaling, and the indication field in the DCI indicates one or a group of resources to the terminal). According to the obtained PUCCH resource index, the terminal calculates a CS value of each symbol in a time unit according to the foregoing formula group (one of the first formula group to the eighth formula group). If it is determined that the PUCCH uses the OCC sequence, it is also necessary to determine the OCC sequence index according to the above formula group (the formula group including the calculation formula of the OCC sequence index from the first formula group to the eighth formula group), and determine the corresponding OCC sequence according to the OCC sequence index, the terminal transmits the PUCCH on the corresponding symbol in the time unit according to the determined CS value and OCC sequence. The PUCCH may be transmitted on all symbols in the time unit, or may be transmitted only on some symbols in the time unit. If transmitted only on some symbols, it is able to determine only the symbols used to transmit PUCCH symbols according to the above formula group. CS value (i.e., it is not necessary to determine the CS values of all symbols in the time unit). In addition, for a PUCCH that supports the frequency hopping, if it is agreed or configured to use frequency hopping, it is assumed that the PUCCH is divided into two frequency hopping parts, and the CS values and OCC sequences of different frequency hopping parts can be further randomized. For example, using a third formula group or the seventh formula group. Of course, different frequency hopping parts can also use the same OCC sequence, for example, use the first formula group or the fifth formula group. In the first formula group and the third formula group, the value of $n_{cs}^{cell}(n_s, l)$ changes with the time unit number and the number of symbols in the time unit. The CS value at the same symbol position in different time units may be different. The corresponding OCC sequences in different time units may also be different, so that further randomization can be achieved. In the fifth formula group and the seventh formula group, the value of $n_{cs}^{cell}(l)$ changes only with the number of symbols in the time unit. Therefore, the CS value at the same symbol position in each time unit is the same. The corresponding OCC sequence in each time unit is also the same, and are all obtained according to the same rule.

What is described here is that for the specific implementation in the first method, reference may be made to the example description of the foregoing scenario in the first embodiment, and details are not described herein again.

Method 2: when the CS value corresponding to the symbol is determined according to the CS configuration index configured according to the configuration signaling in the method 2, the configuration signaling can be received, and the CS configuration index can be obtained according to the configuration signaling; and then the CS index corresponding to the symbol is determined according to the CS configuration index. Finally, the CS value corresponding to the symbol is determined according to the CS index corresponding to the symbol.

Specifically, when determining the CS index corresponding to the symbol according to the CS configuration index, the CS index $n_{cs}^{(\tilde{p})}(l)$ corresponding to the symbol can be calculated by the following first formula and according to the CS configuration index and the index of the symbol:

$$n_{cs}^{(\tilde{p})}(l)=(CS_{init}+k\cdot l) \bmod N_{SC}^{RB}$$

where $n_{cs}^{(\tilde{p})}(l)$ represents the CS index corresponding to the symbol; $CS_{init}$ represents the CS configuration index; l represent the index of the symbol, and a value range of l is from 0 to $N_{symb}^{UL}-1$, where $N_{symb}^{UL}$ represents a quantity of symbols in one time unit; k represents a coefficient value, where k is positive integer greater than or equal to 1; $N_{SC}^{RB}$ represents a quantity of sub-carriers in one RB; mod represents a remainder function.

In addition, when determining the CS index corresponding to the symbol according to the CS configuration index, the CS index corresponding to the symbol is determined according to a preset mapping between the index of the symbol and the CS configuration index and a table, where the table records the CS index corresponding to the index of each symbol in the time unit.

In addition, when determining the CS value corresponding to the symbol according to the CS index corresponding to the symbol, the CS value $\alpha_{\tilde{p}}(l)$ corresponding to the symbol is calculated according to the CS index corresponding to the symbol and through a second formula below:

$$\alpha_{\tilde{p}}(l)=2\pi\cdot n_{cs}^{(\tilde{p})}(l)/N_{sc}^{RB};$$

where $\alpha_{\tilde{p}}(l)$ represents the CS value corresponding to the symbol; $n_{cs}^{(\tilde{p})}(l)$ represents the CS index corresponding to the symbol; $N_{sc}^{RB}$ represents a quantity of sub-carriers in one RB.

In addition, it should be noted here that if the CS value is determined according to the second method, if the PUCCH is sent on the symbol according to the CS value, when the OCC sequence is determined to be used, the OCC sequence index can be determined according to the configuration signaling, or according to the CS configuration the index, the OCC sequence index is determined according to a preset formula or a preset table; then the OCC sequence corresponding to the OCC sequence index is determined according to the OCC sequence index; and finally the PUCCH is sent on the symbol according to the CS value and the OCC sequence.

It should be noted here that, for an example of the steps for determining the CS index corresponding to a symbol according to the preset mapping between the index of the symbol and the CS configuration index and a table, reference may be made to relevant parts in the first embodiment. This will not be repeated here.

So far, the specific process of determining the CS value of the symbol is completed.

According to the embodiment of the present disclosure, a symbol occupied by a PUCCH in a time unit is acquired, a CS value corresponding to the symbol is determined, and then the PUCCH on the symbol is transmitted according to the CS value, thereby determining clearly the CS value corresponding to the symbol and further ensuring that the CS values on different symbols are as different as possible, so as to achieve a randomization of interference, improve the transmission performance of PUCCH, ensure that the NR PUCCH with different lengths has the same CS acquisition method on the same symbol to support the multiplex transmission of NR PUCCHs with different lengths on the same RB, to reduce the system PUCCH resource overhead and solve the technical issue in the 5G NR system that the PUCCH transmission performance may be degraded since it is unable to acquire the CS value of the NR PUCCHs with different lengths on each symbol.

Figure 3:
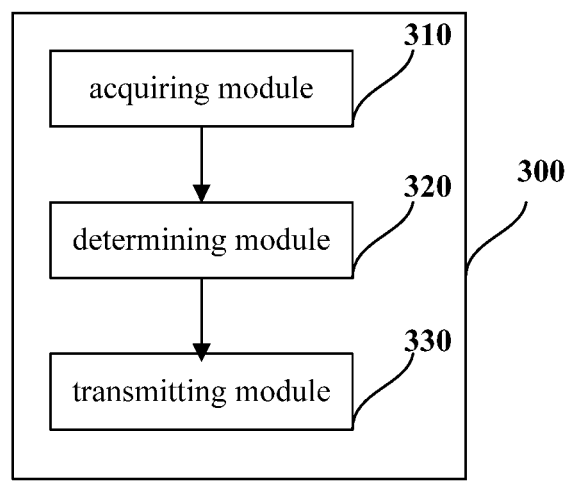
FIG. 3 is a schematic block diagram of a terminal in an embodiment of the present disclosure.

As shown in FIG. 3, a terminal 300 is provided in an embodiment of the present disclosure provides, including: an acquiring module 310, configured to acquire a symbol occupied by a physical uplink control channel (PUCCH) in a time unit; a determining module 320, configured to determine a cyclic shift (CS) value corresponding to the symbol; and a transmitting module 330, configured to transmit the PUCCH on the symbol according to the CS value.

The Determining Module 320 Includes:

a first determining unit, configured to determine the CS value corresponding to the symbol, according to an index of the symbol and a PUCCH resource index notified by configuration information;

or a second determining unit, configured to determine the CS value corresponding to the symbol, according to a CS configuration index configured by a configuration signaling.

The first determining unit is configured to:

calculate the CS value $\alpha_{\tilde{p}}(n_s, l)$ corresponding to the symbol, according to the PUCCH resource index, the index of the symbol and an index of the time unit and through a first formula group below:

$$\alpha_{\tilde{p}}(n_s,l)=2\pi\cdot n_{cs}^{(\tilde{p})}(n_s,l)/N_{sc}^{RB};$$

where $$n_{cs}^{(\tilde{p})}(n_s,l)=[n_{cs}^{cell}(n_s,l)+(n'_{\tilde{p}}(n_s)\cdot\Delta_{shift}^{PUCCH}+(n_{oc}^{(\tilde{p})}(n_s) \bmod \Delta_{shift}^{PUCCH})) \bmod N_{sc}^{RB}] \bmod N_{sc}^{RB};$$

where $$n_{oc}^{(\tilde{p})}(n_s)=\lfloor n'_{\tilde{p}}(n_s)\cdot\Delta_{shift}^{PUCCH}/N_{sc}^{RB}\rfloor;$$

$$n'_{\tilde{p}}(n_s)=(n_{PUCCH}^{\tilde{p}}) \bmod (c\cdot N_{sc}^{RB}/\Delta_{shift}^{PUCCH});$$

$$n_{cs}^{cell}(n_s,l)=\Sigma_{i=0}^{7}c(8N_{symb}^{UL}\cdot n_s+8l+i)\cdot 2^i;$$

or, calculating the CS value $\alpha_{\tilde{p}}(n_s, l)$ corresponding to the symbol, according to the PUCCH resource index, the index of the symbol and an index of the time unit and through a second formula group below:

$$\alpha_{\tilde{p}}(n_s,l)=2\pi\cdot n_{cs}^{(\tilde{p})}(n_s,l)/N_{sc}^{RB};$$

where $$n_{cs}^{(\tilde{p})}(n_s,l)=[n_{cs}^{cell}(n_s,l)+(n'_{\tilde{p}}(n_s)\cdot\Delta_{shift}^{PUCCH}) \bmod N_{sc}^{RB}] \bmod N_{sc}^{RB};$$

where $$n'_{\tilde{p}}(n_s)=(n_{PUCCH}^{\tilde{p}}) \bmod (c\cdot N_{sc}^{RB}/\Delta_{shift}^{PUCCH});$$

$$n_{cs}^{cell}(n_s,l)=\Sigma_{i=0}^{7}c(8N_{symb}^{UL}\cdot n_s+8l+i)\cdot 2^i;$$

where $\alpha_{\tilde{p}}(n_s, l)$ represents the CS value corresponding to the symbol;

$n_{cs}^{\tilde{p}}(n_s, l)$, $n'_{\tilde{p}}(n_s)$ and $n_{cs}^{cell}(n_s, l)$ represent intermediate parameters;

$n_{oc}^{(\tilde{p})}(n_s)$ represents an Orthogonal Cover Code (OCC) sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one resource block (RB);

$\Delta_{shift}^{PUCCH}$ represents a CS spacing preconfigured by a high-layer signaling;

$N_{symb}^{UL}$ represents a quantity of symbols in one time unit;

$n_s$ represents the index of the time unit;

l represents an index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

The first determining unit is configured to:

calculate the CS value $\alpha_{\tilde{p}}(n_s, f_{hop}, l)$ corresponding to the symbol, according to the PUCCH resource index, the index of the symbol, an index of the time unit and an index of the frequency hopping part and through a third formula group below:

$\alpha_{\tilde{p}}(n_s, f_{hop}, l) = 2\pi \cdot n_{cs}^{(\tilde{p})}(n_s, f_{hop}, l)/N_{sc}^{RB}$;

where $n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH} + (n_{oc}^{(\tilde{p})}(n_s, f_{hop})) \mod \Delta_{shift}^{PUCCH})) \mod N_{sc}^{RB}]$
$\mod N_{sc}^{RB}$ where $n_{oc}^{(\tilde{p})}(n_s, f_{hop}) = \lfloor n'_{\tilde{p}}(n_s, f_{hop}) \cdot \Delta_{shift}^{PUCCH}/N_{sc}^{RB} \rfloor$;

$n_{cs}^{cell}(n_s, l) = \Sigma_{i=0}^{7} c(8N_{symb}^{UL} \cdot n_s + 8l + i) \cdot 2^i$;

in the case that a frequency hopping is used and the time unit includes two frequency hopping parts, for a first frequency hopping part or when $f_{hop} \mod 2 = 0$, $n'_{\tilde{p}}(n_s, f_{hop}) = (n_{PUCCH}^{\tilde{p}}) \mod (c \cdot N_{SC}^{RB}/\Delta_{shift}^{PUCCH})$;

for a second frequency hopping part or when $f_{hop} \mod 2 = 1$, $$n'_{\tilde{p}}(n_s, f_{hop}) = [c(n'_{\tilde{p}}(n_s, f_{hop} - 1) + 1)] \mod \left(c \cdot \frac{N_{SC}^{RB}}{\Delta_{shift}^{PUCCH}} + 1\right) - 1;$$

or, calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a fourth formula group below:

$\alpha_{\tilde{p}}(n_s, f_{hop}, l) = 2\pi \cdot n_{cs}^{(\tilde{p})}(n_s, f_{hop}, l)/N_{sc}^{RB}$;

where $n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH}) \mod N_{sc}^{RB}] \mod N_{sc}^{RB}$;

where $n_{cs}^{cell}(n_s, l) = \Sigma_{i=0}^{7} c(8N_{symb}^{UL} \cdot n_s + 8l + i) \cdot 2^i$;

in the case that a frequency hopping is used and the time unit includes two frequency hopping parts, for a first frequency hopping part or when $f_{hop} \mod 2 = 0$, $n'_{\tilde{p}}(n_s, f_{hop}) = (n_{PUCCH}^{\tilde{p}}) \mod (c \cdot N_{SC}^{RB}/\Delta_{shift}^{PUCCH})$;

for a second frequency hopping part or when $f_{hop} \mod 2 = 1$, $$n'_{\tilde{p}}(n_s, f_{hop}) = [c(n'_{\tilde{p}}(n_s, f_{hop} - 1) + 1)] \mod \left(c \cdot \frac{N_{SC}^{RB}}{\Delta_{shift}^{PUCCH}} + 1\right) - 1;$$

where $\alpha_{\tilde{p}}(n_s, f_{hop}, l)$ represents the CS value corresponding to the symbol;

$n_{cs}^{(\tilde{p})}(n_s, f_{hop}, l)$, $n_{cs}^{cell}(n_s, l)$ and $n'_{\tilde{p}}(n_s, f_{hop})$ represent intermediate parameters;

$n_{oc}^{\tilde{p}}(n_s, f_{hop})$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$N_{symb}^{UL}$ represents a quantity of symbols in one time unit;

$f_{hop}$ represents the index of the frequency hopping part;

$n_s$ represents the index of the time unit;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

The first determining unit is configured to:

calculate the CS value $\alpha_{\tilde{p}}(l)$ corresponding to the symbol, according to the PUCCH resource index and the index of the symbol and through a fifth formula group below:

$\alpha_{\tilde{p}}(l) = 2\pi \cdot n_{cs}^{(\tilde{p})}(l)/N_{sc}^{RB}$;

where $n_{cs}^{(\tilde{p})}(l) = [n_{cs}^{cell}(l) + (n'_{\tilde{p}} \cdot \Delta_{shift}^{PUCCH} + (n_{oc}^{(\tilde{p})}) \mod \Delta_{shift}^{PUCCH})) \mod N_{sc}^{RB}] \mod N_{sc}^{RB}$;

where $n_{oc}^{(\tilde{p})} = \lfloor n'_{\tilde{p}} \cdot \Delta_{shift}^{PUCCH}/N_{sc}^{RB} \rfloor$;

$n'_{\tilde{p}} = (n_{PUCCH}^{\tilde{p}}) \mod (c \cdot N_{sc}^{RB}/\Delta_{shift}^{PUCCH})$;

$n_{cs}^{cell}(l) = \Sigma_{i=0}^{7} c(8l + i) \cdot 2^i$;

or, calculating the CS value $\alpha_{\tilde{p}}(l)$ corresponding to the symbol, according to the PUCCH resource index and the index of the symbol and through a sixth formula group below:

$\alpha_{\tilde{p}}(l) = 2\pi \cdot n_{cs}^{(\tilde{p})}(l)/N_{sc}^{RB}$;

where $n_{cs}^{(\tilde{p})}(l) = [n_{cs}^{cell}(l) + (n'_{\tilde{p}} \cdot \Delta_{shift}^{PUCCH}) \mod N_{sc}^{RB}] \mod N_{sc}^{RB}$;

where $$n'_{\tilde{p}} = (n_{PUCCH}^{\tilde{p}}) \bmod (N_{sc}^{RB}/\Delta_{shift}^{PUCCH});$$

$$n_{cs}^{cell}(l) = \Sigma_{i=0}^{7} c(8l+i) \cdot 2^i;$$

where $\alpha_{\tilde{p}}(l)$ represents the CS value corresponding to the symbol;

$n_{cs}^{\tilde{p}}(l)$, $n'_{\tilde{p}}$ and $n_{cs}^{cell}(l)$ represent intermediate parameters;

$n_{oc}^{(\tilde{p})}$ represents an OCC sequence index;

$c( )$ represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

The first determining unit is configured to:

calculate the CS value $\alpha_{\tilde{p}}(f_{hop}, l)$, according to the PUCCH resource index, the index of the symbol and an index of the frequency hopping part and through a seventh formula group below:

$$\alpha_{\tilde{p}}(f_{hop}, l) = 2\pi \cdot n_{cs}^{(\tilde{p})}(f_{hop}, l)/N_{sc}^{RB};$$

where $$n_{cs}^{(\tilde{p})}(f_{hop}, l) = [n_{cs}^{cell}(l) + (n'_{\tilde{p}}(f_{hop}) \cdot \Delta_{shift}^{PUCCH} + (n_{oc}^{(\tilde{p})}(f_{hop}) \bmod \Delta_{shift}^{PUCCH})) \bmod N_{sc}^{RB}] \bmod N_{sc}^{RB}$$

where $$n_{oc}^{(\tilde{p})}(f_{hop}) = \lfloor n'_{\tilde{p}}(f_{hop}) \cdot \Delta_{shift}^{PUCCH}/N_{sc}^{RB} \rfloor;$$

$$n_{cs}^{cell}(l) = \Sigma_{i=0}^{7} c(8l+i) \cdot 2^i;$$

in the case that a frequency hopping is used and the time unit includes two frequency hopping parts, for a first frequency hopping part or when $f_{hop} \bmod 2 = 0$, $$n'_{\tilde{p}}(f_{hop}) = (n_{PUCCH}^{\tilde{p}}) \bmod (c \cdot N_{sc}^{RB}/\Delta_{shift}^{PUCCH});$$

for a second frequency hopping part or when $f_{hop} \bmod 2 = 1$, $$n'_{\tilde{p}}(f_{hop}) = [c(n'_{\tilde{p}}(f_{hop}-1)+1)] \bmod \left( c \cdot \frac{N_{sc}^{RB}}{\Delta_{shift}^{PUCCH}} + 1 \right) - 1;$$

or calculating the CS value $\alpha_{\tilde{p}}(f_{hop}, l)$, according to the PUCCH resource index, the index of the symbol and an index of the frequency hopping part and through a eighth formula group below:

$$\alpha_{\tilde{p}}(f_{hop}, l) = 2\pi \cdot n_{cs}^{(\tilde{p})}(f_{hop}, l)/N_{sc}^{RB};$$

where $$n_{cs}^{(\tilde{p})}(f_{hop}, l) = [n_{cs}^{cell}(l) + (n'_{\tilde{p}}(f_{hop}) \cdot \Delta_{shift}^{PUCCH}) \bmod N_{sc}^{RB}] \bmod N_{sc}^{RB}$$

where $$n_{cs}^{cell}(l) = \Sigma_{i=0}^{7} c(8l+i) \cdot 2^i;$$

in the case that a frequency hopping is used and the time unit includes two frequency hopping parts, for a first frequency hopping part or when $f_{hop} \bmod 2 = 0$, $$n'_{\tilde{p}}(f_{hop}) = (n_{PUCCH}^{\tilde{p}}) \bmod (c \cdot N_{sc}^{RB}/\Delta_{shift}^{PUCCH});$$

for a second frequency hopping part or when $f_{hop} \bmod 2 = 1$, $$n'_{\tilde{p}}(f_{hop}) = [c(n'_{\tilde{p}}(f_{hop}-1)+1)] \bmod \left( c \cdot \frac{N_{sc}^{RB}}{\Delta_{shift}^{PUCCH}} + 1 \right) - 1;$$

where $\alpha_{\tilde{p}}(f_{hop}, l)$ represents the CS value corresponding to the symbol;

$n_{cs}^{(\tilde{p})}(f_{hop}, l)$, $n_{cs}^{cell}(l)$ and $n'_{\tilde{p}}(f_{hop})$ represent intermediate parameters;

$n_{oc}^{\tilde{p}}(f_{hop})$ represents an OCC sequence index;

$c( )$ represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$f_{hop}$ represents the index of the frequency hopping part;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

The Transmitting Module Includes:

a third determining unit, configured to, in case of using an OCC sequence, determine, according to the OCC sequence index, an OCC sequence corresponding to the OCC sequence index; and a first transmitting unit configured to transmit the PUCCH on the symbol according to the CS value and the OCC sequence.

The second determining unit includes:

a receiving sub-unit, configured to receive the configuration signaling, and obtaining the CS configuration index according to the configuration signaling;

a first determining sub-unit, configured to determine a CS index corresponding to the symbol according to the CS configuration index; and a second determining sub-unit, configured to determine the CS value corresponding to the symbol according to the CS index corresponding to the symbol.

The first determining sub-unit is configured to:

calculate the CS index $n_{cs}^{(\tilde{p})}(l)$ corresponding to the symbol, according to the CS configuration index and the index of the symbol and through a first formula below:

$$n_{cs}^{(\tilde{p})}(l) = (CS_{init} + k \cdot l) \bmod N_{SC}^{RB}$$

where $n_{cs}^{(\tilde{p})}(l)$ represents the CS index corresponding to the symbol;

$CS_{init}$ represents the CS configuration index;

l represent the index of the symbol, and value range of l is from 0 to $N_{symb}^{UL} - 1$, where $N_{symb}^{UL}$ represents a quantity of symbols in one time unit;

k represents a coefficient value, where k is positive integer greater than or equal to 1;
$N_{SC}^{RB}$ represents a quantity of sub-carriers in one RB;
mod represents a remainder function.

The first determining sub-unit is configured to:
determine the CS index corresponding to the symbol according to a preset mapping between the index of the symbol and the CS configuration index and a table, where the table records the CS index corresponding to the index of each symbol in the time unit.

The second determining sub-unit is configured to:
calculate the CS value $\alpha_{\tilde{p}}(l)$ corresponding to the symbol, according to the CS index corresponding to the symbol and through a second formula below:

$$\alpha_{\tilde{p}}(l) = 2\pi \cdot n_{cs}^{(\tilde{p})}(l)/N_{sc}^{RB};$$

where
$\alpha_{\tilde{p}}(l)$ represents the CS value corresponding to the symbol;
$n_{cs}^{(\tilde{p})}(l)$ represents the CS index corresponding to the symbol;
$N_{sc}^{RB}$ represents a quantity of sub-carriers in one RB.

The transmitting module 330 includes:
a fourth determining unit, configured to, in case of using an OCC sequence, determine an OCC sequence index according to the configuration signaling, or determine an OCC sequence index according to CS configuration index and through a preset formula or a preset table;
a fifth determining unit, configured to determine, according to the OCC sequence index, the OCC sequence corresponding to the OCC sequence index; and
a second transmitting unit, configured to transmit the PUCCH on the symbol, according to the CS value and the OCC sequence.

The transmitting module 330 further includes a third transmitting unit configured to:
determine, through a third formula below, a RB index $n_{PRB}$ of a RB where the PUCCH is transmitted, and transmitting the PUCCH on the symbol and the RB corresponding to the RB index:

$$n_{PRB} = \begin{cases} \left\lfloor \frac{m}{2} \right\rfloor & \text{if}(m \bmod 2)\bmod 2 = 0 \\ N_{RB}^{UL} - 1 - \left\lfloor \frac{m}{2} \right\rfloor & \text{if}(m \bmod 2)\bmod 2 = 1 \end{cases};$$

or $$n_{PRB} = \begin{cases} \left\lfloor \frac{m}{2} \right\rfloor + N_{hop-offset1} & \text{if}(m \bmod 2)\bmod 2 = 0 \\ N_{RB}^{UL} - 1 - \left\lfloor \frac{m}{2} \right\rfloor - N_{hop-offset2} & \text{if}(m \bmod 2)\bmod 2 = 1 \end{cases};$$

where $$m = \left\lfloor \frac{n_{PUCCH}^{(\tilde{p})}}{c \cdot N_{SC}^{RB}/\Delta_{shift}^{PUCCH}} \right\rfloor \text{ or } m = \left\lfloor \frac{n_{PUCCH}^{(\tilde{p})} + N_{offset}}{c \cdot N_{SC}^{RB}/\Delta_{shift}^{PUCCH}} \right\rfloor;$$

or,
in the case that a frequency hopping is used, determining the RB index $n_{PRB}$ of the RB where the PUCCH is transmitted through a fourth formula below, and transmitting the PUCCH on the symbol and the RB corresponding to the RB index:

$$n_{PRB} = \begin{cases} \left\lfloor \frac{m}{2} \right\rfloor & \text{if}(m + f_{hop} \bmod 2)\bmod 2 = 0 \\ N_{RB}^{UL} - 1 - \left\lfloor \frac{m}{2} \right\rfloor & \text{if}(m + f_{hop} \bmod 2)\bmod 2 = 1 \end{cases};$$

or $$n_{PRB} = \begin{cases} \left\lfloor \frac{m}{2} \right\rfloor + N_{hop-offset1} & \text{if}(m + f_{hop} \bmod 2)\bmod 2 = 0 \\ N_{RB}^{UL} - 1 - \left\lfloor \frac{m}{2} \right\rfloor - N_{hop-offset2} & \text{if}(m + f_{hop} \bmod 2)\bmod 2 = 1 \end{cases};$$

where $$m = \left\lfloor \frac{n_{PUCCH}^{(\tilde{p})}}{c \cdot N_{SC}^{RB}/\Delta_{shift}^{PUCCH}} \right\rfloor \text{ or } m = \left\lfloor \frac{n_{PUCCH}^{(\tilde{p})} + N_{offset}}{c \cdot N_{SC}^{RB}/\Delta_{shift}^{PUCCH}} \right\rfloor;$$

where
$n_{PRB}$ represents the RB index of the RB for transmitting the PUCCH;
$n_{PUCCH}^{\tilde{p}}$ represents an index number of the PUCCH at an antenna port $\tilde{p}$;
$N_{sc}^{RB}$ represents a quantity of sub-carriers in one RB;
$\Delta_{shift}^{PUCCH}$ represents a CS spacing preconfigured by a high-layer signaling;
$N_{RB}^{UL}$ represents an uplink bandwidth or an uplink frequency hopping bandwidth;
$f_{hop}$ represents an index of the frequency hopping part;
$N_{offset}$ represents a staring position of the PUCCH resource preconfigured by a high-layer signaling, where a value of $N_{offset}$ is greater than or equal to 0;
$N_{hop-offset1}$ and $N_{hop-offset2}$ represent uplink frequency hopping offsets;
c has a pre-defined value, c has a same value for PUCCHs with different symbol lengths, or c has independent values for PUCCHs with different symbol lengths, or c has independent values for PUCCHs with different multiplexing capacities.

The value of c is determined according to a quantity or length of the OCC sequence, where
the value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths;
or
the value of c is determined according to the length of the OCC sequence corresponding to the PUCCH with each symbol length, or the value of c is determined according to the quantity of the OCC sequence corresponding to the PUCCH with each symbol length;
or
the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

Figure 4:
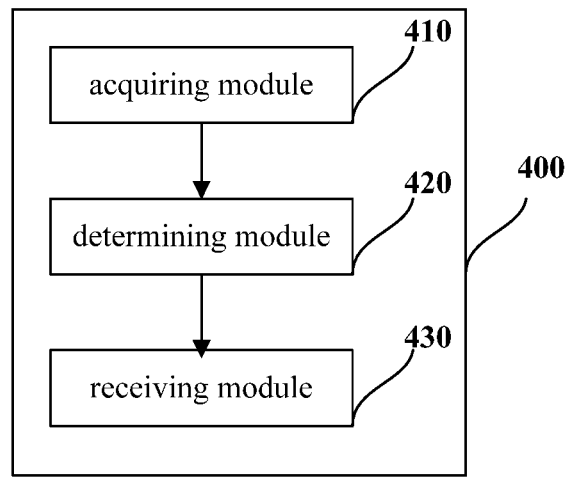
FIG. 4 is a schematic block diagram of a base station in an embodiment of the present disclosure.

As shown in FIG. 4, a base station 400 is provided in an embodiment of the present disclosure provides, including: an acquiring module 410, configured to acquire a symbol occupied by a physical uplink control channel (PUCCH) in a time unit; a determining module 420, configured to determine a cyclic shift (CS) value corresponding to the symbol; and a receiving module 430, configured to receive the PUCCH on the symbol according to the CS value.

The determining module 420 includes:
a first determining unit, configured to determine the CS value corresponding to the symbol, according to an index of the symbol and a PUCCH resource index notified to a terminal by configuration information;

or a second determining unit, configured to determine the CS value corresponding to the symbol, according to a CS configuration index notified to a terminal by a configuration signaling.

The first determining unit is configured to determine the PUCCH resource index, and notify the PUCCH resource index to the terminal by the configuration information;

calculate the CS value $\alpha_{\tilde{p}}(n_s, l)$ corresponding to the symbol, according to the PUCCH resource index, the index of the symbol and an index of the time unit and through a first formula group below:

$\alpha_{\tilde{p}}(n_s,l)=2\pi \cdot n_{cs}^{(\tilde{p})}(n_s,l)/N_{sc}^{RB}$;

where $n_{cs}^{(\tilde{p})}(n_s,l)=[n_{cs}^{cell}(n_s,l)+(n'_{\tilde{p}}(n_s)\cdot\Delta_{shift}^{PUCCH}+(n_{oc}^{(\tilde{p})}(n_s)\bmod \Delta_{shift}^{PUCCH}))\bmod N_{sc}^{RB}] \bmod N_{sc}^{RB}$;

where $n_{oc}^{(\tilde{p})}(n_s)=\lfloor n'_{\tilde{p}}(n_s)\cdot\Delta_{shift}^{PUCCH}/N_{sc}^{RB}\rfloor$;

$n'_{\tilde{p}}(n_s)=(n_{PUCCH}^{\tilde{p}})\bmod(c\cdot N_{sc}^{RB}/\Delta_{shift}^{PUCCH})$;

$n_{cs}^{cell}(n_s,l)=\Sigma_{i=0}^{7}c(8N_{symb}^{UL}\cdot n_s+8l+i)\cdot 2^i$;

or, calculating the CS value $\alpha_{\tilde{p}}(n_s, l)$ corresponding to the symbol, according to the PUCCH resource index, the index of the symbol and an index of the time unit and through a second formula group below:

$\alpha_{\tilde{p}}(n_s,l)=2\pi \cdot n_{cs}^{(\tilde{p})}(n_s,l)/N_{sc}^{RB}$;

where $n_{cs}^{(\tilde{p})}(n_s,l)=[n_{cs}^{cell}(n_s,l)+(n'_{\tilde{p}}(n_s)\cdot\Delta_{shift}^{PUCCH})\bmod N_{sc}^{RB}] \bmod N_{sc}^{RB}$;

where $n'_{\tilde{p}}(n_s)=(n_{PUCCH}^{\tilde{p}})\bmod(c\cdot N_{sc}^{RB}/\Delta_{shift}^{PUCCH})$;

$n_{cs}^{cell}(n_s,l)=\Sigma_{i=0}^{7}c(8N_{symb}^{UL}\cdot n_s+8l+i)\cdot 2^i$;

where $\alpha_{\tilde{p}}(n_s, l)$ represents the CS value corresponding to the symbol;

$n_{cs}^{\tilde{p}}(n_s, l)$, $n'_{\tilde{p}}(n_s)$ and $n_{cs}^{cell}(n_s, l)$ represent intermediate parameters;

$n_{oc}^{(\tilde{p})}(n_s)$ represents an Orthogonal Cover Code (OCC) sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one resource block (RB);

$\Delta_{shift}^{PUCCH}$ represents a CS spacing preconfigured by a high-layer signaling;

$N_{symb}^{UL}$ represents a quantity of symbols in one time unit;

$n_s$ represents the index of the time unit;

l represents an index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

The first determining unit is configured to:

determine the PUCCH resource index, and notifying the PUCCH resource index to the terminal by the configuration information;

calculate the CS value $\alpha_{\tilde{p}}(n_s, f_{hop}, l)$ corresponding to the symbol, according to the PUCCH resource index, the index of the symbol, an index of the time unit and an index of the frequency hopping part and through a third formula group below:

$\alpha_{\tilde{p}}(n_s,f_{hop},l)=2\pi \cdot n_{cs}^{(\tilde{p})}(n_s,f_{hop},l)/N_{sc}^{RB}$;

where $n_{cs}^{(\tilde{p})}(n_s,f_{hop},l)=[n_{cs}^{cell}(n_s,l)+(n'_{\tilde{p}}(n_s,f_{hop})\cdot\Delta_{shift}^{PUCCH}+(n_{oc}^{(\tilde{p})}(n_s,f_{hop})\bmod \Delta_{shift}^{PUCCH}))\bmod N_{sc}^{RB}] \bmod N_{sc}^{RB}$;

where $n_{oc}^{(\tilde{p})}(n_s,f_{hop})=\lfloor n'_{\tilde{p}}(n_s,f_{hop})\cdot\Delta_{shift}^{PUCCH}/N_{sc}^{RB}\rfloor$;

$n_{cs}^{cell}(n_s,l)=\Sigma_{i=0}^{7}c(8N_{symb}^{UL}\cdot n_s+8l+i)\cdot 2^i$;

in the case that a frequency hopping is used and the time unit includes two frequency hopping parts, for a first frequency hopping part or when $f_{hop}$ mod 2=0, $n'_{\tilde{p}}(n_s,f_{hop})=(n_{PUCCH}^{\tilde{p}})\bmod(c\cdot N_{SC}^{RB}/\Delta_{shift}^{PUCCH})$;

for a second frequency hopping part or when $f_{hop}$ mod 2=1, $n'_{\tilde{p}}(n_s, f_{hop}) = [c(n'_{\tilde{p}}(n_s, f_{hop}-1)+1)]\bmod\left(c \cdot \frac{N_{SC}^{RB}}{\Delta_{shift}^{PUCCH}}+1\right)-1$;

or, calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a fourth formula group below:

$\alpha_{\tilde{p}}(n_s,f_{hop},l)=2\pi \cdot n_{cs}^{(\tilde{p})}(n_s,f_{hop},l)/N_{sc}^{RB}$;

where $n_{cs}^{(\tilde{p})}(n_s,f_{hop},l)=[n_{cs}^{cell}(n_s,l)+(n'_{\tilde{p}}(n_s,f_{hop})\cdot\Delta_{shift}^{PUCCH}) \bmod N_{sc}^{RB}] \bmod N_{sc}^{RB}$;

where $n_{cs}^{cell}(n_s,l)=\Sigma_{i=0}^{7}c(8N_{symb}^{UL}\cdot n_s+8l+i)\cdot 2^i$;

in the case that a frequency hopping is used and the time unit includes two frequency hopping parts, for a first frequency hopping part or when $f_{hop}$ mod 2=0, $n'_{\tilde{p}}(n_s,f_{hop})=(n_{PUCCH}^{\tilde{p}})\bmod(c\cdot N_{SC}^{RB}/\Delta_{shift}^{PUCCH})$;

for a second frequency hopping part or when $f_{hop}$ mod 2=1, $n'_{\tilde{p}}(n_s, f_{hop}) = [c(n'_{\tilde{p}}(n_s, f_{hop}-1)+1)]\bmod\left(c \cdot \frac{N_{SC}^{RB}}{\Delta_{shift}^{PUCCH}}+1\right)-1$;

where $\alpha_{\tilde{p}}(n_s, f_{hop}, l)$ represents the CS value corresponding to the symbol;

$n_{cs}^{(\tilde{p})}(n_s, f_{hop}, l)$, $n_{cs}^{cell}(n_s, l)$ and $n'_{\tilde{p}}(n_s, f_{hop})$ represent intermediate parameters;

$n_{oc}^{\tilde{p}}(n_s, f_{hop})$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$N_{symb}^{UL}$ represents a quantity of symbols in one time unit;

$f_{hop}$ represents the index of the frequency hopping part;

$n_s$ represents the index of the time unit;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

The first determining unit is configured to determine the PUCCH resource index, and notify the PUCCH resource index to the terminal by the configuration information;

calculate the CS value $\alpha_{\tilde{p}}(l)$ corresponding to the symbol, according to the PUCCH resource index and the index of the symbol and through a fifth formula group below:

$$\alpha_{\tilde{p}}(l)=2\pi \cdot n_{cs}^{(\tilde{p})}(l)/N_{sc}^{RB};$$

where $$n_{cs}^{(\tilde{p})}(l)=[n_{cs}^{cell}(l)+(n'_{\tilde{p}} \cdot \Delta_{shift}^{PUCCH}+(n_{oc}^{(\tilde{p})} \bmod \Delta_{shift}^{PUCCH})) \bmod N_{sc}^{RB}] \bmod N_{sc}^{RB};$$

where $$n_{oc}^{(\tilde{p})}=\lfloor n'_{\tilde{p}} \cdot \Delta_{shift}^{PUCCH}/N_{sc}^{RB} \rfloor;$$

$$n'_{\tilde{p}}=(n_{PUCCH}^{\tilde{p}}) \bmod (c \cdot N_{sc}^{RB}/\Delta_{shift}^{PUCCH});$$

$$n_{cs}^{cell}(l)=\Sigma_{i=0}^{7} c(8l+i) \cdot 2^i;$$

or, calculating the CS value $\alpha_{\tilde{p}}(l)$ corresponding to the symbol, according to the PUCCH resource index and the index of the symbol and through a sixth formula group below:

$$\alpha_{\tilde{p}}(l)=2\pi \cdot n_{cs}^{(\tilde{p})}(l)/N_{sc}^{RB};$$

where $$n_{cs}^{(\tilde{p})}(l)=[n_{cs}^{cell}(l)+(n'_{\tilde{p}} \cdot \Delta_{shift}^{PUCCH}) \bmod N_{sc}^{RB}] \bmod N_{sc}^{RB};$$

where $$n'_{\tilde{p}}=(n_{PUCCH}^{\tilde{p}}) \bmod (N_{sc}^{RB}/\Delta_{shift}^{PUCCH});$$

$$n_{cs}^{cell}(l)=\Sigma_{i=0}^{7} c(8l+i) \cdot 2^i;$$

where $\alpha_{\tilde{p}}(l)$ represents the CS value corresponding to the symbol;

$n_{cs}^{\tilde{p}}(l)$, $n'_{\tilde{p}}$ and $n_{cs}^{cell}(l)$ represent intermediate parameters;

$n_{oc}^{(\tilde{p})}$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

The first determining unit is configured to:

determine the PUCCH resource index, and notifying the PUCCH resource index to the terminal by the configuration information;

calculate the CS value $\alpha_{\tilde{p}}(f_{hop}, l)$, according to the PUCCH resource index, the index of the symbol and an index of the frequency hopping part and through a seventh formula group below:

$$\alpha_{\tilde{p}}(f_{hop},l)=2\pi \cdot n_{cs}^{(\tilde{p})}(f_{hop},l)/N_{sc}^{RB};$$

where $$n_{cs}^{(\tilde{p})}(f_{hop},l)=[n_{cs}^{cell}(l)+(n'_{\tilde{p}}(f_{hop}) \cdot \Delta_{shift}^{PUCCH}+(n_{oc}^{(\tilde{p})}(f_{hop}) \bmod \Delta_{shift}^{PUCCH})) \bmod N_{sc}^{RB}] \bmod N_{sc}^{RB}$$

where $$n_{oc}^{(\tilde{p})}(f_{hop})=\lfloor n'_{\tilde{p}}(f_{hop}) \cdot \Delta_{shift}^{PUCCH}/N_{sc}^{RB} \rfloor;$$

$$n_{cs}^{cell}(l)=\Sigma_{i=0}^{7} c(8l+i) \cdot 2^i;$$

in the case that a frequency hopping is used and the time unit includes two frequency hopping parts, for a first frequency hopping part or when $f_{hop} \bmod 2=0$, $$n'_{\tilde{p}}(f_{hop})=(n_{PUCCH}^{\tilde{p}}) \bmod (c \cdot N_{sc}^{RB}/\Delta_{shift}^{PUCCH});$$

for a second frequency hopping part or when $f_{hop} \bmod 2=1$, $$n'_{\tilde{p}}(f_{hop}) = [c(n'_{\tilde{p}}(f_{hop} - 1) + 1)] \bmod \left( c \cdot \frac{N_{SC}^{RB}}{\Delta_{shift}^{PUCCH}} + 1 \right) - 1;$$

or calculating the CS value $\alpha_{\tilde{p}}(f_{hop}, l)$, according to the PUCCH resource index, the index of the symbol and an index of the frequency hopping part and through a eighth formula group below:

$$\alpha_{\tilde{p}}(f_{hop},l)=2\pi \cdot n_{cs}^{(\tilde{p})}(f_{hop},l)/N_{sc}^{RB};$$

where $$n_{cs}^{(\tilde{p})}(f_{hop},l)=[n_{cs}^{cell}(l)+(n'_{\tilde{p}}(f_{hop}) \cdot \Delta_{shift}^{PUCCH}) \bmod N_{sc}^{RB}] \bmod N_{sc}^{RB}$$

where $$n_{cs}^{cell}(l)=\Sigma_{i=0}^{7} c(8l+i) \cdot 2^i;$$

in the case that a frequency hopping is used and the time unit includes two frequency hopping parts, for a first frequency hopping part or when $f_{hop}$ mod 2=0, $$n'_p(f_{hop})=(n_{PUCCH}^{\tilde{p}})\mathrm{mod}(c \cdot N_{SC}^{RB}/\Delta_{shift}^{PUCCH});$$

for a second frequency hopping part or when $f_{hop}$ mod 2=1, $$n'_p(f_{hop}) = [c(n'_p(f_{hop} - 1) + 1)]\mathrm{mod}\left(c \cdot \frac{N_{SC}^{RB}}{\Delta_{shift}^{PUCCH}} + 1\right) - 1;$$

where $\alpha_{\tilde{p}}(f_{hop}, l)$ represents the CS value corresponding to the symbol;

$n_{cs}^{(\tilde{p})}(f_{hop}, l)$, $n_{cs}^{cell}(l)$ and $n'_{\tilde{p}}(f_{hop})$ represent intermediate parameters;

$n_{oc}^{\tilde{p}}(f_{hop})$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$f_{hop}$ represents the index of the frequency hopping part;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities.

The receiving module 430 includes:

a third determining unit, configured to, in case of using an OCC sequence, determine, according to the OCC sequence index, an OCC sequence corresponding to the OCC sequence index; and a first receiving unit, configured to receive the PUCCH on the symbol according to the CS value and the OCC sequence.

The second determining unit includes:

a sending sub-unit, configured to determine the CS configuration index, and the notify the CS configuration index to the terminal by the configuration signaling;

a first determining sub-unit, configured to determine a CS index corresponding to the symbol according to the CS configuration index; and a second determining sub-unit, configured to determine the CS value corresponding to the symbol according to the CS index corresponding to the symbol.

The first determining sub-unit is configured to:

calculate the CS index $n_{cs}^{(\tilde{p})}(l)$ corresponding to the symbol, according to the CS configuration index and the index of the symbol and through a first formula below:

$$n_{cs}^{(\tilde{p})}(l)=(CS_{init}+k \cdot l)\mathrm{mod}\, N_{SC}^{RB};$$

where $n_{cs}^{(\tilde{p})}(l)$ represents the CS index corresponding to the symbol;

$CS_{init}$ represents the CS configuration index;

l represent the index of the symbol, and value range of l is from 0 to $N_{symb}^{UL}-1$, where $N_{symb}^{UL}$ represents a quantity of symbols in one time unit;

k represents a coefficient value, where k is positive integer greater than or equal to 1;

$N_{SC}^{RB}$ represents a quantity of sub-carriers in one RB;

mod represents a remainder function.

The first determining sub-unit is configured to:

determine the CS index corresponding to the symbol according to a preset mapping between the index of the symbol and the CS configuration index and a table, where the table records the CS index corresponding to the index of each symbol in the time unit.

The second determining sub-unit is configured to:

calculate the CS value $\alpha_{\tilde{p}}(l)$ corresponding to the symbol, according to the CS index corresponding to the symbol and through a second formula below:

$$\alpha_{\tilde{p}}(l)=2\pi \cdot n_{cs}^{(\tilde{p})}(l)/N_{sc}^{RB};$$

where $\alpha_{\tilde{p}}(l)$ represents the CS value corresponding to the symbol;

$n_{cs}^{(\tilde{p})}(l)$ represents the CS index corresponding to the symbol;

$N_{sc}^{RB}$ represents a quantity of sub-carriers in one RB.

The receiving module 430 includes:

a four determining unit, configured to, in case of using an OCC sequence, determine an OCC sequence index according to the configuration signaling, or determine an OCC sequence index according to CS configuration index and through a preset formula or a preset table;

a fifth determining unit, configured to determine, according to the OCC sequence index, the OCC sequence corresponding to the OCC sequence index; and a second receiving unit, configured to receive the PUCCH on the symbol, according to the CS value and the OCC sequence.

The receiving module 430 includes a third receiving unit configured to:

determine, through a third formula below, a RB index $n_{PRB}$ of a RB where the PUCCH is transmitted, and transmit the PUCCH on the symbol and the RB corresponding to the RB index:

$$n_{PRB} = \begin{cases} \left\lfloor \frac{m}{2} \right\rfloor & \text{if } (m\, \mathrm{mod}2)\mathrm{mod}2 = 0 \\ N_{RB}^{UL} - 1 - \left\lfloor \frac{m}{2} \right\rfloor & \text{if } (m\, \mathrm{mod}2)\mathrm{mod}2 = 1 \end{cases};$$

or $$n_{PRB} = \begin{cases} \left\lfloor \frac{m}{2} \right\rfloor + N_{hop-offset1} & \text{if } (m\, \mathrm{mod}2)\mathrm{mod}2 = 0 \\ N_{RB}^{UL} - 1 - \left\lfloor \frac{m}{2} \right\rfloor - N_{hop-offset2} & \text{if } (m\, \mathrm{mod}2)\mathrm{mod}2 = 1 \end{cases};$$

where $$m = \left\lfloor \frac{n_{PUCCH}^{(\tilde{p})}}{c \cdot N_{SC}^{RB}/\Delta_{shift}^{PUCCH}} \right\rfloor \text{ or } m = \left\lfloor \frac{n_{PUCCH}^{(\tilde{p})} + N_{offset}}{c \cdot N_{SC}^{RB}/\Delta_{shift}^{PUCCH}} \right\rfloor;$$

or, in the case that a frequency hopping is used, determine the RB index $n_{PRB}$ of the RB where the PUCCH is transmitted through a fourth formula below, and transmit the PUCCH on the symbol and the RB corresponding to the RB index:

$$n_{PRB} = \begin{cases} \left\lfloor \frac{m}{2} \right\rfloor & \text{if } (m + f_{hop}\mathrm{mod}2)\mathrm{mod}2 = 0 \\ N_{RB}^{UL} - 1 - \left\lfloor \frac{m}{2} \right\rfloor & \text{if } (m + f_{hop}\mathrm{mod}2)\mathrm{mod}2 = 1 \end{cases};$$

-continued or $$n_{PRB} = \begin{cases} \left\lfloor \frac{m}{2} \right\rfloor + N_{hop-offset1} & \text{if } (m + f_{hop}\text{mod}2)\text{mod}2 = 0 \\ N_{RB}^{UL} - 1 - \left\lfloor \frac{m}{2} \right\rfloor - N_{hop-offset2} & \text{if } (m + f_{hop}\text{mod}2)\text{mod}2 = 1 \end{cases};$$

where $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

where $n_{PRB}$ represents the RB index of the RB for transmitting the PUCCH;

$n_{PUCCH}^{\tilde{p}}$ represents an index number of the PUCCH at an antenna port $\tilde{p}$;

$N_{sc}^{RB}$ represents a quantity of sub-carriers in one RB;

$\Delta_{shift}^{PUCCH}$ represents a CS spacing preconfigured by a high-layer signaling;

$N_{RB}^{UL}$ represents an uplink bandwidth or an uplink frequency hopping bandwidth;

$f_{hop}$ represents an index of the frequency hopping part;

$N_{offset}$ represents a staring position of the PUCCH resource preconfigured by a high-layer signaling, where a value of $N_{offset}$ is greater than or equal to 0;

$N_{hop-offset1}$ and $N_{hop-offset2}$ represent uplink frequency hopping offsets;

c has a pre-defined value, c has a same value for PUCCHs with different symbol lengths, or c has independent values for PUCCHs with different symbol lengths, or c has independent values for PUCCHs with different multiplexing capacities.

The value of c is determined according to a quantity or length of the OCC sequence, where the value of c is determined according to a maximum length of lengths of the OCC sequences corresponding to the PUCCHs with different symbol lengths, or the value of c is determined according to a maximum sequence quantity of quantities of the OCC sequences corresponding to the PUCCHs with different symbol lengths;

or the value of c is determined according to the length of the OCC sequence corresponding to the PUCCH with each symbol length, or the value of c is determined according to the quantity of the OCC sequence corresponding to the PUCCH with each symbol length;

or the value of c is determined according to the lengths of the OCC sequences corresponding to the PUCCHs with the same multiplexing capacity, or the value of c is determined according to the quantity of the OCC sequences corresponding to the PUCCHs with the same multiplexing capacity.

It should be noted that the embodiment of the base station is a one-to-one correspondence with the embodiment of the above method. All implementations in the above method embodiments are applicable to the embodiment of the base station, and the same technical effects can also be achieved.

A terminal is further provided in an embodiment of the present disclosure, including a memory, a processor, and a computer program stored on the memory and executable on the processor. When the processor executes the program, the following steps are implemented: acquiring a symbol occupied by a physical uplink control channel (PUCCH) in a time unit; determining a cyclic shift (CS) value corresponding to the symbol; and transmitting the PUCCH on the symbol according to the CS value.

Figure 5:
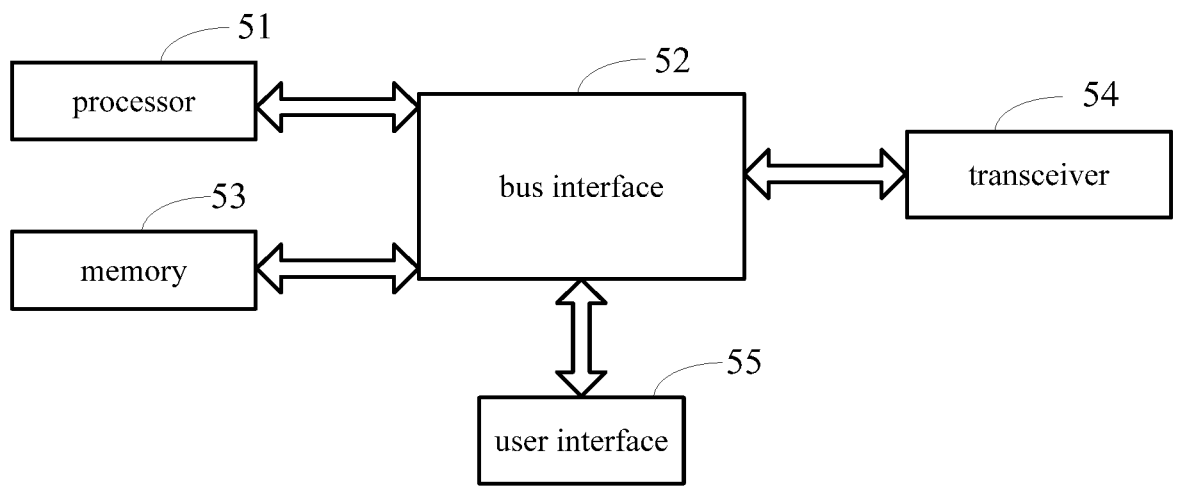
FIG. 5 is a structural block diagram of a terminal in an embodiment of the present disclosure.

Specifically, as shown in FIG. 5, this embodiment provides a terminal, including: a processor 51; and a memory 53 connected to the processor 51 through a bus interface 52, where the memory 53 is configured to store programs and data used by the processor 51 when performing operations, and when the processor 51 calls and When the programs and data stored in the memory 53 are executed, the following processes are performed:

acquiring, by the processor 51, a symbol occupied by a physical uplink control channel (PUCCH) in a time unit; determining a cyclic shift (CS) value corresponding to the symbol The transceiver 54 is connected to the bus interface 52, and is configured to receive and send data under the control of the processor 51, and is specifically configured to transmitting the PUCCH on the symbol according to the CS value.

It should be noted that in FIG. 5, the bus architecture may include any number of interconnected buses and bridges. Specifically, one or more processors represented by the processor 51 and various circuits of the memory represented by the memory 53 are linked together. The bus architecture can also link various other circuits such as peripherals, voltage regulators, and power management circuits, which are well known in the art, so they are not described further herein. The bus interface provides an interface. The transceiver 54 may be multiple elements, including a transmitter and a transceiver, providing a unit for communicating with various other devices over a transmission medium. For different terminals, the user interface 55 may also be an interface capable of externally connecting internally required devices. The connected devices include, but are not limited to, a keypad, a display, a speaker, a microphone, a joystick, and the like. The processor 51 is responsible for managing the bus architecture and general processing, and the memory 53 may store data used by the processor 51 when performing operations.

Those skilled in the art may understand that all or part of the steps for implementing the above embodiments may be completed by hardware, or related hardware may be instructed by a computer program that includes instructions for performing part or all of the steps of the foregoing method. And the computer program may be stored in a readable storage medium, and the storage medium may be any form of storage medium. Specifically, an embodiment of the present disclosure further provides a computer-readable storage medium having a computer program stored thereon. When the program is executed by a processor, the following steps are implemented: acquiring a symbol occupied by a physical uplink control channel (PUCCH) in a time unit; determining a cyclic shift (CS) value corresponding to the symbol; and transmitting the PUCCH on the symbol according to the CS value.

A base station is further provided in an embodiment of the present disclosure, including a memory, a processor, and a computer program stored on the memory and executable on the processor. When the processor executes the program, the following steps are implemented: acquiring a symbol occupied by a physical uplink control channel (PUCCH) in a time unit; determining a cyclic shift (CS) value corresponding to the symbol; and receiving the PUCCH on the symbol according to the CS value.

Figure 6:
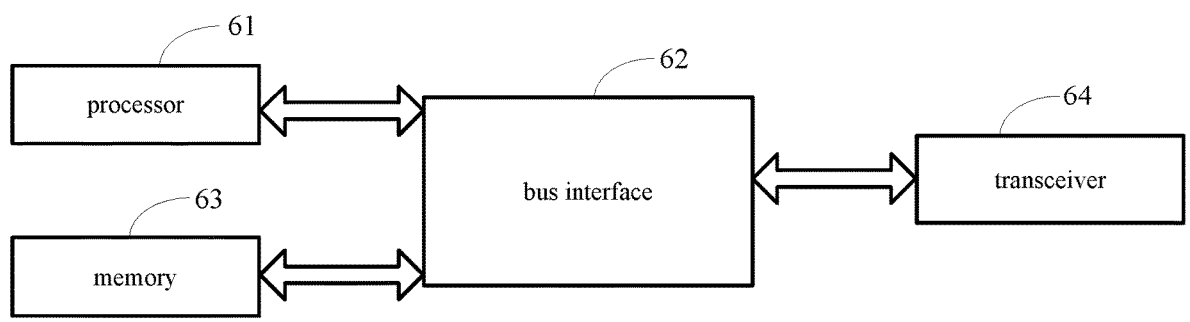
FIG. 6 is a structural block diagram of a base station in an embodiment of the present disclosure.

Specifically, as shown in FIG. 6, a base station is provided in an embodiment of the present disclosure, including:

a processor 61; and a memory 63 connected to the processor 61 through a bus interface 62, the memory 63 is configured to store programs and data used by the processor 61 when performing operations, and when the processor 61 calls and When the programs and data stored in the memory 63 are executed, the following processes are performed:

acquiring, by the processor 61, a symbol occupied by a physical uplink control channel (PUCCH) in a time unit; determining, by the processor 61, a cyclic shift (CS) value corresponding to the symbol.

The transceiver 64 is connected to the bus interface 62 and is used to receive and send data under the control of the processor 61, and is specifically configured to receive the PUCCH on the symbol according to the CS value.

It should be noted that in FIG. 6, the bus architecture may include any number of interconnected buses and bridges. Specifically, one or more processors represented by the processor 61 and various circuits of the memory represented by the memory 63 are linked together. The bus architecture can also link various other circuits such as peripherals, voltage regulators, and power management circuits, which are well known in the art, so they are not described further herein. The bus interface provides an interface. The transceiver 64 may be multiple elements, including a transmitter and a transceiver, providing a unit for communicating with various other devices over a transmission medium. The processor 61 is responsible for managing the bus architecture and general processing, and the memory 63 may store data used by the processor 61 when performing operations.

Those skilled in the art may understand that all or part of the steps for implementing the above embodiments may be completed by hardware, or related hardware may be instructed by a computer program that includes instructions for performing part or all of the steps of the foregoing method. And the computer program may be stored in a readable storage medium, and the storage medium may be any form of storage medium. Specifically, an embodiment of the present disclosure further provides a computer-readable storage medium having a computer program stored thereon. When the program is executed by a processor, the following steps are implemented: acquiring a symbol occupied by a physical uplink control channel (PUCCH) in a time unit; determining a cyclic shift (CS) value corresponding to the symbol; and receiving the PUCCH on the symbol according to the CS value.

The above are only some embodiments of the present disclosure, and it should be noted that those skilled in the art may also make several improvements and refinements without departing from the principles of the present disclosure, which should be considered as the scope of the present disclosure.

What is claimed is:

1. An information transmission method, comprising:
acquiring a symbol occupied by a physical uplink control channel (PUCCH) in a time unit;
determining a cyclic shift (CS) value corresponding to the symbol; and
transmitting the PUCCH on the symbol according to the CS value;
wherein the determining the CS value corresponding to the symbol comprises:
Method 1 or Method 2;
wherein Method 1 comprises:
calculating the CS value $\alpha_{\tilde{p}}(n_s, l)$ corresponding to the symbol, according to the PUCCH resource index, the index of the symbol and an index of the time unit and through a second formula group below:

$$\alpha_{\tilde{p}}(n_s, l) = 2\pi \cdot n_{cs}^{(\tilde{p})}(n_s, l)/N_{sc}^{RB};$$

wherein $$n_{cs}^{(\tilde{p})}(n_s, l) = [n_{cs}^{cell}(n_s, l) + (n'_{\tilde{p}}(n_s) \cdot \Delta_{shift}^{PUCCH}) \bmod N_{sc}^{RB}] \bmod N_{sc}^{RB};$$

wherein $$n'_{\tilde{p}}(n_s) = (n_{PUCCH}^{\tilde{p}}) \bmod (N_{sc}^{RB}/\Delta_{shift}^{PUCCH});$$

$$n_{cs}^{cell}(n_s, l) = \sum_{i=0}^{7} c(8N_{symb}^{UL} \cdot n_s + 8l + i) \cdot 2^i;$$

wherein
$\alpha_{\tilde{p}}(n_s, l)$ represents the CS value corresponding to the symbol;
$n_{cs}^{\tilde{p}}(n_s, l)$, $n'_{\tilde{p}}(n_s)$ and $n_{cs}^{cell}(n_s, l)$ represent intermediate parameters;
$n_{oc}^{(\tilde{p})}(n_s)$ represents an Orthogonal Cover Code (OCC) sequence index;
$c( )$ represents a pseudorandom sequence;
$n_{PUCCH}^{\tilde{p}}$ represents an index number of the PUCCH at an antenna port $\tilde{p}$;
mod represents a remainder function;
$N_{sc}^{RB}$ represents a quantity of sub-carriers in one resource block (RB);
$\Delta_{shift}^{PUCCH}$ represents a CS spacing preconfigured by a high-layer signaling;
$N_{symb}^{UL}$ represents a quantity of symbols in one time unit;
$n_s$ represents the index of the time unit;
$l$ represents an index of the symbol in one time unit;
$c$ has a pre-defined value, $c$ has a same value for PUCCHs with different symbol lengths, or $c$ has independent values for PUCCHs with different symbol lengths, or $c$ has independent values for PUCCHs with different multiplexing capacities;

or, the determining the CS value corresponding to the symbol according to the index of the symbol and the PUCCH resource index notified by the configuration information comprises:
calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a third formula group below:

$$\alpha_{\tilde{p}}(n_s, f_{hop}, l) = 2\pi \cdot n_{cs}^{(\tilde{p})}(n_s, f_{hop}, l)/N_{sc}^{RB};$$

wherein $$n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH} + (n_{oc}^{\tilde{p}}(n_s, f_{hop}) \bmod \Delta_{shift}^{PUCCH})) \bmod N_{sc}^{RB}] \bmod N_{sc}^{RB};$$

wherein $$n_{oc}^{\tilde{p}}(n_s, f_{hop}) = \lfloor n'_{\tilde{p}}(n_s, f_{hop}) \cdot \Delta_{shift}^{PUCCH}/N_{sc}^{RB} \rfloor;$$

$$n_{cs}^{cell}(n_s, l) = \sum_{i=0}^{7} c(8N_{symb}^{UL} \cdot n_s + 8l + i) \cdot 2^i;$$

in the case that a frequency hopping is used and the time unit comprises two frequency hopping parts,
for a first frequency hopping part or when $f_{hop} \bmod 2 = 0$, $$n'_{\tilde{p}}(n_s, f_{hop}) = (n_{PUCCH}^{\tilde{p}}) \bmod (c \cdot N_{sc}^{RB}/\Delta_{shift}^{PUCCH});$$

for a second frequency hopping part or when $f_{hop}$ mod 2=1, $$n'_{\tilde{p}}(n_s, f_{hop}) = [c(n'_{\tilde{p}}(n_s, f_{hop}-1)+1)] \bmod \left(c \cdot \frac{N_{SC}^{RB}}{\Delta_{shift}^{PUCCH}}+1\right)-1;$$

or,
calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a fourth formula group below:

$$\alpha_{\tilde{p}}(n_s, f_{hop}, l) = 2\pi \cdot n_{cs}^{(\tilde{p})}(n_s, f_{hop}, l)/N_{sc}^{RB};$$

wherein $$n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH}) \bmod N_{sc}^{RB}] \bmod N_{sc}^{RB};$$

wherein $$n_{cs}^{cell}(n_s, l) = \Sigma_{i=0}^{7} c(8N_{symb}^{UL} \cdot n_s + 8l + i) \cdot 2^i;$$

in the case that a frequency hopping is used and the time unit comprises two frequency hopping parts,
for a first frequency hopping part or when $f_{hop}$ mod 2=0, $$n'_{\tilde{p}}(n_s, f_{hop}) = (n_{PUCCH}^{\tilde{p}}) \bmod (c \cdot N_{SC}^{RB}/\Delta_{shift}^{PUCCH});$$

for a second frequency hopping part or when $f_{hop}$ mod 2=1, $$n'_{\tilde{p}}(n_s, f_{hop}) = [c(n'_{\tilde{p}}(n_s, f_{hop}-1)+1)] \bmod \left(c \cdot \frac{N_{SC}^{RB}}{\Delta_{shift}^{PUCCH}}+1\right)-1;$$

wherein
$\alpha_{\tilde{p}}(n_s, f_{hop}, l)$ represents the CS value corresponding to the symbol;
$n_{cs}^{(\tilde{p})}(n_s, f_{hop}, l)$, $n_{cs}^{cell}(n_s, l)$ and $n'_{\tilde{p}}(n_s, f_{hop})$ represent intermediate parameters;
$n_{oc}^{\tilde{p}}(n_s, f_{hop}, l)$ represents an OCC sequence index;
c ( ) represents a pseudorandom sequence;
$n_{PUCCH}^{\tilde{p}}$ represents an index number of the PUCCH at an antenna port $\tilde{p}$;
mod represents a remainder function;
$N_{sc}^{RB}$ represents a quantity of sub-carriers in one RB;
$\Delta_{shift}^{PUCCH}$ represents a CS spacing preconfigured by a high-layer signaling;
$N_{symb}^{UL}$ represents a quantity of symbols in one time unit;
$f_{hop}$ represents the index of the frequency hopping part;
$n_s$ represents the index of the time unit;
l represents the index of the symbol in one time unit;
c has a pre-defined value, c has a same value for PUCCHs with different symbol lengths, or c has independent values for PUCCHs with different symbol lengths, or c has independent values for PUCCHs with different multiplexing capacities;
or,
calculating the CS value $\alpha_{\tilde{p}}(l)$ corresponding to the symbol, according to the PUCCH resource index and the index of the symbol and through a sixth formula group below:

$$\alpha_{\tilde{p}}(l) = 2\pi \cdot n_{cs}^{(\tilde{p})}(l)/N_{sc}^{RB};$$

wherein $$n_{cs}^{(\tilde{p})}(l) = [n_{cs}^{cell}(l) + (n'_{\tilde{p}} \cdot \Delta_{shift}^{PUCCH}) \bmod N_{sc}^{RB}] \bmod N_{sc}^{RB};$$

wherein $$n'_{\tilde{p}} = (n_{PUCCH}^{\tilde{p}}) \bmod (N_{sc}^{RB}/\Delta_{shift}^{PUCCH});$$

$$n_{cs}^{cell}(l) = \Sigma_{i=0}^{7} c(8l+i) \cdot 2^i;$$

wherein
$\alpha_{\tilde{p}}(l)$ represents the CS value corresponding to the symbol;
$n_{cs}^{\tilde{p}}(l)$, $n'_{\tilde{p}}$ and $n_{cs}^{cell}(l)$ represent intermediate parameters;
$n_{oc}^{(\tilde{p})}$ represents an OCC sequence index;
c ( ) represents a pseudorandom sequence;
$n_{PUCCH}^{\tilde{p}}$ represents an index number of the PUCCH at an antenna port $\tilde{p}$;
mod represents a remainder function;
$N_{sc}^{RB}$ represents a quantity of sub-carriers in one RB;
$\Delta_{shift}^{PUCCH}$ represents a CS spacing preconfigured by a high-layer signaling;
l represents the index of the symbol in one time unit;
c has a pre-defined value, c has a same value for PUCCHs with different symbol lengths, or c has independent values for PUCCHs with different symbol lengths, or c has independent values for PUCCHs with different multiplexing capacities;
or,
the determining the CS value corresponding to the symbol according to the index of the symbol and the PUCCH resource index notified by the configuration information comprises:
calculating the CS value $\alpha_{\tilde{p}}(f_{hop}, l)$, according to the PUCCH resource index, the index of the symbol and an index of the frequency hopping part and through a seventh formula group below:

$$\alpha_{\tilde{p}}(f_{hop}, l) = 2\pi \cdot n_{cs}^{(\tilde{p})}(f_{hop}, l)/N_{sc}^{RB};$$

wherein $$n_{cs}^{(\tilde{p})}(f_{hop}, l) = [n_{cs}^{cell}(l) + (n'_{\tilde{p}}(f_{hop}) \cdot \Delta_{shift}^{PUCCH} + (n_{oc}^{(\tilde{p})}(f_{hop}) \bmod \Delta_{shift}^{PUCCH})) \bmod N_{sc}^{RB}] \bmod N_{sc}^{RB}$$

wherein $$n_{oc}^{\tilde{p}}(f_{hop}) = \lfloor n'_{\tilde{p}}(f_{hop}) \cdot \Delta_{shift}^{PUCCH}/N_{sc}^{RB} \rfloor;$$

$$n_{cs}^{cell}(l) = \Sigma_{i=0}^{7} c(8l+i) \cdot 2^i;$$

in the case that a frequency hopping is used and the time unit comprises two frequency hopping parts,
for a first frequency hopping part or when $f_{hop}$ mod 2=0,
$n'_{\tilde{p}}(f_{hop}) = (n_{PUCCH}^{\tilde{p}}) \bmod (c \cdot N_{SC}^{RB}/\Delta_{shift}^{PUCCH});$
for a second frequency hopping part or when $f_{hop}$ mod 2=1, $$n'_{\tilde{p}}(f_{hop}) = [c(n'_{\tilde{p}}(f_{hop}-1)+1)] \bmod \left(c \cdot \frac{N_{SC}^{RB}}{\Delta_{shift}^{PUCCH}}+1\right)-1;$$

or calculating the CS value $\alpha_{\tilde{p}}(f_{hop}, l)$, according to the PUCCH resource index, the index of the symbol and an index of the frequency hopping part and through an eighth formula group below:

$$\alpha_{\tilde{p}}(f_{hop},l)=2\pi \cdot n_{cs}^{(\tilde{p})}(f_{hop},l)/N_{sc}^{RB};$$

wherein $$n_{cs}^{(\tilde{p})}(f_{hop},l)=[n_{cs}^{cell}(l)+(n'_{\tilde{p}}(f_{hop})\cdot \Delta_{shift}^{PUCCH})\bmod N_{sc}^{RB}] \bmod N_{sc}^{RB}$$

wherein $$n_{cs}^{cell}(l)=\Sigma_{i=0}^{7}c(8l+i)\cdot 2^{i};$$

in the case that a frequency hopping is used and the time unit comprises two frequency hopping parts, for a first frequency hopping part or when $f_{hop}$ mod 2=0, $$n'_{\tilde{p}}(f_{hop})=(n_{PUCCH}^{\tilde{p}})\bmod(c\cdot N_{sc}^{RB}/\Delta_{shift}^{PUCCH});$$

for a second frequency hopping part or when $f_{hop}$ mod 2=1, $$n'_{\tilde{p}}(f_{hop}) = [c(n'_{\tilde{p}}(f_{hop}-1)+1)]\bmod\left(c\cdot \frac{N_{SC}^{RB}}{\Delta_{shift}^{PUCCH}}+1\right)-1;$$

wherein
- $\alpha_{\tilde{p}}(f_{hop}, l)$ represents the CS value corresponding to the symbol;
- $n_{cs}^{(\tilde{p})}(f_{hop}, l)$, $n_{cs}^{cell}(l)$ and $n'_{\tilde{p}}(f_{hop})$ represent intermediate parameters;
- $n_{oc}^{\tilde{p}}(f_{hop})$ represents an OCC sequence index;
- $c(\ )$ represents a pseudorandom sequence;
- $n_{PUCCH}^{\tilde{p}}$ represents an index number of the PUCCH at an antenna port $\tilde{p}$;
- mod represents a remainder function;
- $N_{sc}^{RB}$ represents a quantity of sub-carriers in one RB;
- $\Delta_{shift}^{PUCCH}$ represents a CS spacing preconfigured by a high-layer signaling;
- $f_{hop}$ represents the index of the frequency hopping part;
- l represents the index of the symbol in one time unit;
- c has a pre-defined value, c has a same value for PUCCHs with different symbol lengths, or c has independent values for PUCCHs with different symbol lengths, or c has independent values for PUCCHs with different multiplexing capacities;

wherein Method 2 comprises:
receiving the configuration signaling, and obtaining the CS configuration index according to the configuration signaling;
determining a CS index corresponding to the symbol according to the CS configuration index; and
determining the CS value corresponding to the symbol according to the CS index corresponding to the symbol;
wherein the determining the CS index corresponding to the symbol according to the CS configuration index comprises:
calculating the CS index $n_{cs}^{(\tilde{p})}(l)$ corresponding to the symbol, according to the CS configuration index and the index of the symbol and through a first formula below:

$$n_{cs}^{(\tilde{p})}(l)=(CS_{init}+k\cdot l)\bmod N_{sc}^{RB};$$

wherein
- $n_{cs}^{(\tilde{p})}(l)$ represents the CS index corresponding to the symbol;
- $CS_{init}$ represents the CS configuration index;
- l represent the index of the symbol, and a value range of l is from 0 to $N_{symb}^{UL}-1$, wherein $N_{symb}^{UL}$ represents a quantity of symbols in one time unit;
- k represents a coefficient value, wherein k is positive integer greater than or equal to 1;
- $N_{SC}^{RB}$ represents a quantity of sub-carriers in one RB;
- mod represents a remainder function;

or,
the determining the CS index corresponding to the symbol according to the CS configuration index comprises:
determining the CS index corresponding to the symbol according to the index of the symbol and a preset mapping between the CS configuration index and a table, wherein the table records the CS index corresponding to the index of each symbol in the time unit.

2. The method according to claim 1, wherein the transmitting the PUCCH on the symbol according to the CS value comprises:
in case of using an OCC sequence, determining, according to the OCC sequence index, an OCC sequence corresponding to the OCC sequence index; and
transmitting the PUCCH on the symbol according to the CS value and the OCC sequence.

3. The method according to claim 2,
the determining the CS value corresponding to the symbol according to the CS index corresponding to the symbol comprises:
calculating the CS value $\alpha_{\tilde{p}}(l)$ corresponding to the symbol, according to the CS index corresponding to the symbol and through a second formula below:

$$\alpha_{\tilde{p}}(l)=2\pi \cdot n_{cs}^{(\tilde{p})}(l)/N_{sc}^{RB};$$

wherein
- $\alpha_{\tilde{p}}(l)$ represents the CS value corresponding to the symbol;
- $n_{cs}^{(\tilde{p})}(l)$ represents the CS index corresponding to the symbol;
- $N_{sc}^{RB}$ represents a quantity of sub-carriers in one RB.

4. The method according to claim 2, wherein the transmitting the PUCCH on the symbol according to the CS value comprises:
in case of using an OCC sequence, determining an OCC sequence index according to the configuration signaling, or determining an OCC sequence index according to CS configuration index and through a preset formula or a preset table;
determining, according to the OCC sequence index, the OCC sequence corresponding to the OCC sequence index; and
transmitting the PUCCH on the symbol, according to the CS value and the OCC sequence.

5. The method according to claim 1, wherein the transmitting the PUCCH on the symbol according to the CS value comprises:
determining, through a third formula below, a RB index $n_{PRB}$ of a RB where the PUCCH is transmitted, and transmitting the PUCCH on the symbol and the RB corresponding to the RB index:

$$n_{PRB} = \begin{cases} \left\lfloor \frac{m}{2} \right\rfloor & \text{if } (m \bmod 2)\bmod 2 = 0 \\ N_{RB}^{UL}-1-\left\lfloor \frac{m}{2} \right\rfloor & \text{if } (m \bmod 2)\bmod 2 = 1 \end{cases};$$

-continued or $$n_{PRB} = \begin{cases} \lfloor \frac{m}{2} \rfloor + N_{hop\text{-}offset1} & \text{if } (m \bmod 2) \bmod 2 = 0 \\ N_{RB}^{UL} - 1 - \lfloor \frac{m}{2} \rfloor - N_{hop\text{-}offset2} & \text{if } (m \bmod 2) \bmod 2 = 1 \end{cases};$$

wherein $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

or, in the case that a frequency hopping is used, determining the RB index $n_{PRB}$ of the RB where the PUCCH is transmitted through a fourth formula below, and transmitting the PUCCH on the symbol and the RB corresponding to the RB index:

$$n_{PRB} = \begin{cases} \lfloor \frac{m}{2} \rfloor & \text{if } (m + f_{hop} \bmod 2) \bmod 2 = 0 \\ N_{RB}^{UL} - 1 - \lfloor \frac{m}{2} \rfloor & \text{if } (m + f_{hop} \bmod 2) \bmod 2 = 1 \end{cases};$$

or $$n_{PRB} = \begin{cases} \lfloor \frac{m}{2} \rfloor + N_{hop\text{-}offset1} & \text{if } (m + f_{hop} \bmod 2) \bmod 2 = 0 \\ N_{RB}^{UL} - 1 - \lfloor \frac{m}{2} \rfloor - N_{hop\text{-}offset2} & \text{if } (m + f_{hop} \bmod 2) \bmod 2 = 1 \end{cases};$$

wherein $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

wherein $n_{PRB}$ represents the RB index of the RB for transmitting the PUCCH;

$n_{PUCCH}^{\tilde{p}}$ represents an index number of the PUCCH at an antenna port $\tilde{p}$;

$N_{sc}^{RB}$ represents a quantity of sub-carriers in one RB;

$\Delta_{shift}^{PUCCH}$ represents a CS spacing preconfigured by a high-layer signaling;

$N_{RB}^{UL}$ represents an uplink bandwidth or an uplink frequency hopping bandwidth;

$f_{hop}$ represents an index of the frequency hopping part;

$N_{offset}$ represents a staring positon of the PUCCH resource preconfigured by a high-layer signaling, wherein a value of $N_{offset}$ is greater than or equal to 0;

$N_{hop\text{-}offset1}$ and $N_{hop\text{-}offset2}$ represent uplink frequency hopping offsets;

c has a pre-defined value, c has a same value for PUCCHs with different symbol lengths, or c has independent values for PUCCHs with different symbol lengths, or c has independent values for PUCCHs with different multiplexing capacities.

6. An information transmission method, comprising:

acquiring a symbol occupied by a physical uplink control channel (PUCCH) in a time unit;

determining a cyclic shift (CS) value corresponding to the symbol; and receiving the PUCCH on the symbol according to the CS value;

wherein the determining the CS value corresponding to the symbol comprises:

Method 1 or Method 2;

wherein Method 1 comprises:

determining the PUCCH resource index, and notifying the PUCCH resource index to the terminal by the configuration information;

calculating the CS value $\alpha_{\tilde{p}}(n_s, l)$ corresponding to the symbol, according to the PUCCH resource index, the index of the symbol and an index of the time unit and through a second formula group below:

$$\alpha_{\tilde{p}}(n_s, l) = 2\pi \cdot n_{cs}^{(\tilde{p})}(n_s, l) / N_{sc}^{RB};$$

wherein $$n_{cs}^{(\tilde{p})}(n_s, l) = [n_{cs}^{cell}(n_s, l) + (n'_{\tilde{p}}(n_s) \cdot \Delta_{shift}^{PUCCH} + (n_{oc}^{(\tilde{p})}(n_s) \bmod \Delta_{shift}^{PUCCH})) \bmod N_{sc}^{RB}] \bmod N_{sc}^{RB};$$

wherein $$n'_{\tilde{p}}(n_s, f_{hop}) = (n_{PUCCH}^{\tilde{p}}) \bmod (c \cdot N_{SC}^{RB} / \Delta_{shift}^{PUCCH});$$

$$n_{cs}^{cell}(n_s, l) = \sum_{i=0}^{7} c(8 N_{symb}^{UL} \cdot n_s + 8l + i) \cdot 2^i;$$

wherein $\alpha_{\tilde{p}}(n_s, l)$ represents the CS value corresponding to the symbol;

$n_{cs}^{\tilde{p}}(n_s, l)$, $n'_{\tilde{p}}(n_s)$ and $n_{cs}^{cell}(n_s, l)$ represent intermediate parameters;

$n_{oc}^{(\tilde{p})}(n_s)$ represents an Orthogonal Cover Code (OCC) sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one resource block (RB);

$\Delta_{shift}^{PUCCH}$ represents a CS spacing preconfigured by a high-layer signaling;

$N_{symb}^{UL}$ represents a quantity of symbols in one time unit;

$n_s$ represents the index of the time unit;

l represents an index of the symbol in one time unit;

c has a pre-defined value, c has a same value for PUCCHs with different symbol lengths, or c has independent values for PUCCHs with different symbol lengths, or c has independent values for PUCCHs with different multiplexing capacities;

or, determining the PUCCH resource index, and notifying the PUCCH resource index to the terminal by the configuration information;

calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a third formula group below:

$$\alpha_{\tilde{p}}(n_s, f_{hop}, l) = 2\pi \cdot n_{cs}^{(\tilde{p})}(n_s, f_{hop}, l) / N_{sc}^{RB};$$

wherein $$n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH} + (n_{oc}^{(\tilde{p})}(n_s, f_{hop}) \bmod \Delta_{shift}^{PUCCH})) \bmod N_{sc}^{RB}] \bmod N_{sc}^{RB};$$

wherein $$n_{oc}^{(\tilde{p})}(n_s, f_{hop}) = \lfloor n'_{\tilde{p}}(n_s, f_{hop}) \cdot \Delta_{shift}^{PUCCH} / N_{sc}^{RB} \rfloor;$$

$$n_{cs}^{cell}(n_s, l) = \sum_{i=0}^{7} c(8 N_{symb}^{UL} \cdot n_s + 8l + i) \cdot 2^i;$$

in the case that a frequency hopping is used and the time unit comprises two frequency hopping parts, for a first frequency hopping part or when $f_{hop}$ mod 2=0, $$n'_{\tilde{p}}(n_s, f_{hop}) = (n_{PUCCH}^{\tilde{p}}) \bmod (c \cdot N_{SC}^{RB}/\Delta_{shift}^{PUCCH});$$

for a second frequency hopping part or when $f_{hop}$ mod 2=1, $$n'_{\tilde{p}}(n_s, f_{hop}) = [c(n'_{\tilde{p}}(n_s, f_{hop}-1)+1)] \bmod \left(c \cdot \frac{N_{SC}^{RB}}{\Delta_{shift}^{PUCCH}}+1\right)-1;$$

or, calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a fourth formula group below:

$$\alpha_{\tilde{p}}(n_s, f_{hop}, l) = 2\pi \cdot n_{cs}^{(\tilde{p})}(n_s, f_{hop}, l)/N_{sc}^{RB};$$

wherein $$n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH}) \bmod N_{sc}^{RB}] \bmod N_{sc}^{RB};$$

wherein $$n_{cs}^{cell}(n_s, l) = \Sigma_{i=0}^{7} c(8N_{symb}^{UL} \cdot n_s + 8l + i) \cdot 2^i;$$

in the case that a frequency hopping is used and the time unit comprises two frequency hopping parts, for a first frequency hopping part or when $f_{hop}$ mod 2=0, $$n'_{\tilde{p}}(n_s, f_{hop}) = (n_{PUCCH}^{\tilde{p}}) \bmod (c \cdot N_{SC}^{RB}/\Delta_{shift}^{PUCCH});$$

for a second frequency hopping part or when $f_{hop}$ mod 2=1, $$n'_{\tilde{p}}(n_s, f_{hop}) = [c(n'_{\tilde{p}}(n_s, f_{hop}-1)+1)] \bmod \left(c \cdot \frac{N_{SC}^{RB}}{\Delta_{shift}^{PUCCH}}+1\right)-1;$$

wherein $\alpha_{\tilde{p}}(n_s, f_{hop}, l)$ represents the CS value corresponding to the symbol;

$n_{cs}^{(\tilde{p})}(n_s, f_{hop}, l)$, $n_{cs}^{cell}(n_s, l)$, $n'_{\tilde{p}}(n_s, f_{hop})$ represent intermediate parameters;

$n_{oc}^{\tilde{p}}(n_s, f_{hop}, l)$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$N_{symb}^{UL}$ represents a quantity of symbols in one time unit;

$f_{hop}$ represents the index of the frequency hopping part;

$n_s$ represents the index of the time unit;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities;

or, calculating the CS value $\alpha_{\tilde{p}}(l)$ corresponding to the symbol, according to the PUCCH resource index and the index of the symbol and through a sixth formula group below:

$$\alpha_{\tilde{p}}(l) = 2\pi \cdot n_{cs}^{(\tilde{p})}(l)/N_{sc}^{RB};$$

wherein $$n_{cs}^{(\tilde{p})}(l) = [n_{cs}^{cell}(l) + (n'_{\tilde{p}} \cdot \Delta_{shift}^{PUCCH}) \bmod N_{sc}^{RB}] \bmod N_{sc}^{RB};$$

wherein $$n'_{\tilde{p}} = (n_{PUCCH}^{\tilde{p}}) \bmod (N_{sc}^{RB}/\Delta_{shift}^{PUCCH});$$

$$n_{cs}^{cell}(l) = \Sigma_{i=0}^{7} c(8l+i) \cdot 2^i;$$

wherein $\alpha_{\tilde{p}}(l)$ represents the CS value corresponding to the symbol;

$n_{cs}^{(\tilde{p})}(l)$, $n'_{\tilde{p}}$ and $n_{cs}^{cell}(l)$ represent intermediate parameters;

$n_{oc}^{(\tilde{p})}$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities;

or determining the PUCCH resource index, and notifying the PUCCH resource index to the terminal by the configuration information;

calculating the CS value $\alpha_{\tilde{p}}(f_{hop}, l)$, according to the PUCCH resource index, the index of the symbol and an index of the frequency hopping part and through a seventh formula group below:

$$\alpha_{\tilde{p}}(f_{hop}, l) = 2\pi \cdot n_{cs}^{(\tilde{p})}(f_{hop}, l)/N_{sc}^{RB};$$

wherein $$n_{cs}^{(\tilde{p})}(f_{hop}, l) = [n_{cs}^{cell}(l) + (n'_{\tilde{p}}(f_{hop}) \cdot \Delta_{shift}^{PUCCH} + (n_{oc}^{(\tilde{p})}(f_{hop})) \bmod \Delta_{shift}^{PUCCH})) \bmod N_{sc}^{RB}] \bmod N_{sc}^{RB}$$

wherein $$n_{oc}^{(\tilde{p})}(f_{hop}) = \lfloor n'_{\tilde{p}}(f_{hop}) \cdot \Delta_{shift}^{PUCCH}/N_{sc}^{RB} \rfloor;$$

$$n_{cs}^{cell}(l) = \Sigma_{i=0}^{7} c(8l+i) \cdot 2^i;$$

in the case that a frequency hopping is used and the time unit comprises two frequency hopping parts, for a first frequency hopping part or when $f_{hop}$ mod 2=0, $$n'_{\tilde{p}}(f_{hop}) = (n_{PUCCH}^{\tilde{p}}) \bmod (c \cdot N_{SC}^{RB}/\Delta_{shift}^{PUCCH});$$

for a second frequency hopping part or when $f_{hop}$ mod 2=1, $$n'_p(f_{hop}) = [c(n'_p(f_{hop}-1)+1)] \mod\left(c \cdot \frac{N_{SC}^{RB}}{\Delta_{shift}^{PUCCH}} + 1\right) - 1;$$

or calculating the CS value $\alpha_{\tilde{p}}(f_{hop}, l)$, according to the PUCCH resource index, the index of the symbol and an index of the frequency hopping part and through an eighth formula group below:

$$\alpha_{\tilde{p}}(f_{hop},l)=2\pi \cdot n_{cs}^{(\tilde{p})}(f_{hop},l)/N_{sc}^{RB};$$

wherein $$n_{cs}^{(\tilde{p})}(f_{hop},l)=[n_{cs}^{cell}(l)+(n'_{\tilde{p}}(f_{hop})\cdot\Delta_{shift}^{PUCCH}) \mod N_{sc}^{RB}] \mod N_{sc}^{RB}$$

wherein $$n_{cs}^{cell}(l)=\Sigma_{i=0}^{7} c(8l+i)\cdot 2^i;$$

in the case that a frequency hopping is used and the time unit comprises two frequency hopping parts,
for a first frequency hopping part or when $f_{hop}$ mod 2=0, $$n'_{\tilde{p}}(f_{hop})=(n_{PUCCH}^{\tilde{p}}) \mod(c \cdot N_{SC}^{RB}/\Delta_{shift}^{PUCCH});$$

for a second frequency hopping part or when $f_{hop}$ mod 2=1, $$n'_p(f_{hop}) = [c(n'_p(f_{hop}-1)+1)] \mod\left(c \cdot \frac{N_{SC}^{RB}}{\Delta_{shift}^{PUCCH}} + 1\right) - 1;$$

wherein
$\alpha_{\tilde{p}}(f_{hop}, l)$ represents the CS value corresponding to the symbol;
$n_{cs}^{(\tilde{p})}(f_{hop}, l)$ and $n_{cs}^{cell}(l)$ and $n'_{\tilde{p}}(f_{hop})$ represent intermediate parameters;
$n_{oc}^{\tilde{p}}(f_{hop})$ represents an OCC sequence index;
c ( ) represents a pseudorandom sequence;
$n_{PUCCH}^{\tilde{p}}$ represents an index number of the PUCCH at an antenna port $\tilde{p}$;
mod represents a remainder function;
$N_{sc}^{RB}$ represents a quantity of sub-carriers in one RB;
$\Delta_{shift}^{PUCCH}$ represents a CS spacing preconfigured by a high-layer signaling;
$f_{hop}$ represents the index of the frequency hopping part;
l represents the index of the symbol in one time unit;
c has a pre-defined value, c has a same value for PUCCHs with different symbol lengths, or c has independent values for PUCCHs with different symbol lengths, or c has independent values for PUCCHs with different multiplexing capacities;
wherein Method 2 comprises:
determining the CS configuration index, and the notifying the CS configuration index to the terminal by the configuration signaling;
determining a CS index corresponding to the symbol according to the CS configuration index; and
determining the CS value corresponding to the symbol according to the CS index corresponding to the symbol;

wherein the determining the CS index corresponding to the symbol according to the CS configuration index comprises:
calculating the CS index $n_{cs}^{(\tilde{p})}(l)$ corresponding to the symbol, according to the CS configuration index and the index of the symbol and through a first formula below:

$$n_{cs}^{(\tilde{p})}(l)=(CS_{init}+k\cdot l) \mod N_{SC}^{RB};$$

wherein
$n_{cs}^{(\tilde{p})}(l)$ represents the CS index corresponding to the symbol;
$CS_{init}$ represents the CS configuration index;
l represent the index of the symbol, and a value range of l is from 0 to $N_{symb}^{UL}-1$, wherein $N_{symb}^{UL}$ represents a quantity of symbols in one time unit;
k represents a coefficient value, wherein k is positive integer greater than or equal to 1;
$N_{SC}^{RB}$ represents a quantity of sub-carriers in one RB;
mod represents a remainder function;
or,
the determining the CS index corresponding to the symbol according to the CS configuration index comprises:
determining the CS index corresponding to the symbol according to the index of the symbol and a preset mapping between the CS configuration index and a table, wherein the table records the CS index corresponding to the index of each symbol in the time unit.

7. The method according to claim 6,
wherein the receiving the PUCCH on the symbol according to the CS value comprises:
in case of using an OCC sequence, determining, according to the OCC sequence index, an OCC sequence corresponding to the OCC sequence index; and
receiving the PUCCH on the symbol according to the CS value and the OCC sequence.

8. The method according to claim 7, wherein
the determining the CS value corresponding to the symbol according to the CS index corresponding to the symbol comprises:
calculating the CS value $\alpha_{\tilde{p}}(l)$ corresponding to the symbol, according to the CS index corresponding to the symbol and through a second formula below:

$$\alpha_{\tilde{p}}(l)=2\pi \cdot n_{cs}^{(\tilde{p})}(l)/N_{sc}^{RB}$$

wherein
$\alpha_{\tilde{p}}(l)$ represents the CS value corresponding to the symbol;
$n_{CS}^{(\tilde{p})}(l)$ represents the CS index corresponding to the symbol;
$N_{sc}^{RB}$ represents a quantity of sub-carriers in one RB.

9. The method according to claim 7, wherein the receiving the PUCCH on the symbol according to the CS value comprises:
in case of using an OCC sequence, determining an OCC sequence index according to the configuration signaling, or determining an OCC sequence index according to CS configuration index and through a preset formula or a preset table;
determining, according to the OCC sequence index, the OCC sequence corresponding to the OCC sequence index; and
transmitting the PUCCH on the symbol, according to the CS value and the OCC sequence.

10. The method according to claim 6, wherein the receiving the PUCCH on the symbol according to the CS value comprises:
determining, through a third formula below, a RB index $n_{PRB}$ of a RB where the PUCCH is transmitted, and transmitting the PUCCH on the symbol and the RB corresponding to the RB index:

$$n_{PRB} = \begin{cases} \lfloor \frac{m}{2} \rfloor & \text{if } (m \bmod 2) \bmod 2 = 0 \\ N_{RB}^{UL} - 1 - \lfloor \frac{m}{2} \rfloor & \text{if } (m \bmod 2) \bmod 2 = 1 \end{cases};$$

or $$n_{PRB} = \begin{cases} \lfloor \frac{m}{2} \rfloor + N_{hop\text{-}offset\,1} & \text{if } (m \bmod 2) \bmod 2 = 0 \\ N_{RB}^{UL} - 1 - \lfloor \frac{m}{2} \rfloor - N_{hop\text{-}offset\,2} & \text{if } (m \bmod 2) \bmod 2 = 1 \end{cases};$$

wherein $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

or,
in the case that a frequency hopping is used, determining the RB index $n_{PRB}$ of the RB where the PUCCH is transmitted through a fourth formula below, and transmitting the PUCCH on the symbol and the RB corresponding to the RB index:

$$n_{PRB} = \begin{cases} \lfloor \frac{m}{2} \rfloor & \text{if } (m + f_{hop} \bmod 2) \bmod 2 = 0 \\ N_{RB}^{UL} - 1 - \lfloor \frac{m}{2} \rfloor & \text{if } (m + f_{hop} \bmod 2) \bmod 2 = 1 \end{cases}; \text{ or }$$

$$n_{PRB} = \begin{cases} \lfloor \frac{m}{2} \rfloor + N_{hop\text{-}offset\,1} & \text{if } (m + f_{hop} \bmod 2) \bmod 2 = 0 \\ N_{RB}^{UL} - 1 - \lfloor \frac{m}{2} \rfloor - N_{hop\text{-}offset\,2} & \text{if } (m + f_{hop} \bmod 2) \bmod 2 = 1 \end{cases};$$

wherein $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

wherein
$n_{PRB}$ represents the RB index of the RB for transmitting the PUCCH;
$n_{PUCCH}^{\tilde{p}}$ represents an index number of the PUCCH at an antenna port $\tilde{p}$;
$N_{sc}^{RB}$ represents a quantity of sub-carriers in one RB;
$\Delta_{shift}^{PUCCH}$ represents a CS spacing preconfigured by a high-layer signaling;
$N_{RB}^{UL}$ represents an uplink bandwidth or an uplink frequency hopping bandwidth;
$f_{hop}$ represents an index of the frequency hopping part;
$N_{offset}$ represents a staring positon of the PUCCH resource preconfigured by a high-layer signaling, wherein a value of $N_{offset}$ is greater than or equal to 0;
$N_{hop\text{-}offset1}$ and $N_{hop\text{-}offset2}$ represent uplink frequency hopping offsets;
c has a pre-defined value, c has a same value for PUCCHs with different symbol lengths, or c has independent values for PUCCHs with different symbol lengths, or c has independent values for PUCCHs with different multiplexing capacities.

11. A terminal, comprising: a memory, a processor and a computer program stored in the memory and executable on the processor, wherein the processor executes the computer program to:
acquire a symbol occupied by a physical uplink control channel (PUCCH) in a time unit;
determine a cyclic shift (CS) value corresponding to the symbol; and
transmit the PUCCH on the symbol according to the CS value;
wherein the processor executes the computer program to perform Method 1 or Method 2;
wherein Method 1 comprises:
calculating the CS value $\alpha_{\tilde{p}}(n_s, l)$ corresponding to the symbol, according to the PUCCH resource index, the index of the symbol and an index of the time unit and through a second formula group below:

$$\alpha_{\tilde{p}}(n_s, l) = 2\pi \cdot n_{cs}^{(\tilde{p})}(n_s, l) / N_{sc}^{RB};$$

wherein $$n_{cs}^{(\tilde{p})}(n_s, l) = [n_{cs}^{cell}(n_s, l) + (n'_{\tilde{p}}(n_s) \cdot \Delta_{shift}^{PUCCH}) \bmod N_{sc}^{RB}] \bmod N_{sc}^{RB};$$

wherein $$n'_{\tilde{p}}(n_s) = (n_{PUCCH}^{\tilde{p}}) \bmod (c \cdot N_{sc}^{RB} / \Delta_{shift}^{PUCCH});$$

$$n_{cs}^{cell}(n_s, l) = \sum_{i=0}^{7} c(8 N_{symb}^{UL} \cdot n_s + 8l + i) \cdot 2^i;$$

wherein
$\alpha_{\tilde{p}}(n_s, l)$ represents the CS value corresponding to the symbol;
$n_{cs}^{\tilde{p}}(n_s, l)$, $n'_{\tilde{p}}(n_s)$ and $n_{cs}^{cell}(n_s, l)$ represent intermediate parameters;
$n_{oc}^{(\tilde{p})}(n_s)$ represents an Orthogonal Cover Code (OCC) sequence index;
c ( ) represents a pseudorandom sequence;
$n_{PUCCH}^{\tilde{p}}$ represents an index number of the PUCCH at an antenna port $\tilde{p}$;
mod represents a remainder function;
$N_{sc}^{RB}$ represents a quantity of sub-carriers in one resource block (RB);
$\Delta_{shift}^{PUCCH}$ represents a CS spacing preconfigured by a high-layer signaling;
$N_{symb}^{UL}$ represents a quantity of symbols in one time unit;
$n_s$ represents the index of the time unit;
l represents an index of the symbol in one time unit;
c has a pre-defined value, c has a same value for PUCCHs with different symbol lengths, or c has independent values for PUCCHs with different symbol lengths, or c has independent values for PUCCHs with different multiplexing capacities;
or,
calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a third formula group below:

$$\alpha_{\tilde{p}}(n_s, f_{hop}, l) = 2\pi \cdot n_{cs}^{(\tilde{p})}(n_s, f_{hop}, l) / N_{sc}^{RB};$$

wherein $$n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH} + (n_{oc}^{(\tilde{p})}(n_s, f_{hop}) \bmod \Delta_{shift}^{PUCCH})) \bmod N_{sc}^{RB}] \bmod N_{sc}^{RB};$$

wherein $$n_{oc}^{(\tilde{p})}(n_s,f_{hop})=\lfloor n'_{\tilde{p}}(n_s,f_{hop})\cdot\Delta_{shift}^{PUCCH}/N_{sc}^{RB}\rfloor;$$

$$n_{cs}^{cell}(n_s,l)=\sum_{i=0}^{7}c(8N_{symb}^{UL}\cdot n_s+8l+i)\cdot 2^i;$$

in the case that a frequency hopping is used and the time unit comprises two frequency hopping parts,
for a first frequency hopping part or when $f_{hop}$ mod 2=0, $$n'_{\tilde{p}}(n_s,f_{hop})=(n_{PUCCH}^{\tilde{p}})\bmod(c\cdot N_{SC}^{RB}/\Delta_{shift}^{PUCCH});$$

for a second frequency hopping part or when $f_{hop}$ mod 2=1, $$n'_p(n_s, f_{hop}) = [c(n'_p(n_s, f_{hop} - 1) + 1)]\bmod\left(c\cdot\frac{N_{SC}^{RB}}{\Delta_{shift}^{PUCCH}} + 1\right) - 1;$$

or,
calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a fourth formula group below:

$$\alpha_{\tilde{p}}(n_s,f_{hop},l)=2\pi\cdot n_{cs}^{(\tilde{p})}(n_s,f_{hop},l)/N_{sc}^{RB};$$

wherein $$n_{cs}^{(\tilde{p})}(n_s,f_{hop},l)=[n_{cs}^{cell}(n_s,l)+(n'_{\tilde{p}}(n_s,f_{hop})\cdot\Delta_{shift}^{PUCCH})\bmod N_{sc}^{RB}]\bmod N_{sc}^{RB};$$

wherein $$n_{cs}^{cell}(n_s,l)=\sum_{i=0}^{7}c(8N_{symb}^{UL}\cdot n_s+8l+i)\cdot 2^i;$$

in the case that a frequency hopping is used and the time unit comprises two frequency hopping parts,
for a first frequency hopping part or when $f_{hop}$ mod 2=0, $$n'_{\tilde{p}}(n_s,f_{hop})=(n_{PUCCH}^{\tilde{p}})\bmod(c\cdot N_{SC}^{RB}/\Delta_{shift}^{PUCCH});$$

for a second frequency hopping part or when $f_{hop}$ mod 2=1, $$n'_p(n_s, f_{hop}) = [c(n'_p(n_s, f_{hop} - 1) + 1)]\bmod\left(c\cdot\frac{N_{SC}^{RB}}{\Delta_{shift}^{PUCCH}} + 1\right) - 1;$$

wherein
$\alpha_{\tilde{p}}(n_s, f_{hop}, l)$ represents the CS value corresponding to the symbol;
$n_{cs}^{(\tilde{p})}(n_s, f_{hop}, l)$, $n_{cs}^{cell}(n_s, l)$ and $n'_{\tilde{p}}(n_s, f_{hop})$ represent intermediate parameters;
$n_{oc}^{\tilde{p}}(n_s, f_{hop})$ represents an OCC sequence index;
c ( ) represents a pseudorandom sequence;
$n_{PUCCH}^{\tilde{p}}$ represents an index number of the PUCCH at an antenna port $\tilde{p}$;
mod represents a remainder function;
$N_{sc}^{RB}$ represents a quantity of sub-carriers in one RB;
$\Delta_{shift}^{PUCCH}$ represents a CS spacing preconfigured by a high-layer signaling;
$N_{symb}^{UL}$ represents a quantity of symbols in one time unit;
$f_{hop}$ represents the index of the frequency hopping part;
$n_s$ represents the index of the time unit;
l represents the index of the symbol in one time unit;
c has a pre-defined value, c has a same value for PUCCHs with different symbol lengths, or c has independent values for PUCCHs with different symbol lengths, or c has independent values for PUCCHs with different multiplexing capacities;
or,
calculating the CS value $\alpha_{\tilde{p}}(l)$ corresponding to the symbol, according to the PUCCH resource index and the index of the symbol and through a sixth formula group below:

$$\alpha_{\tilde{p}}(l)=2\pi\cdot n_{cs}^{(\tilde{p})}(l)/N_{sc}^{RB};$$

wherein $$n_{cs}^{(\tilde{p})}(l)=[n_{cs}^{cell}(l)+(n'_{\tilde{p}}\cdot\Delta_{shift}^{PUCCH})\bmod N_{sc}^{RB}]\bmod N_{sc}^{RB};$$

wherein $$n'_{\tilde{p}}=(n_{PUCCH}^{\tilde{p}})\bmod(N_{sc}^{RB}/\Delta_{shift}^{PUCCH});$$

$$n_{cs}^{cell}(l)=\sum_{i=0}^{7}c(8l+i)\cdot 2^i;$$

wherein
$\alpha_{\tilde{p}}(l)$ represents the CS value corresponding to the symbol;
$n_{cs}^{\tilde{p}}(l)$, $n'_{\tilde{p}}$ and $n_{cs}^{cell}(l)$ represent intermediate parameters;
$n_{oc}^{(\tilde{p})}$ represents an OCC sequence index;
c ( ) represents a pseudorandom sequence;
$n_{PUCCH}^{\tilde{p}}$ represents an index number of the PUCCH at an antenna port $\tilde{p}$;
mod represents a remainder function;
$N_{sc}^{RB}$ represents a quantity of sub-carriers in one RB;
$\Delta_{shift}^{PUCCH}$ represents a CS spacing preconfigured by a high-layer signaling;
l represents the index of the symbol in one time unit;
c has a pre-defined value, c has a same value for PUCCHs with different symbol lengths, or c has independent values for PUCCHs with different symbol lengths, or c has independent values for PUCCHs with different multiplexing capacities;
or,
calculating the CS value $\alpha_{\tilde{p}}(f_{hop}, l)$, according to the PUCCH resource index, the index of the symbol and an index of the frequency hopping part and through a seventh formula group below:

$$\alpha_{\tilde{p}}(f_{hop},l)=2\pi\cdot n_{cs}^{(\tilde{p})}(f_{hop},l)/N_{sc}^{RB};$$

wherein $$n_{cs}^{(\tilde{p})}(f_{hop},l)=[n_{cs}^{cell}(l)+(n'_{\tilde{p}}(f_{hop})\cdot\Delta_{shift}^{PUCCH}+(n_{oc}^{(\tilde{p})}(f_{hop})\bmod\Delta_{shift}^{PUCCH}))\bmod N_{sc}^{RB}]\bmod N_{sc}^{RB};$$

wherein $$n_{oc}^{(\tilde{p})}(f_{hop})=\lfloor n'_{\tilde{p}}(f_{hop})\cdot\Delta_{shift}^{PUCCH}/N_{sc}^{RB}\rfloor;$$

$$n_{cs}^{cell}(l)=\sum_{i=0}^{7}c(8l+i)\cdot 2^i;$$

in the case that a frequency hopping is used and the time unit comprises two frequency hopping parts,
for a first frequency hopping part or when $f_{hop}$ mod 2=0, $$n'_{\tilde{p}}(f_{hop})=(n_{PUCCH}^{\tilde{p}})\bmod(c\cdot N_{SC}^{RB}/\Delta_{shift}^{PUCCH});$$

for a second frequency hopping part or when $f_{hop}$ mod 2=1, $$n'_p(f_{hop}) = [c(n'_p(f_{hop}-1)+1)] \mathrm{mod}\left(c \cdot \frac{N_{SC}^{RB}}{\Delta_{shift}^{PUCCH}}+1\right)-1;$$

or calculating the CS value $\alpha_{\tilde{p}}(f_{hop}, 1)$, according to the PUCCH resource index, the index of the symbol and an index of the frequency hopping part and through an eighth formula group below:

$$\alpha_{\tilde{p}}(f_{hop},l)=2\pi \cdot n_{cs}^{(\tilde{p})}(f_{hop},l)/N_{sc}^{RB};$$

wherein $$n_{cs}^{(\tilde{p})}(f_{hop},l)=[n_{cs}^{cell}(l)+(n'_{\tilde{p}}(f_{hop}) \cdot \Delta_{shift}^{PUCCH}) \mathrm{mod}\ N_{sc}^{RB}]\ \mathrm{mod}\ N_{sc}^{RB};$$

wherein $$n_{cs}^{cell}(l)=\Sigma_{i=0}^{7} c(8l+i) \cdot 2^i;$$

in the case that a frequency hopping is used and the time unit comprises two frequency hopping parts, for a first frequency hopping part or when $f_{hop}$ mod 2=0, $$n'_{\tilde{p}}(f_{hop})=(n_{PUCCH}^{\tilde{p}}) \mathrm{mod}(c \cdot N_{SC}^{RB}/\Delta_{shift}^{PUCCH});$$

for a second frequency hopping part or when $f_{hop}$ mod 2=1, $$n'_{\tilde{p}}(f_{hop}) = [c(n'_{\tilde{p}}(f_{hop}-1)+1)] \mathrm{mod}\left(c \cdot \frac{N_{SC}^{RB}}{\Delta_{shift}^{PUCCH}}+1\right)-1;$$

wherein $\alpha_{\tilde{p}}(f_{hop}, 1)$ represents the CS value corresponding to the symbol;

$n_{cs}^{(\tilde{p})}(f_{hop},1)$, $n_{cs}^{cell}(l)$ and $n'_{\tilde{p}}(f_{hop})$ represent intermediate parameters;

$n_{oc}^{\tilde{p}}(f_{hop})$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$f_{hop}$ represents the index of the frequency hopping part;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities;

wherein Method 2 comprises:

receiving the configuration signaling, and obtaining the CS configuration index according to the configuration signaling;

determining a CS index corresponding to the symbol according to the CS configuration index; and determining the CS value corresponding the symbol according to the CS index corresponding to the symbol;

wherein the determining the CS index corresponding to the symbol according to the CS configuration index comprises:

calculating the CS index $n_{cs}^{(\tilde{p})}(l)$ corresponding to the symbol, according to the CS configuration index and the index of the symbol and through a first formula below:

$$n_{cs}^{(\tilde{p})}(l)=(CS_{init}+k \cdot l) \mathrm{mod}\ N_{SC}^{RB}$$

wherein $n_{cs}^{(\tilde{p})}(l)$ represents the CS index corresponding to the symbol;

$CS_{init}$ represents the CS configuration index;

l represent the index of the symbol, and a value range of l is from 0 to $N_{symb}^{UL}-1$, wherein $N_{symb}^{UL}$ represents a quantity of symbols in one time unit;

k represents a coefficient value, wherein k is positive integer greater than or equal to 1;

$N_{SC}^{RB}$ represents a quantity of sub-carriers in one RB;

mod represents a remainder function;

or, determining the CS index corresponding to the symbol according to the index of the symbol and a preset mapping between the CS configuration index and a table, wherein the table records the CS index corresponding to the index of each symbol in the time unit.

12. The terminal according to claim 11, wherein the processor executes the computer program to:

in case of using an OCC sequence, determine, according to the OCC sequence index, an OCC sequence corresponding to the OCC sequence index; and transmit the PUCCH on the symbol according to the CS value and the OCC sequence.

13. The terminal according to claim 12, wherein the processor executes the computer program to:

calculate the CS value $\alpha_{\tilde{p}}(l)$ corresponding to the symbol, according to the CS index corresponding to the symbol and through a second formula below:

$$\alpha_{\tilde{p}}(l)=2\pi \cdot n_{cs}^{(\tilde{p})}(l)/N_{sc}^{RB};$$

wherein $\alpha_{\tilde{p}}(l)$ represents the CS value corresponding to the symbol;

$n_{cs}(\tilde{p})(l)$ represents the CS index corresponding to the symbol;

$N_{sc}^{RB}$ represents a quantity of sub-carriers in one RB.

14. The terminal according to claim 12, wherein processor executes the computer program to:

in case of using an OCC sequence, determine an OCC sequence index according to the configuration signaling, or determine an OCC sequence index according to CS configuration index and through a preset formula or a preset table;

determine, according to the OCC sequence index, the OCC sequence corresponding to the OCC sequence index; and transmit the PUCCH on the symbol, according to the CS value and the OCC sequence.

15. The terminal according to claim 11, wherein processor executes the computer program to:

determine, through a third formula below, a RB index $n_{PRB}$ of a RB where the PUCCH is transmitted, and transmitting the PUCCH on the symbol and the RB corresponding to the RB index:

$$n_{PRB} = \begin{cases} \left\lfloor \frac{m}{2} \right\rfloor & \text{if } (m\ \mathrm{mod}2)\mathrm{mod}2 = 0 \\ N_{RB}^{UL}-1-\left\lfloor \frac{m}{2} \right\rfloor & \text{if } (m\ \mathrm{mod}2)\mathrm{mod}2 = 1 \end{cases};$$

-continued or $$n_{PRB} = \begin{cases} \lfloor \frac{m}{2} \rfloor + N_{hop\text{-}offset1} & \text{if } (m \bmod 2) \bmod 2 = 0 \\ N_{RB}^{UL} - 1 - \lfloor \frac{m}{2} \rfloor - N_{hop\text{-}offset2} & \text{if } (m \bmod 2) \bmod 2 = 1 \end{cases};$$

wherein $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

or, in the case that a frequency hopping is used, determining the RB index $n_{PRB}$ of the RB where the PUCCH is transmitted through a fourth formula below, and transmitting the PUCCH on the symbol and the RB corresponding to the RB index:

$$n_{PRB} = \begin{cases} \lfloor \frac{m}{2} \rfloor & \text{if } (m + f_{hop} \bmod 2) \bmod 2 = 0 \\ N_{RB}^{UL} - 1 - \lfloor \frac{m}{2} \rfloor & \text{if } (m + f_{hop} \bmod 2) \bmod 2 = 1 \end{cases}; \text{ or}$$

$$n_{PRB} = \begin{cases} \lfloor \frac{m}{2} \rfloor + N_{hop\text{-}offset1} & \text{if } (m + f_{hop} \bmod 2) \bmod 2 = 0 \\ N_{RB}^{UL} - 1 - \lfloor \frac{m}{2} \rfloor - N_{hop\text{-}offset2} & \text{if } (m + f_{hop} \bmod 2) \bmod 2 = 1 \end{cases};$$

wherein $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

wherein $n_{PRB}$ represents the RB index of the RB for transmitting the PUCCH;

$n_{PUCCH}^{\tilde{p}}$ represents an index number of the PUCCH at an antenna port $\tilde{p}$;

$N_{sc}^{RB}$ represents a quantity of sub-carriers in one RB;

$\Delta_{shift}^{PUCCH}$ represents a CS spacing preconfigured by a high-layer signaling;

$N_{RB}^{UL}$ represents an uplink bandwidth or an uplink frequency hopping bandwidth;

$f_{hop}$ represents an index of the frequency hopping part;

$N_{offset}$ represents a staring positon of the PUCCH resource preconfigured by a high-layer signaling, wherein a value of $N_{offset}$ is greater than or equal to 0;

$N_{hop\text{-}offset1}$ and $N_{hop\text{-}offset2}$ represent uplink frequency hopping offsets;

c has a pre-defined value, c has a same value for PUCCHs with different symbol lengths, or c has independent values for PUCCHs with different symbol lengths, or c has independent values for PUCCHs with different multiplexing capacities.

16. A base station, comprising: a memory, a processor and a computer program stored in the memory and executable on the processor, wherein the processor executes the computer program to:

acquire a symbol occupied by a physical uplink control channel (PUCCH) in a time unit;

determine a cyclic shift (CS) value corresponding to the symbol; and receive the PUCCH on the symbol according to the CS value;

wherein the processor executes the computer program to perform Method 1 or Method 2;

wherein Method 1 comprises determining the PUCCH resource index, and notify the PUCCH resource index to the terminal by the configuration information;

calculating the CS value $\alpha_{\tilde{p}}(n_s, l)$ corresponding to the symbol, according to the PUCCH resource index, the index of the symbol and an index of the time unit and through a second formula group below:

$$\alpha_{\tilde{p}}(n_s, l) = 2\pi \cdot n_{cs}^{(\tilde{p})}(n_s, l) / N_{sc}^{RB};$$

wherein $$n_{cs}^{(\tilde{p})}(n_s, l) = [n_{cs}^{cell}(n_s, l) + (n'_{\tilde{p}}(n_s) \cdot \Delta_{shift}^{PUCCH}) \bmod N_{sc}^{RB}] \bmod N_{sc}^{RB};$$

wherein $$n'_{\tilde{p}}(n_s) = (n_{PUCCH}^{\tilde{p}}) \bmod (c \cdot N_{sc}^{RB} / \Delta_{shift}^{PUCCH});$$

$$n_{cs}^{cell}(n_s, l) = \Sigma_{i=0}^{7} c(8 N_{symb}^{UL} \cdot n_s + 8l + i) \cdot 2^i;$$

wherein $\alpha_{\tilde{p}}(n_s, l)$ represents the CS value corresponding to the symbol;

$n_{cs}^{\tilde{p}}(n_s, l)$, $n'_{\tilde{p}}(n_s)$ and $n_{cs}^{cell}(n_s, l)$ represent intermediate parameters;

$n_{oc}^{(\tilde{p})}(n_s)$ represents an Orthogonal Cover Code (OCC) sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one resource block (RB);

$\Delta_{shift}^{PUCCH}$ represents a CS spacing preconfigured by a high-layer signaling;

$N_{symb}^{UL}$ represents a quantity of symbols in one time unit;

$n_s$ represents the index of the time unit;

l represents an index of the symbol in one time unit;

c has a pre-defined value, c has a same value for PUCCHs with different symbol lengths, or c has independent values for PUCCHs with different symbol lengths, or c has independent values for PUCCHs with different multiplexing capacities;

or, determining the PUCCH resource index, and notifying the PUCCH resource index to the terminal by the configuration information;

calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a third formula group below:

$$\alpha_{\tilde{p}}(n_s, f_{hop}, l) = 2\pi \cdot n_{cs}^{(\tilde{p})}(n_s, f_{hop}, l) / N_{sc}^{RB};$$

wherein $$n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH} + (n_{oc}^{(\tilde{p})}(n_s, f_{hop}) \bmod \Delta_{shift}^{PUCCH})) \bmod N_{sc}^{RB}] \bmod N_{sc}^{RB};$$

wherein $$n_{oc}^{(\tilde{p})}(n_s, f_{hop}) = \lfloor n'_{\tilde{p}}(n_s, f_{hop}) \cdot \Delta_{shift}^{PUCCH} / N_{sc}^{RB} \rfloor;$$

$$n_{cs}^{cell}(n_s, l) = \Sigma_{i=0}^{7} c(8 N_{symb}^{UL} \cdot n_s + 8l + i) \cdot 2^i;$$

in the case that a frequency hopping is used and the time unit comprises two frequency hopping parts, for a first frequency hopping part or when $f_{hop}$ mod 2=0, $$n'_{\tilde{p}}(n_s, f_{hop}) = (n_{PUCCH}^{\tilde{p}}) \bmod (c \cdot N_{SC}^{RB}/\Delta_{shift}^{PUCCH});$$

for a second frequency hopping part or when $f_{hop}$ mod 2=1, $$n'_{\tilde{p}}(n_s, f_{hop}) = [c(n'_{\tilde{p}}(n_s, f_{hop}-1)+1)] \bmod \left(c \cdot \frac{N_{SC}^{RB}}{\Delta_{shift}^{PUCCH}}+1\right) - 1;$$

or, calculating the CS value $\alpha_{\tilde{p}}(n_s, f_{hop}, l)$ corresponding to the symbol, according to the PUCCH resource index, the index of the symbol, an index of the time unit and an index of the frequency hopping part and through a fourth formula group below:

$$\alpha_{\tilde{p}}(n_s, f_{hop}, l) = 2\pi \cdot n_{cs}^{(\tilde{p})}(n_s, f_{hop}, l)/N_{sc}^{RB};$$

wherein $$n_{cs}^{(\tilde{p})}(n_s, f_{hop}, l) = [n_{cs}^{cell}(n_s, l) + (n'_{\tilde{p}}(n_s, f_{hop}) \cdot \Delta_{shift}^{PUCCH}) \bmod N_{sc}^{RB}] \bmod N_{sc}^{RB};$$

wherein $$n_{cs}^{cell}(n_s, l) = \Sigma_{i=0}^{7} c(8N_{symb}^{UL} \cdot n_s + 8l + i) \cdot 2^i;$$

in the case that a frequency hopping is used and the time unit comprises two frequency hopping parts, for a first frequency hopping part or when $f_{hop}$ mod 2=0, $$n'_{\tilde{p}}(n_s, f_{hop}) = (n_{PUCCH}^{\tilde{p}}) \bmod (c \cdot N_{SC}^{RB}/\Delta_{shift}^{PUCCH});$$

for a second frequency hopping part or when $f_{hop}$ mod 2=1, $$n'_{\tilde{p}}(n_s, f_{hop}) = [c(n'_{\tilde{p}}(n_s, f_{hop}-1)+1)] \bmod \left(c \cdot \frac{N_{SC}^{RB}}{\Delta_{shift}^{PUCCH}}+1\right) - 1;$$

wherein $\alpha_{\tilde{p}}(n_s, f_{hop}, l)$ represents the CS value corresponding to the symbol;

$n_{cs}^{(\tilde{p})}(n_s, f_{hop}, l)$, $n_{cs}^{cell}(n_s, l)$ and $n'\tilde{p}(n_s, f_{hop})$ represent intermediate parameters;

$n_{oc}^{\tilde{p}}(n_s, f_{hop})$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

$N_{symb}^{UL}$ represents a quantity of symbols in one time unit;

$f_{hop}$ represents the index of the frequency hopping part;

$n_s$ represents the index of the time unit;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities;

or, calculating the CS value $\alpha_{\tilde{p}}(l)$ corresponding to the symbol, according to the PUCCH resource index and the index of the symbol and through a sixth formula group below:

$$\alpha_{\tilde{p}}(l) = 2\pi \cdot n_{cs}^{(\tilde{p})}(l)/N_{sc}^{RB};$$

wherein $$n_{cs}^{(\tilde{p})}(l) = [n_{cs}^{cell}(l) + (n'_{\tilde{p}} \cdot \Delta_{shift}^{PUCCH}) \bmod N_{sc}^{RB}] \bmod N_{sc}^{RB};$$

wherein $$n'_{\tilde{p}} = (n_{PUCCH}^{\tilde{p}}) \bmod (N_{sc}^{RB}/\Delta_{shift}^{PUCCH});$$

$$n_{cs}^{cell}(l) = \Sigma_{i=0}^{7} c(8l+i) \cdot 2^i;$$

wherein $\alpha_{\tilde{p}}(l)$ represents the CS value corresponding to the symbol;

$n_{cs}^{\tilde{p}}(l)$, $n'_{\tilde{p}}$ and $n_{cs}^{cell}(l)$ represent intermediate parameters;

$n_{oc}^{(\tilde{p})}$ represents an OCC sequence index;

c ( ) represents a pseudorandom sequence;

$n_{PUCCH}^{\tilde{p}}$ represents an index number of the PUCCH at an antenna port $\tilde{p}$;

mod represents a remainder function;

$N_{sc}^{RB}$ represents a quantity of sub-carriers in one RB;

$\Delta_{shift}^{PUCCH}$ represents a CS spacing preconfigured by a high-layer signaling;

l represents the index of the symbol in one time unit;

c has a pre-defined value, c has a same value for PUCCHs with different symbol lengths, or c has independent values for PUCCHs with different symbol lengths, or c has independent values for PUCCHs with different multiplexing capacities;

or, determining the PUCCH resource index, and notifying the PUCCH resource index to the terminal by the configuration information;

calculating the CS value $\alpha_{\tilde{p}}(f_{hop}, l)$, according to the PUCCH resource index, the index of the symbol and an index of the frequency hopping part and through a seventh formula group below:

$$\alpha_{\tilde{p}}(f_{hop}, l) = 2\pi \cdot n_{cs}^{(\tilde{p})}(f_{hop}, l)/N_{sc}^{RB};$$

wherein $$n_{cs}^{(\tilde{p})}(f_{hop}, l) = [n_{cs}^{cell}(l) + (n'_{\tilde{p}}(f_{hop}) \cdot \Delta_{shift}^{PUCCH} + (n_{oc}^{(\tilde{p})}(f_{hop}) \bmod \Delta_{shift}^{PUCCH})) \bmod N_{sc}^{RB}] \bmod N_{sc}^{RB}$$

wherein $$n_{oc}^{(\tilde{p})}(f_{hop}) = \lfloor n'_{\tilde{p}}(f_{hop}) \cdot \Delta_{shift}^{PUCCH}/N_{sc}^{RB} \rfloor;$$

$$n_{cs}^{cell}(l) = \Sigma_{i=0}^{7} c(8l+i) \cdot 2^i;$$

in the case that a frequency hopping is used and the time unit comprises two frequency hopping parts, for a first frequency hopping part or when $f_{hop}$ mod 2=0, $$n'_{\tilde{p}}(f_{hop}) = (n_{PUCCH}^{\tilde{p}}) \bmod (c \cdot N_{SC}^{RB}/\Delta_{shift}^{PUCCH});$$

for a second frequency hopping part or when $f_{hop}$ mod 2=1, $$n'_{\tilde{p}}(f_{hop}) = [c(n'_{\tilde{p}}(f_{hop}-1)+1)] \bmod \left(c \cdot \frac{N_{SC}^{RB}}{\Delta_{shift}^{PUCCH}}+1\right)-1;$$

or calculating the CS value $\alpha_{\tilde{p}}(f_{hop}, l)$, according to the PUCCH resource index, the index of the symbol and an index of the frequency hopping part and through a eighth formula group below:

$$\alpha_{\tilde{p}}(f_{hop},l)=2\pi \cdot n_{cs}^{(\tilde{p})}(f_{hop},l)/N_{sc}^{RB};$$

wherein $$n_{cs}^{(\tilde{p})}(f_{hop},l)=[n_{cs}^{cell}(l)+(n'_{\tilde{p}}(f_{hop})\cdot\Delta_{shift}^{PUCCH}) \bmod N_{sc}^{RB}] \bmod N_{sc}^{RB}$$

wherein $$n_{cs}^{cell}(l)=\Sigma_{i=0}^{7}c(8l+i)\cdot 2^{i};$$

in the case that a frequency hopping is used and the time unit comprises two frequency hopping parts,
for a first frequency hopping part or when $f_{hop}$ mod 2=0, $$n'_{\tilde{p}}(f_{hop})=(n_{PUCCH}^{\tilde{p}}) \bmod (c \cdot N_{SC}^{RB}/\Delta_{shift}^{PUCCH});$$

for a second frequency hopping part or when $f_{hop}$ mod 2=1, $$n'_{\tilde{p}}(f_{hop}) = [c(n'_{\tilde{p}}(f_{hop}-1)+1)] \bmod \left(c \cdot \frac{N_{SC}^{RB}}{\Delta_{shift}^{PUCCH}}+1\right)-1;$$

wherein
$\alpha_{\tilde{p}}(f_{hop}, l)$ represents the CS value corresponding to the symbol;
$n_{cs}^{(\tilde{p})}(f_{hop},l)$, $n_{cs}^{cell}(l)$ and $n'_{(\tilde{p})}(f_{hop})$ represent intermediate parameters;
$n_{oc}^{\tilde{p}}(f_{hop})$ represents an OCC sequence index;
c ( ) represents a pseudorandom sequence;
$n_{PUCCH}^{\tilde{p}}$ represents an index number of the PUCCH at an antenna port $\tilde{p}$;
mod represents a remainder function;
$N_{sc}^{RB}$ represents a quantity of sub-carriers in one RB;
$\Delta_{shift}^{PUCCH}$ represents a CS spacing preconfigured by a high-layer signaling;
$f_{hop}$ represents the index of the frequency hopping part;
l represents the index of the symbol in one time unit;
c has a pre-defined value, c has a same value for PUCCHs with different symbol lengths, or c has independent values for PUCCHs with different symbol lengths, or c has independent values for PUCCHs with different multiplexing capacities;
wherein Method 2 comprises:
determining the CS configuration index, and the notifying the CS configuration index to the terminal by the configuration signaling;
determining a CS index corresponding to the symbol according to the CS configuration index; and
determining the CS value corresponding to the symbol according to the CS index corresponding to the symbol;
wherein the determining the CS index corresponding to the symbol according to the CS configuration index comprises;

calculating the CS index $n_{cs}^{(\tilde{p})}(l)$ corresponding to the symbol, according to the CS configuration index and the index of the symbol and through a first formula below:

$$n_{cs}^{(\tilde{p})}(l)=(CS_{init}+k\cdot l) \bmod N_{SC}^{RB};$$

wherein
$n_{cs}^{(\tilde{p})}(l)$ represents the CS index corresponding to the symbol;
$CS_{init}$ represents the CS configuration index;
l represent the index of the symbol, and a value range of l is from 0 to $N_{symb}^{UL}-1$, wherein $N_{symb}^{UL}$ represents a quantity of symbols in one time unit;
k represents a coefficient value, wherein k is positive integer greater than or equal to 1;
$N_{SC}^{RB}$ represents a quantity of sub-carriers in one RB;
mod represents a remainder function;
or,
determining the CS index corresponding to the symbol according to the index of the symbol and a preset mapping between the CS configuration index and a table, wherein the table records the CS index corresponding to the index of each symbol in the time unit.

17. The base station according to claim 16, wherein the processor executes the computer program to:
in case of using an OCC sequence, determine, according to the OCC sequence index, an OCC sequence corresponding to the OCC sequence index; and
receive the PUCCH on the symbol according to the CS value and the OCC sequence.

18. The base station according to claim 17, wherein the second determining sub-unit is configured to:
calculate the CS value $\alpha_{\tilde{p}}(l)$ corresponding to the symbol, according to the CS index corresponding to the symbol and through a second formula below:

$$\alpha_{\tilde{p}}(l)=2\pi \cdot n_{cs}^{(\tilde{p})}(l)/N_{sc}^{RB};$$

wherein
$\alpha_{\tilde{p}}(l)$ represents the CS value corresponding to the symbol;
$n_{cs}^{(\tilde{p})}(l)$ represents the CS index corresponding to the symbol;
$N_{sc}^{RB}$ represents a quantity of sub-carriers in one RB.

19. The base station according to claim 17, wherein the processor executes the computer program to:
in case of using an OCC sequence, determine an OCC sequence index according to the configuration signaling, or determine an OCC sequence index according to CS configuration index and through a preset formula or a preset table;
determine, according to the OCC sequence index, the OCC sequence corresponding to the OCC sequence index; and
receive the PUCCH on the symbol, according to the CS value and the OCC sequence.

20. The base station according to claim 16, wherein the processor executes the computer program to:
determine, through a third formula below, a RB index $n_{PRB}$ of a RB where the PUCCH is transmitted, and transmit the PUCCH on the symbol and the RB corresponding to the RB index:

$$n_{PRB} = \begin{cases} \left\lfloor \frac{m}{2} \right\rfloor & \text{if } (m \bmod 2) \bmod 2 = 0 \\ N_{RB}^{UL}-1-\left\lfloor \frac{m}{2} \right\rfloor & \text{if } (m \bmod 2) \bmod 2 = 1 \end{cases}; \text{ or}$$

-continued $$n_{PRB} = \begin{cases} \left\lfloor \frac{m}{2} \right\rfloor + N_{hop\text{-}offset1} & \text{if } (m \bmod 2) \bmod 2 = 0 \\ N_{RB}^{UL} - 1 - \left\lfloor \frac{m}{2} \right\rfloor - N_{hop\text{-}offset2} & \text{if } (m \bmod 2) \bmod 2 = 1 \end{cases};$$

wherein $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

or, in the case that a frequency hopping is used, determine the RB index $n_{PRB}$ of the RB where the PUCCH is transmitted through a fourth formula below, and transmit the PUCCH on the symbol and the RB corresponding to the RB index:

$$n_{PRB} = \begin{cases} \left\lfloor \frac{m}{2} \right\rfloor & \text{if } (m + f_{hop} \bmod 2) \bmod 2 = 0 \\ N_{RB}^{UL} - 1 - \left\lfloor \frac{m}{2} \right\rfloor & \text{if } (m + f_{hop} \bmod 2) \bmod 2 = 1 \end{cases}; \text{ or}$$

$$n_{PRB} = \begin{cases} \left\lfloor \frac{m}{2} \right\rfloor + N_{hop\text{-}offset1} & \text{if } (m + f_{hop} \bmod 2) \bmod 2 = 0 \\ N_{RB}^{UL} - 1 - \left\lfloor \frac{m}{2} \right\rfloor - N_{hop\text{-}offset2} & \text{if } (m + f_{hop} \bmod 2) \bmod 2 = 1 \end{cases};$$

wherein $$m = \left\lfloor \frac{n_{PUCCH}^{(\tilde{p})}}{c \cdot N_{SC}^{RB} / \Delta_{shift}^{PUCCH}} \right\rfloor \text{ or } m = \left\lfloor \frac{n_{PUCCH}^{(\tilde{p})} + N_{offset}}{c \cdot N_{SC}^{RB} / \Delta_{shift}^{PUCCH}} \right\rfloor;$$

wherein $n_{PRB}$ represents the RB index of the RB for transmitting the PUCCH;

$n_{PUCCH}^{\tilde{p}}$ represents an index number of the PUCCH at an antenna port $\tilde{p}$;

$N_{SC}^{RB}$ represents a quantity of sub-carriers in one RB;

$\Delta_{shift}^{PUCCH}$ represents a CS spacing preconfigured by a high-layer signaling;

$N_{RB}^{UL}$ represents an uplink bandwidth or an uplink frequency hopping bandwidth;

$f_{hop}$ represents an index of the frequency hopping part;

$N_{offset}$ represents a staring positon of the PUCCH resource preconfigured by a high-layer signaling, wherein a value of $N_{offset}$ is greater than or equal to 0;

$N_{hop\text{-}offset1}$ and $N_{hop\text{-}offset2}$ represent uplink frequency hopping offsets;

c has a pre-defined value, c has a same value for PUCCHs with different symbol lengths, or c has independent values for PUCCHs with different symbol lengths, or c has independent values for PUCCHs with different multiplexing capacities.

\* \* \* \* \*